US011805756B2

(12) United States Patent
Kraayenbrink et al.

(10) Patent No.: US 11,805,756 B2
(45) Date of Patent: Nov. 7, 2023

(54) LASER ENRICHMENT DEVICE, SYSTEM, AND METHOD FOR POULTRY

(71) Applicant: Iowa State University Research Foundation, Inc., Ames, IA (US)

(72) Inventors: Elizabeth Ann Kraayenbrink, Ames, IA (US); Anna Butters-Johnson, Ames, IA (US); Derek Kraayenbrink, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 18/147,541

(22) Filed: Dec. 28, 2022

(65) Prior Publication Data

US 2023/0232788 A1 Jul. 27, 2023

Related U.S. Application Data

(63) Continuation of application No. 17/809,649, filed on Jun. 29, 2022, now Pat. No. 11,576,353, which is a continuation of application No. 16/598,896, filed on Oct. 10, 2019, now Pat. No. 11,439,126.

(60) Provisional application No. 62/744,517, filed on Oct. 11, 2018.

(51) Int. Cl.
*A01K 15/02* (2006.01)
*A01K 39/01* (2006.01)

(52) U.S. Cl.
CPC ............ *A01K 15/027* (2013.01); *A01K 39/01* (2013.01); *A01K 2227/30* (2013.01)

(58) Field of Classification Search
CPC .... A01K 15/02; A01K 15/025; A01K 15/027; A01K 5/02; A01K 5/0114; A01K 39/01; A01K 2227/30
See application file for complete search history.

(56) References Cited

U.S. PATENT DOCUMENTS

| | | |
|---|---|---|
| 5,443,036 A | 8/1995 | Amiss et al. |
| 6,651,591 B1 | 11/2003 | Chelen |
| 6,701,872 B1 | 3/2004 | Allen |
| 9,848,578 B2 | 12/2017 | Miller |
| 10,780,364 B2 | 9/2020 | Bearsch et al. |
| 11,006,616 B2 | 5/2021 | Naitove et al. |
| 2001/0037773 A1 | 11/2001 | Nathanson et al. |
| 2003/0150398 A1 | 8/2003 | Nathanson et al. |
| 2008/0011243 A1 | 1/2008 | Moulton |

(Continued)

OTHER PUBLICATIONS amazon.com, "Screen shots of Red Laser Dot Module, Sensor Mount for Arduino Robot, and Arduino UNO R3" as east as early as Oct. 11, 2018.

(Continued)

*Primary Examiner* — Monica L Perry
*Assistant Examiner* — Aaron M Rodziwicz
(74) *Attorney, Agent, or Firm* — McKee, Voorhees & Sease, PLC

(57) ABSTRACT

An apparatus, systems, and methods of providing enrichment to poultry during raising or maintaining of the poultry. One or more light sources project beams to generate laser spots at and around the poultry. A control regimen moves the light spots relative the poultry in generally random fashion during timed sessions for each given time period (e.g. each day). The spot movement is designed to promote benefits to poultry and producer in correlation to experimental data related to animal welfare, health, and commercial value.

20 Claims, 47 Drawing Sheets

(56) References Cited

U.S. PATENT DOCUMENTS

Figure 1A:
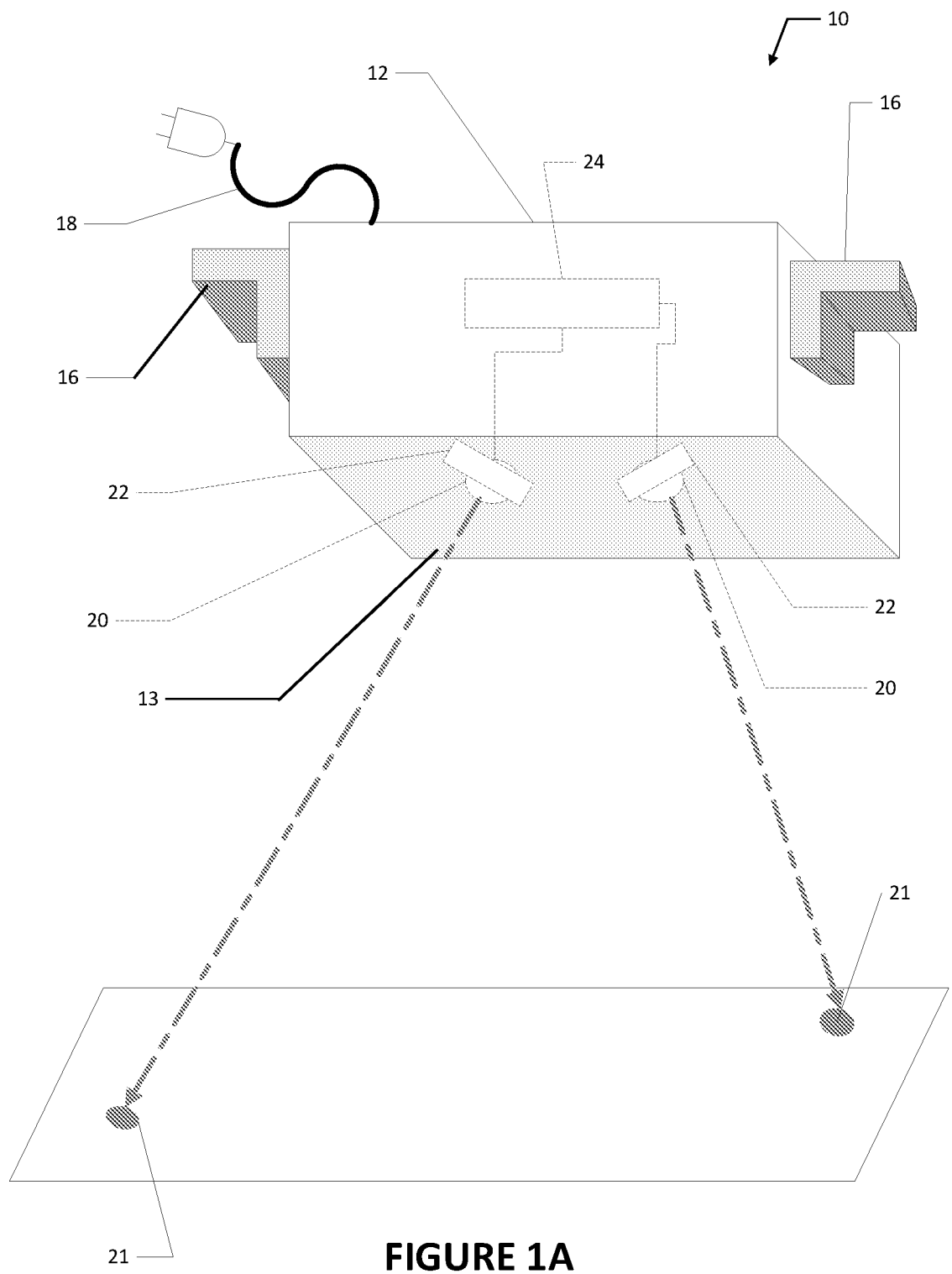

| | | |
|---|---|---|
| 2012/0298049 A1 | 11/2012 | Cook et al. |
| 2013/0300863 A1 | 11/2013 | Tait et al. |
| 2017/0196196 A1 | 7/2017 | Trottier et al. |
| 2017/0251633 A1 | 9/2017 | Womble et al. |
| 2018/0077897 A1 | 3/2018 | Christianson |
| 2019/0124888 A1 | 5/2019 | Coyle |
| 2020/0150696 A1 | 5/2020 | Womble et al. |
| 2020/0178495 A1 | 6/2020 | Womble et al. |
| 2020/0178505 A1 | 6/2020 | Womble et al. |

OTHER PUBLICATIONS

Bizeray et al., "Effects of increasing environmental complexity on the physical activity of broiler chickens", Applied Animal Behaviour Science, vol. 79, pp. 27-41, May 25, 2002.

Bizeray et al., "Making broilers walk : what for and how", INRA Prod. Anim., vol. 17(1), pp. 45-57, May 14, 2018.

chewy.com, "Screen shot of Frolicat", 1 page, as least as early as Oct. 11, 2018.

Meyer et al., "A novel environmental enrichment device improved broiler performance without sacrificing bird physiological or environmental quality measures", Poultry Science, 10 pages, Jul. 2, 2019.

Osorio et la., "Accurate memory for colour but not pattern contrast in chicks", Current Biology, vol. 9, No. 4, 4 pagers, Feb. 15, 1999.

Roper, T.J., "Responses of domestic chicks to artificially coloured insect prey: effects of previous experience and background colour", Anim. Behav., vol. 39, pp. 466-473, 1990.

Zylinski et al., "Research Article: Visual contrast and color in rapid learning of novel patters by chicks", The Journal of Experimental Biology, vol. 216, pp. 4184-4189, Aug. 1, 2013.

(TWO LASER APPARATUS)

(BUILDING WITH MULTIPLE POULTRY PENS AND ENRICHMENT APPARATUS)

(PLAN VIEW OF PEN FLOOR SHOWING PSEUDO-RANDOM LASER SPOT MOVEMENT)

(FLOW CHART OF METHOD)

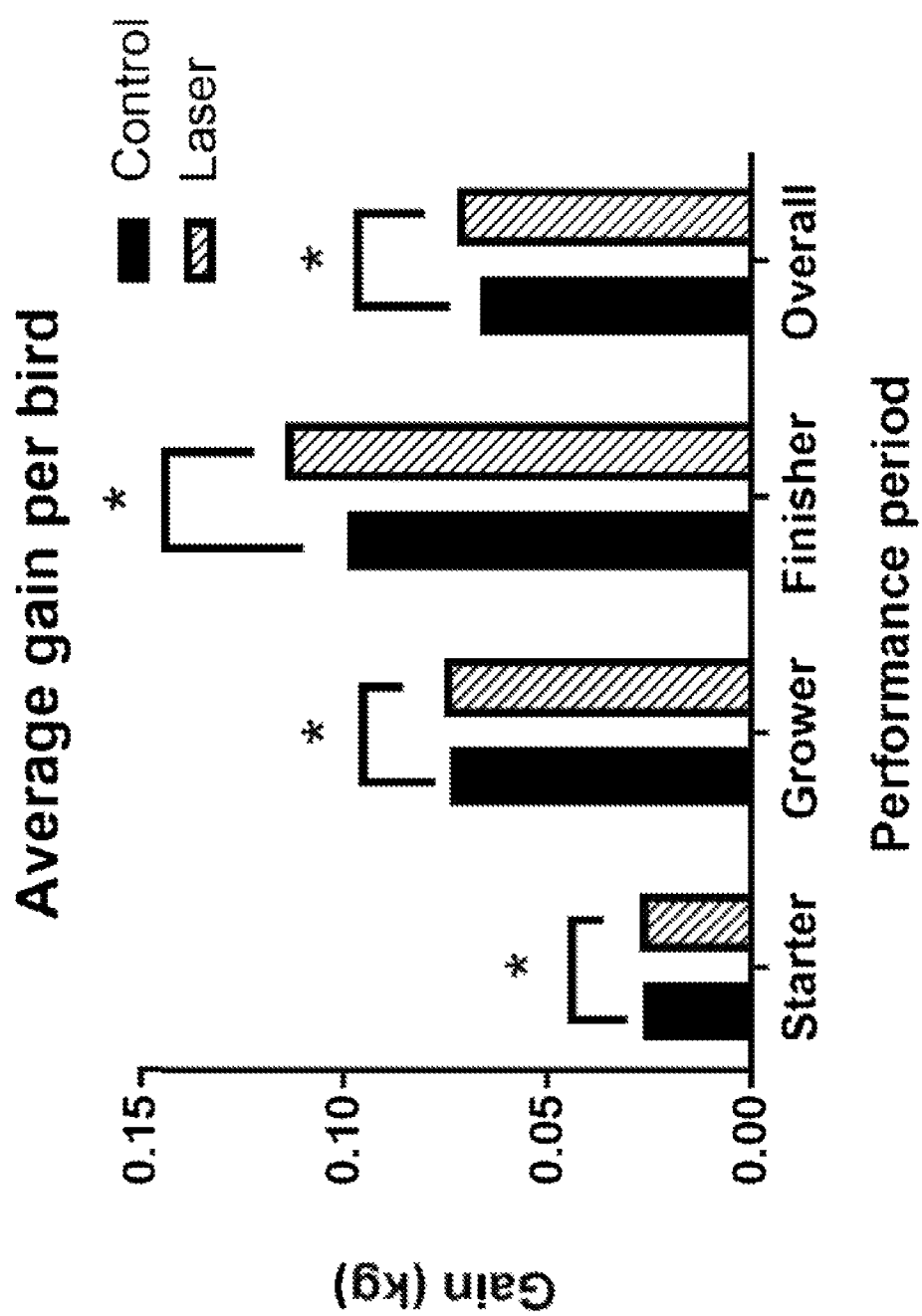
Figure 15. Average laser vs control weight gain per bird

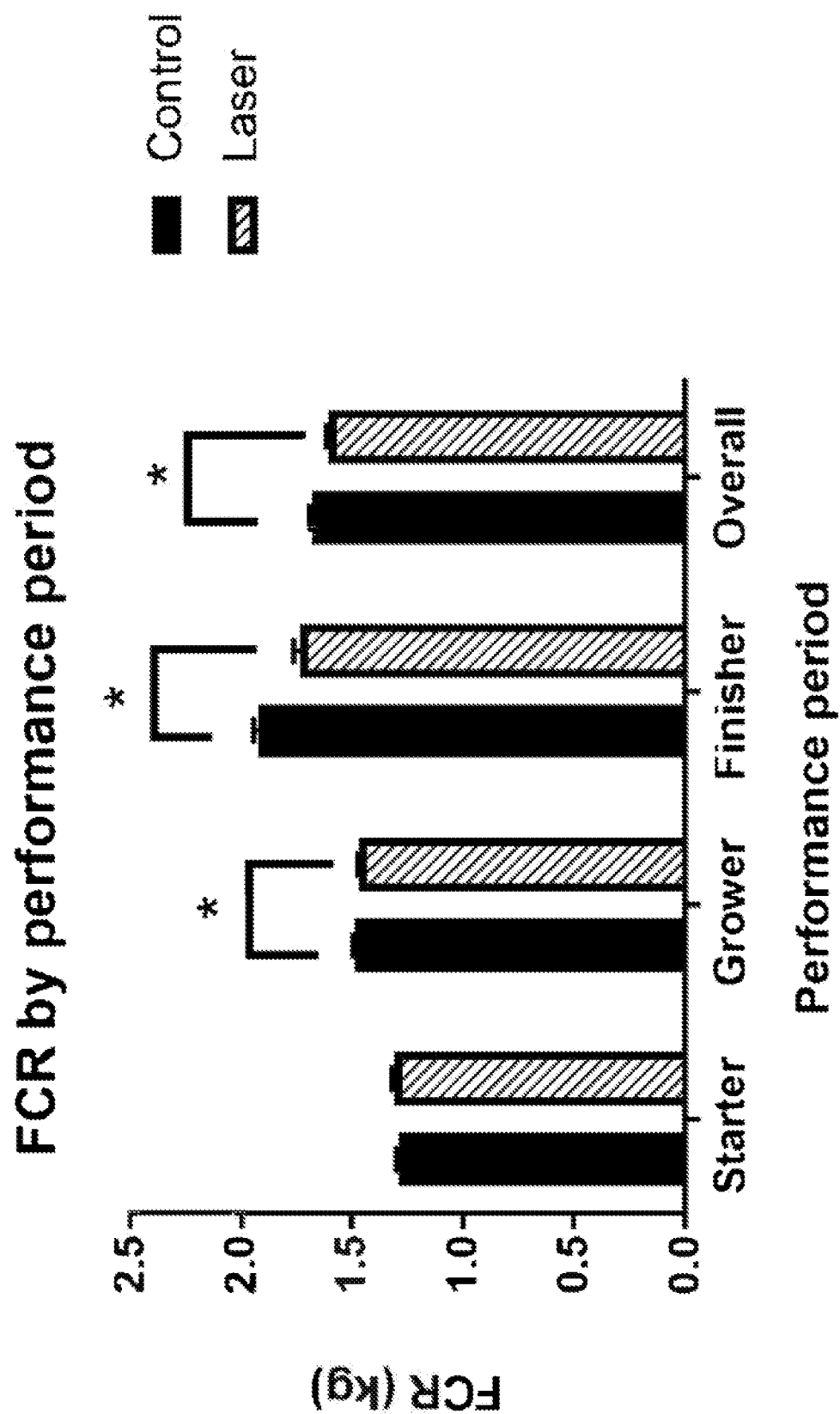
Figure 16. Average laser vs control FCR by pen

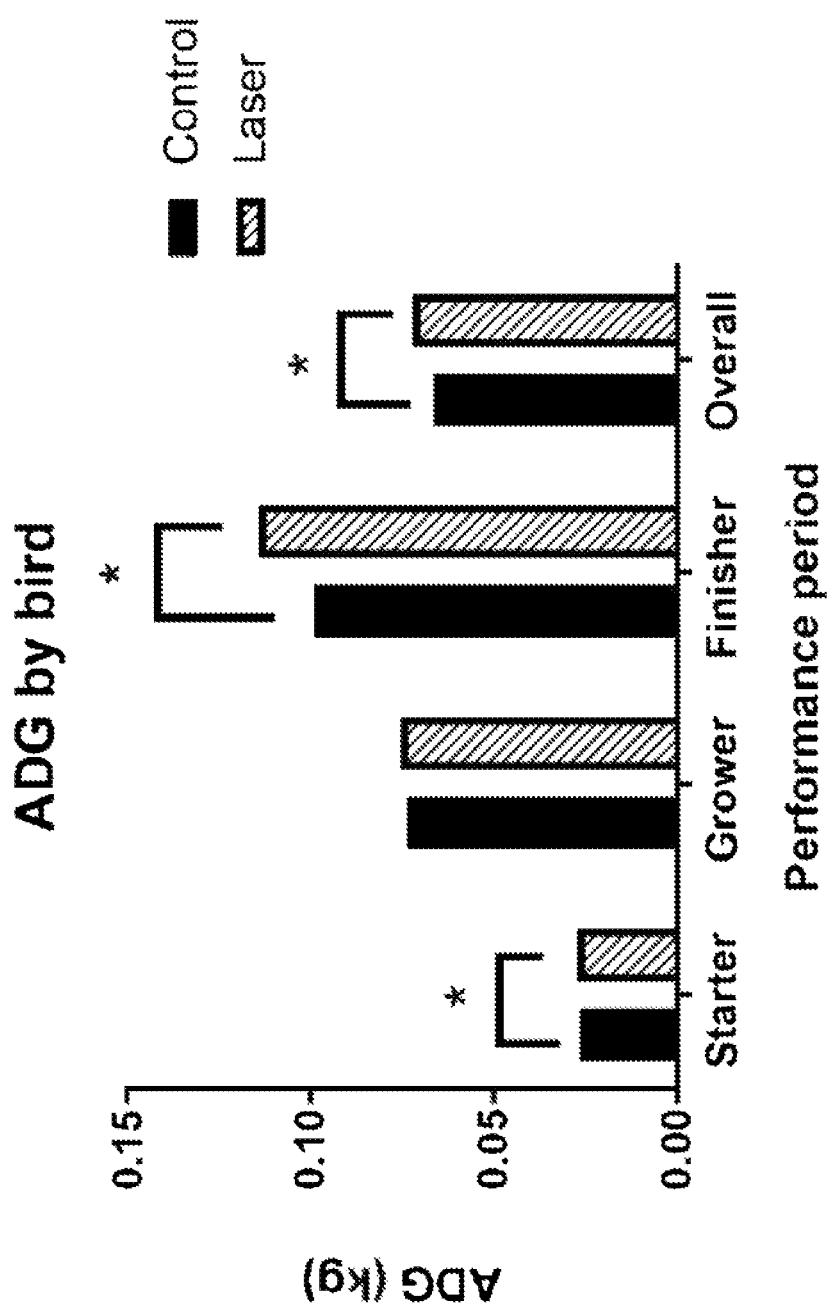
Figure 17. Laser vs control ADG per bird

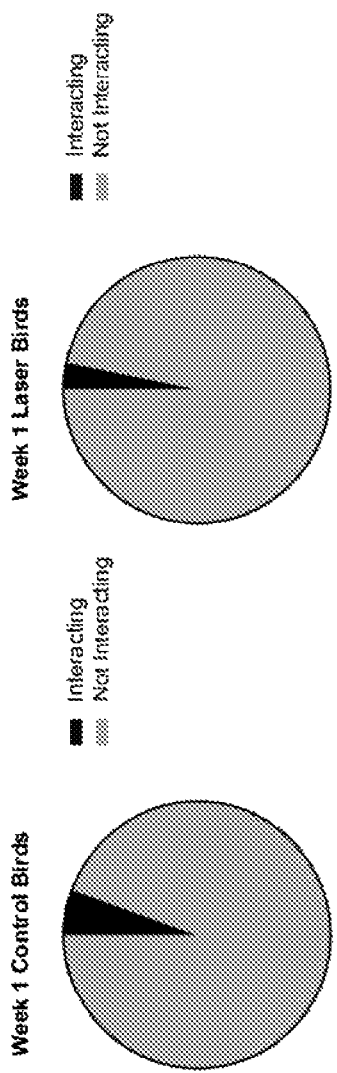
Figures 18A & 18B. Percentage of control and laser birds interacting vs not interacting Week 1
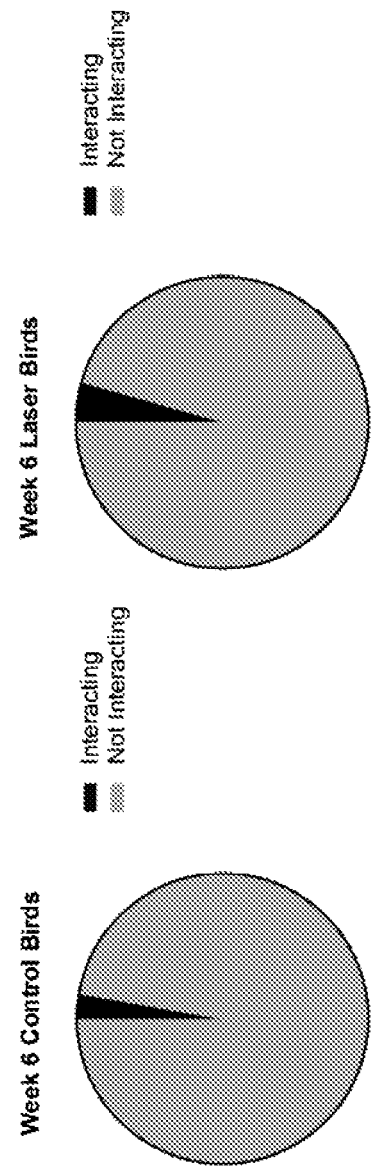
Figures 19A & 19B. Percentage of control and laser birds interacting vs not interacting Week 6

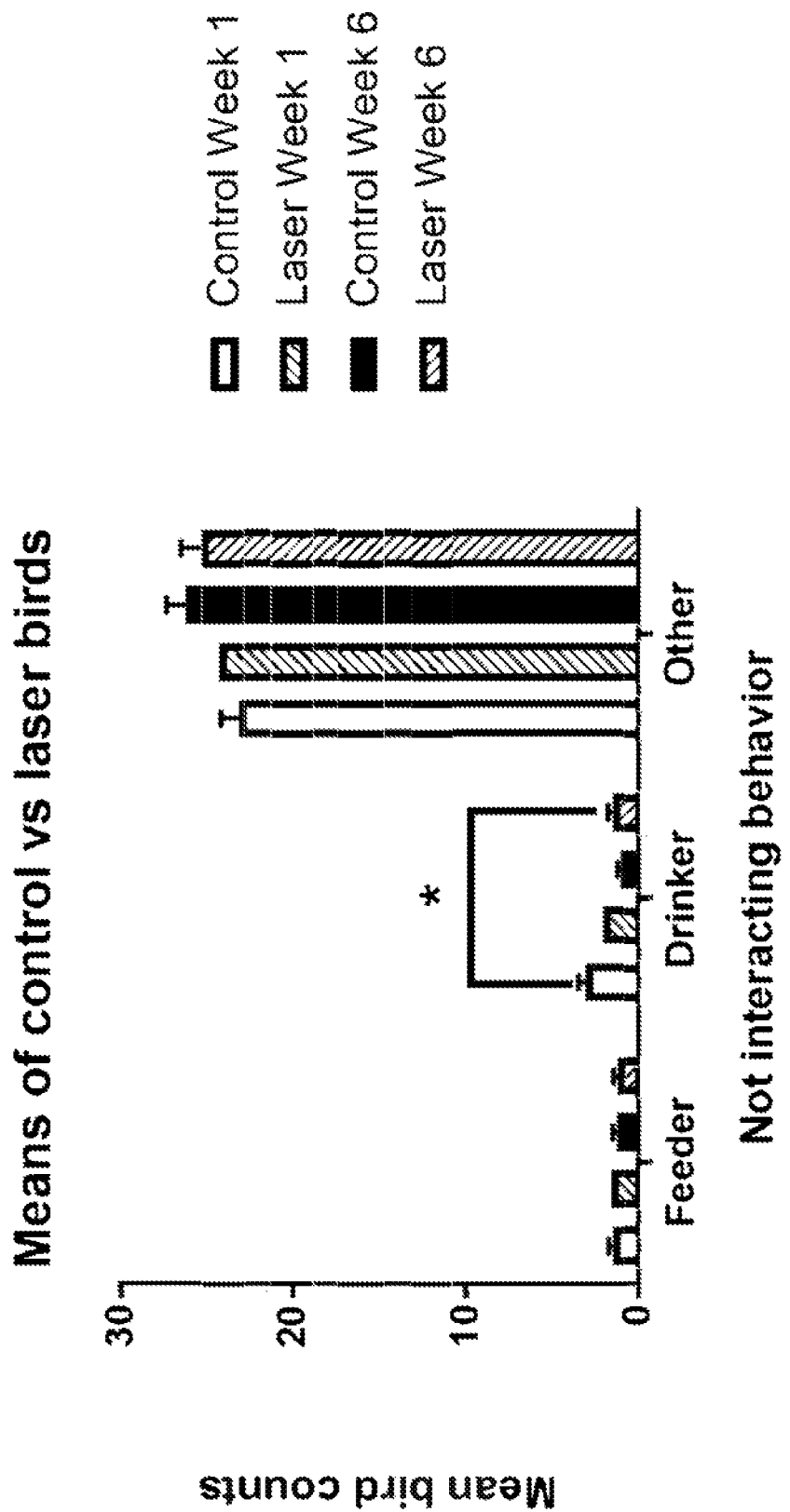
Figure 20. Breakdown of not interacting bird behavior

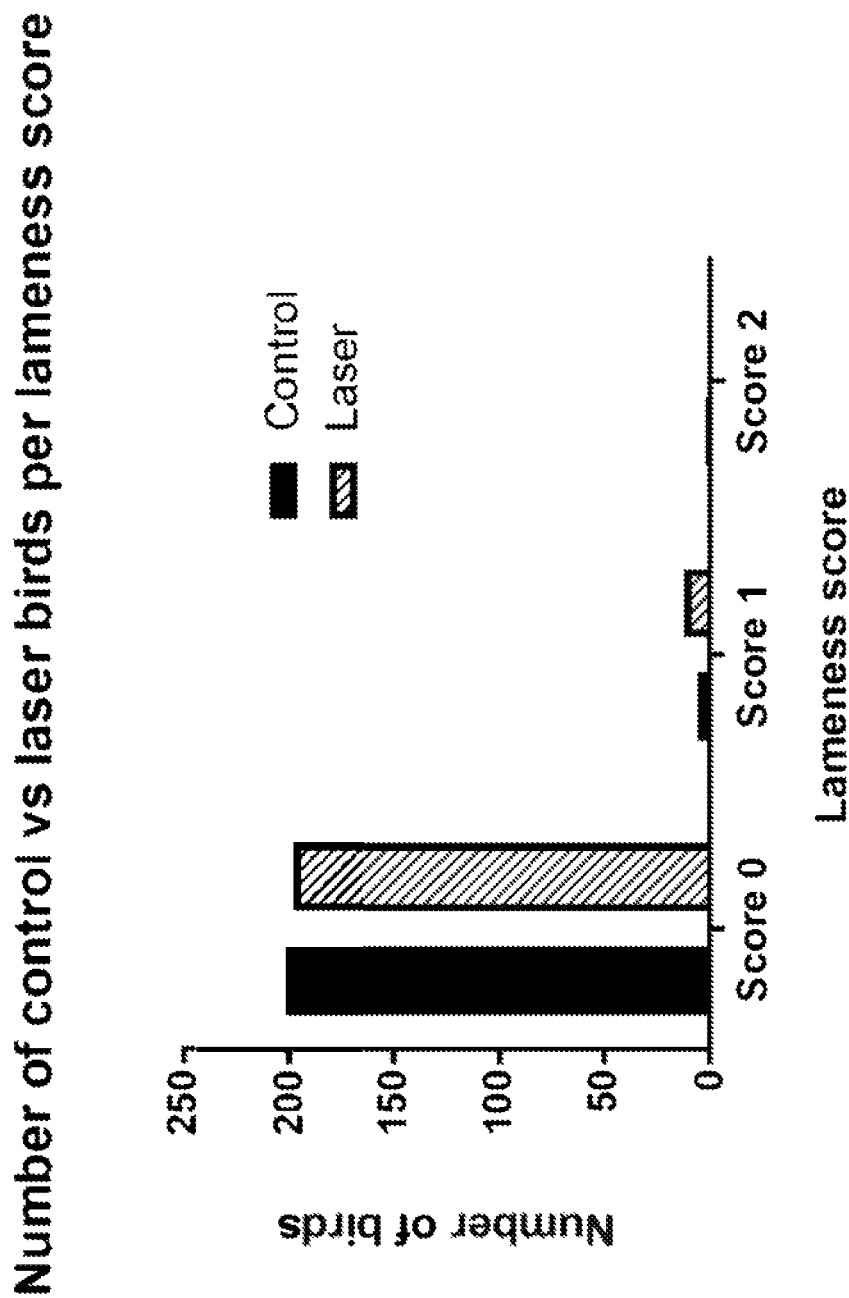
Figure 21. Walking Lameness. Total number of birds assigned to each lameness score from weeks 1-6.
*Note: Score 0: no lameness, score 1: unevenness in gait or sits down to rest, score 2: could not walk 5 feet, lame.*

Average Bone mineral content
of tibia by treatment as analyzed via DXA

Average Bone mineral density
of tibia by treatment as analyzed via DXA

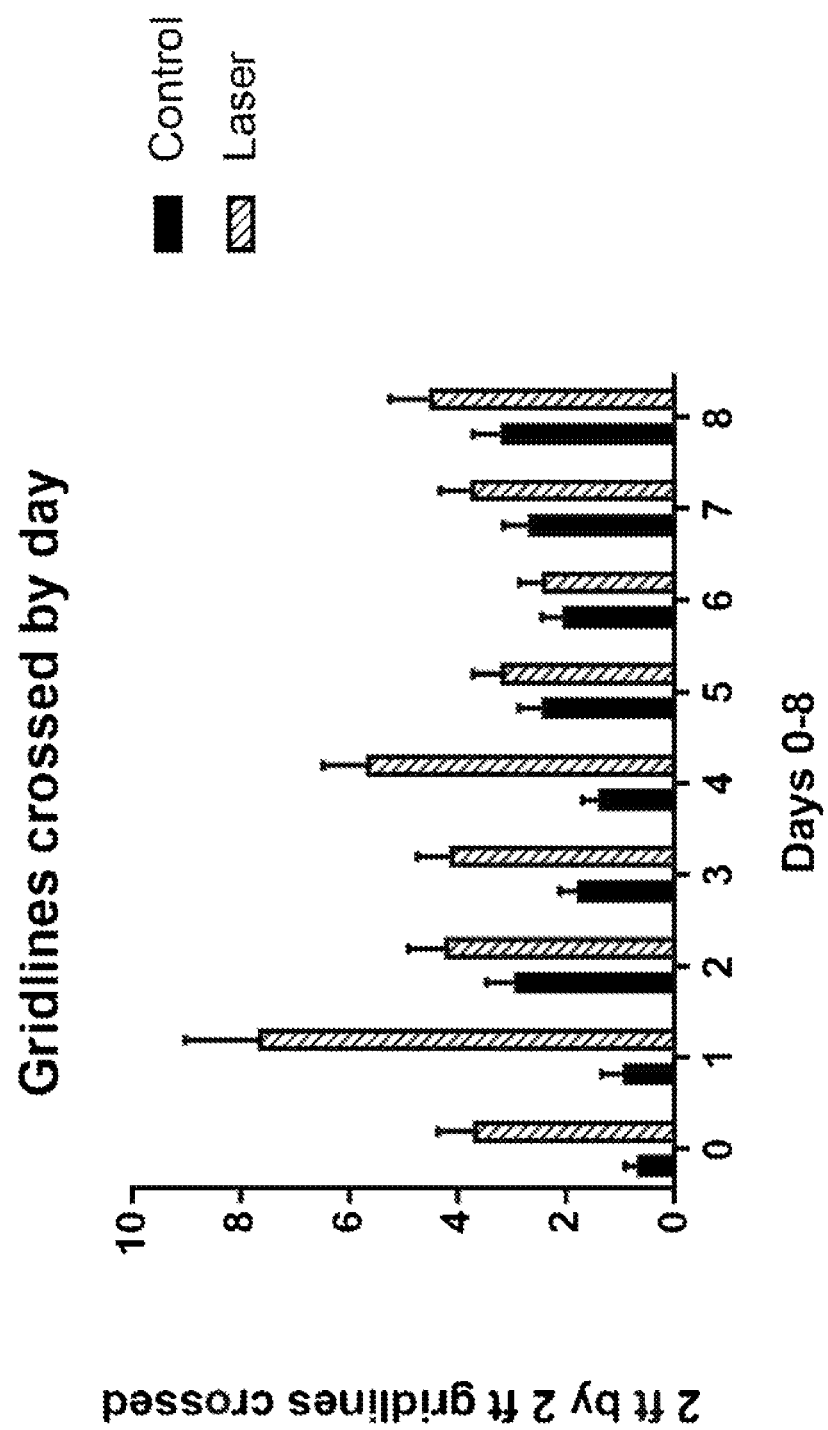
Figure 24. Average number of gridlines crossed by the focal bird during laser periods on days 0-8 in laser vs control pens

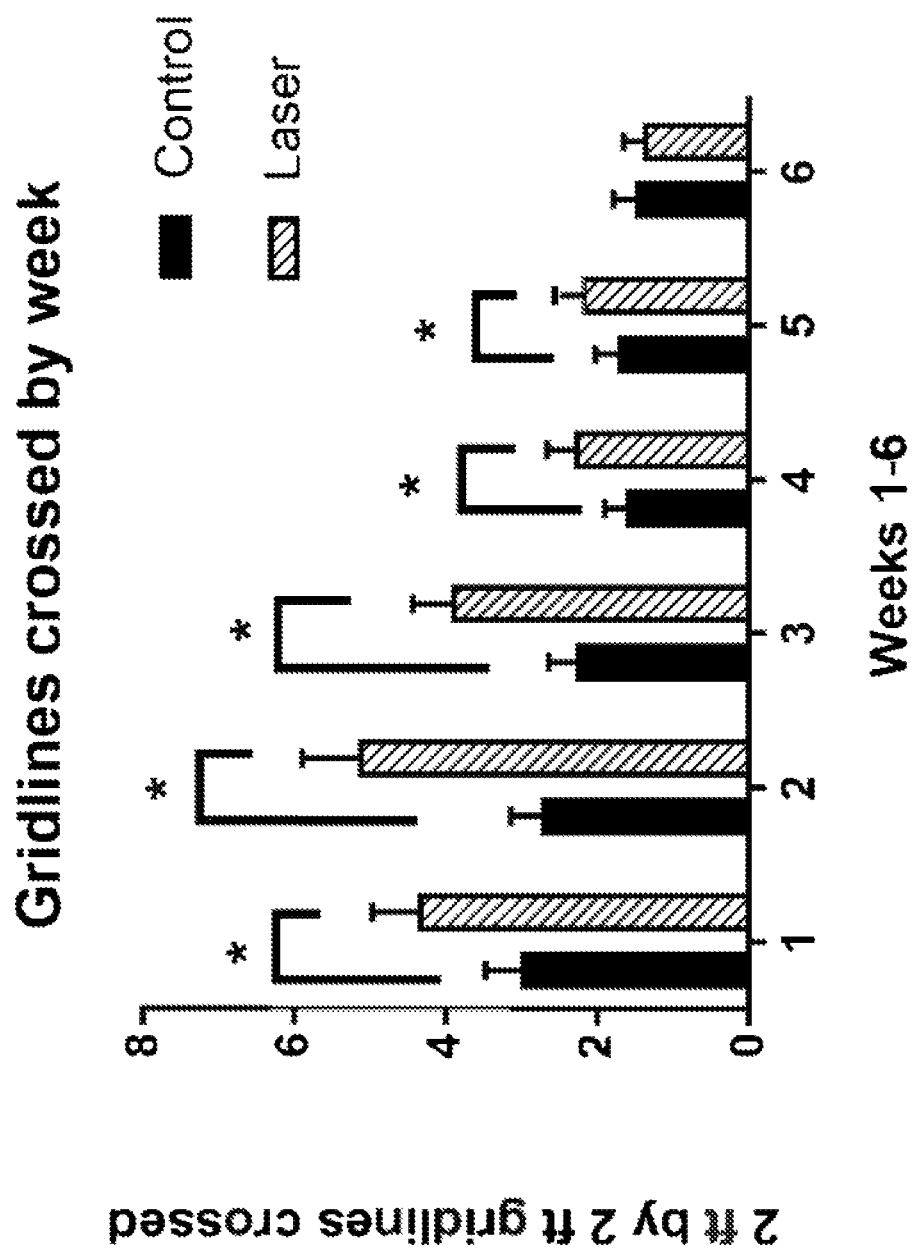
Figure 25. Average number of 0.6m by 0.6m gridlines crossed by the focal bird during enrichment periods weeks 1-6

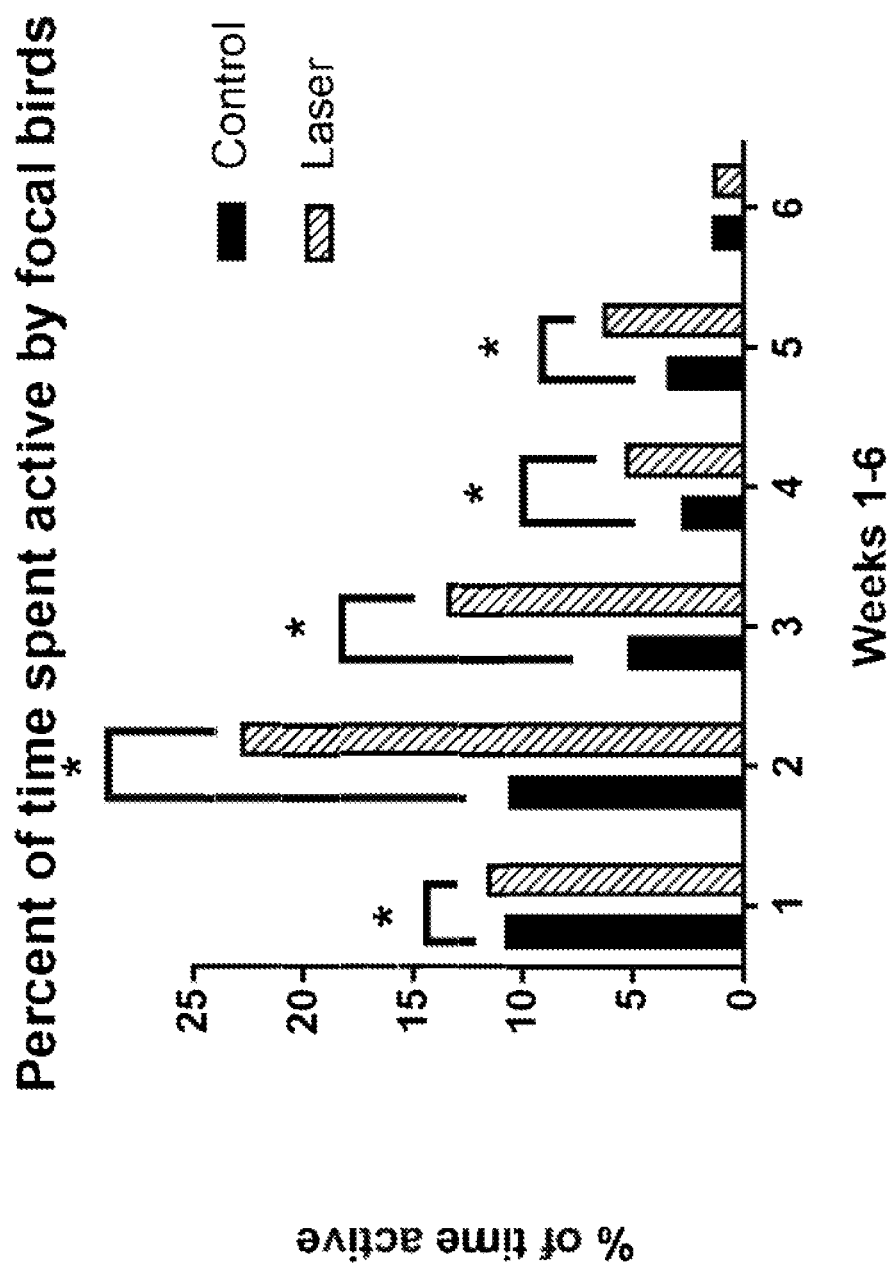
Figure 26. Average percent of time focal birds spent "Active" during enrichment periods by week

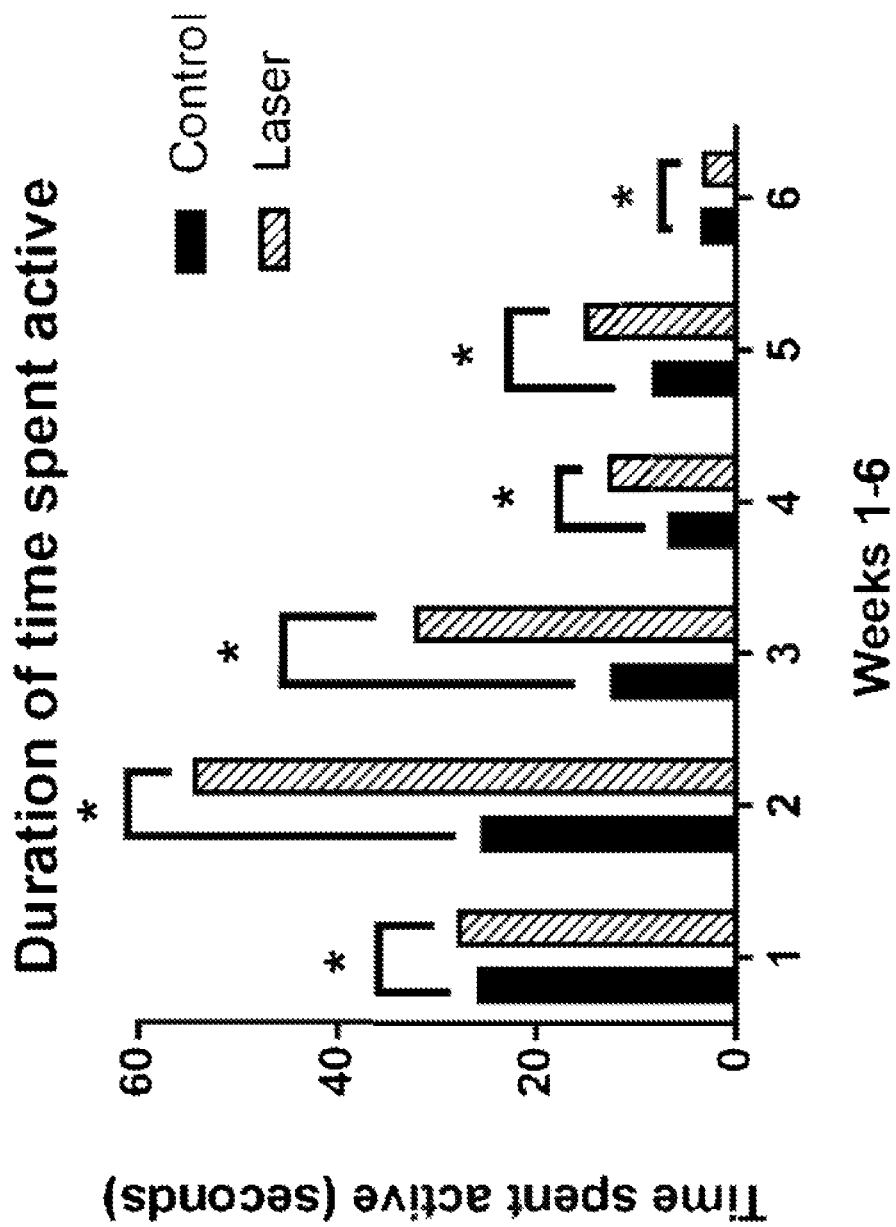
Figure 27. Duration of time focal bird spent active out of 4-minute enrichment period (in seconds) by week

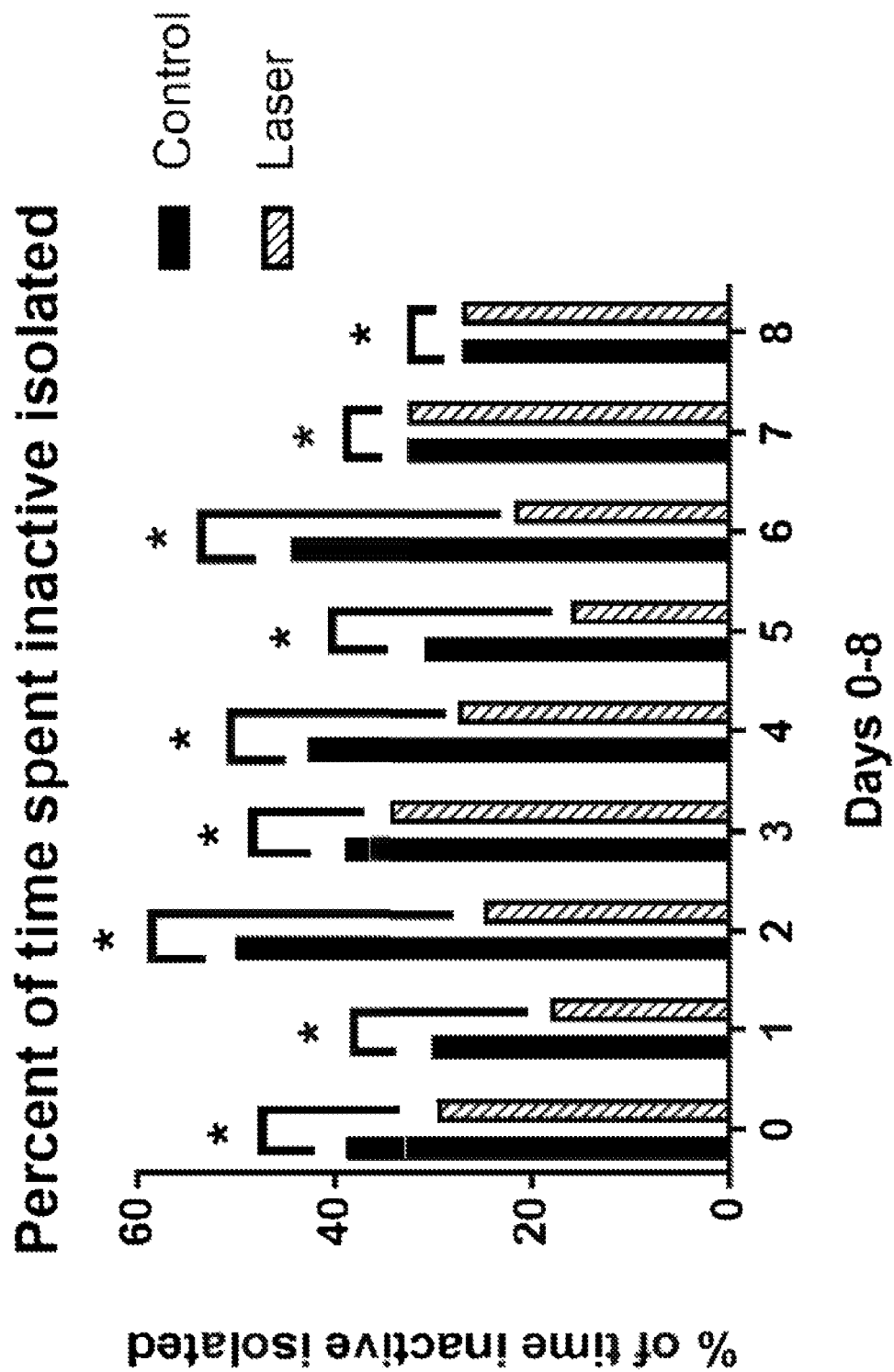
Figure 28. Average percent of time spent "inactive isolated" by focal birds during enrichment periods on days 0-8

LASER ENRICHMENT DEVICE, SYSTEM, AND METHOD FOR POULTRY

CROSS-REFERENCE TO RELATED APPLICATIONS

This application is a Continuation of U.S. Ser. No. 17/809,649, filed Jun. 29, 2022, which is a continuation of U.S. Ser. No. 16/598,896, filed Oct. 10, 2019, now Pat. No. 11,439,126, issued on Sep. 13, 2022, which claims priority under 35 U.S.C. § 119 to provisional application Ser. No. 62/744,517, filed Oct. 11, 2018, all of which are herein incorporated by reference in their entireties.

GRANT REFERENCE

This invention was made with government support under USDA/NIFA grant no. 2019-69012-29905. The Government has certain rights in this invention.

I. BACKGROUND OF THE INVENTION

A. Field of the Invention

The invention relates to poultry raising and maintenance and, in particular, to apparatus, systems, and methods to promote improved poultry health and welfare from initial growth stages to adulthood by technological enrichment techniques.

The invention described here is a laser device used to stimulate poultry's natural predatory and visual oriented instincts to hunt and chase bugs or other small moving objects. The goal is to add an enrichment option for poultry producers to comply with guidelines as well as improve poultry health and welfare. An increasing subset of broiler and poultry companies in general are now requiring producers to provide two separate enrichment options to poultry. Our device is novel because current enrichment devices are physical barriers such as perches or mazes, straw bales, field tile, cans, etc. Our device and method use a mounted laser in the poultry building or other environment that turns on at specific intervals and projects a dot that moves randomly around the floor or other surface. Other light sources that produce an effective relatively small-in-size light spot or dot on a surface are possible. This emulates poultry natural predatory behavior and they chase the light spot, as they are visual feeders. We are not aware of form of enrichment that meets this behavioral and mental stimulation need. Importantly, this light-based enrichment device and method do not provide an inanimate source for bacteria, viruses, spores, or any other pathogenic growth as it is not a physical object poultry interact with. The birds cannot deposit bodily fluid, feces, or dander on the device as they would with any of the physical enrichment devices currently used in poultry production. Birds can deposit bodily fluids, dander, or secretions on bales or perches, for example, and then this becomes a point for further propagation of infection for diseases such as avian influenza, respiratory disease, coccidiosis, etc. Perches, mazes, straw bales, and field tiles can bring in pathogens if not properly disinfected before being placed in the housing system. Therefore, additional inanimate objects inadvertently become a biohazard risk in addition to their intended use as an enrichment. An additional benefit of this device is that producers or workers are able to move around the building uninhibited for flock health checks and building cleanout with an unobstructed view, and the device does not need to be replaced with each flock. It is a long-teen solution for enrichment once installed. We have experimental data that suggests a benefit to poultry due to this enrichment device and method.

B. Problems in the State of the Art

No prior art describing an invention of this type for this specific purpose is known to the inventors. Previous work has mentioned changing lighting systems to add enrichment, but not in this fashion. Previously published work did not achieve the outcomes that we did as reported here.

We know from previous research that birds are visually motivated and apply this to foraging, hunting and feeding behaviors. Furthermore, they can distinguish color and have demonstrated learning towards items in their environment See, e.g., Zylinski, S. & Osorio, D. Visual contrast and color in rapid learning of novel patterns by chicks. *J Exp Bio/*216, 4184-4189, doi:10.1242/jeb.085001 (2013); Osorio, D., Jones, C. D. & Vorobyev, M. Accurate memory for colour but not pattern contrast in chicks. *Curr Biol* 9, 199-202 (1999); Roper, T. J. Responses of Domestic Chicks to Artificially Colored Insect Prey—Effects of Previous Experience and Background Color. *Anim Behav* 39, 466-473, doi:Doi J0.1016/S0003-3472(05)80410-5 (1990), each incorporated by reference herein as background information.

The bird is an *omnivore*, and seeks out both crawling and flying insects, small reptiles, and mammals as part of their diet. Furthermore, increasing a chick's ability to find and successfully eat and drink in the first few days of life is critical to chick welfare and future production.

Research shows that physical activity improves leg lamenesses See Bizeray, D., Faure, J. M. & Leterrier, C. Making broilers walk: what for and how. *Prod Anim* 17, 45-57 (2004), incorporated by reference herein as background. Yet, only one published study by Bizeray and colleagues (Bizeray, D., Estevez, L. Leterrier, C, & Faure, J. M. Effects of increasing environmental complexity on the physical activity of broiler chickens. *Appl Anim Beh Sci* 79, 27-41. (2002), incorporated by reference herein as background) used a spot-light light treatment, projecting relatively large (more light than a light spot or dot) brightly colored moving lights on the pen floor daily throughout rearing. The authors noted that this lighting treatment did not affect foraging and locomotion; however, birds in the light treatment spent more time eating than control birds. The authors concluded that "moving lights . . . need further investigation to establish their effect on behaviour and health." Several reasons as to why this study was not successful are as follows; the size of the spotlight as seen by the birds on the floor was too large, brightness/color was not in the birds UV spectrum, and the light moved too slow and in a straight line. All of these added together may not have stimulated the bird.

With our environmental enrichment concept using guided lasers emulating natural behaviors (pecking, moving objects, insect foraging), we believe we therefore have a concept that has not been previously tested or demonstrated to solve or improve over the challenges and deficiencies of state-of-the-art approaches.

The inventors have therefore identified room for a technological improvement in this technical field.

II. SUMMARY OF THE INVENTION

A. Objects, Features, and Advantages of the Invention

A principal object, feature, or advantage of the present invention is methods, systems, and apparatus that improve over or solve problems and deficiencies in the state of this technical field.

Other objects, features, and advantages of the invention include methods, systems, and apparatus which utilize specifically controlled laser spot movement relative to poultry to provide at least one or more of:

a. increased expression of natural foraging and feeding behaviors;
b. improved leg health;
c. reduced or at least not adversely affect other morbidity factors;
d. reduced number of culled/mortality birds;
e. bird enrichment at least consistent with industry and government guidelines and/or laws and recommendations for poultry;
f. improved growth rate, feed efficiency, and economic return;
g. improved animal welfare;
h. a source of enrichment that stimulates birds in categories separate from other current enrichment options;
i. use over a wide range of conditions, including but not limited to, in any and all natural life stages of poultry (e.g. early life, growing stages, egg production, adult), in different environments (e.g. pens, buildings, areas), for different intended therapeutic purposes (weight gain, health, welfare, etc.), and for different end-uses of the poultry (e.g. meat production, egg-laying, breeding, etc.);
j. scaling up or down depending on application, including in terms of number of apparatus, number of poultry served, and options and features;
k. high flexibility in placement and operation;
l. reuse/repurpose for multiple flocks, growing seasons, or locations;
m. improved animal activity;
n. influencing of conspecifics;
o. increased percent and duration in time active.

These and other objects, features, aspects, and advantages of the invention will become apparent from the accompanying description and claims herein.

B. Aspects of the Invention

One aspect of the invention is projecting one or more light beams onto a surface at and around a plurality of poultry, and automatically manipulating movement of a relatively small light spot from each beam around the surface in an effective way to provide for at least one or more the objects, features, or advantages discussed immediately above.

In one example, the spot movement can be related to a randomized spot movement correlated to experimental data establishing one or more of the foregoing. For purposes of this description the term randomized will mean both randomized and pseudo-randomized. In one specific example, the randomized spot movement emulates one of insect movement or typical poultry pecking/foraging behavior. In another example, the randomized spot movement can be controlled in a spatial manner relative to a reward for the poultry, such as feed supply or access to a feeder. In another example, the randomized spot movement can be tuned relative to a goal and a species of poultry in terms of one or more of:

a. spot size;
b. spot color;
c. spot movement path;
d. spot movement speed;
e. spot movement time.

In another example, the foregoing spot movement can be presented to poultry in timed sessions, including plural timed sessions per given time period. In one specific example, each timed session is a few minutes, presented multiple times a day at equally-spaced-apart intervals.

Another aspect of the invention comprises an apparatus, system, and method for raising or maintaining poultry includes one or more lasers that are controllable to project light beams that produce relatively small spots onto a surface. In one example, a control circuit automatically projects the beams and adjusts aiming of the beams in randomized fashion to cause the light spots at a floor or surface where the poultry are to move around during predetermined sessions during the day. Each light beam and its spot's movement are designed to promote, inter alia, health, behavioral and overall welfare benefits. For birds in an enclosure, the method, system, or apparatus do not add extraneous objects to the enclosure, which can create biohazards for the birds or obstacles for humans and can be programmed for operation according to need or desire. Surfaces could include floors, walls, ceilings, or objects, whether a part of an enclosure or not.

Another aspect of the invention comprises an apparatus for projecting one or more beams to produce one or more relatively small light spot, including in any of the manners discussed above. In one example, one or more laser sources are associated with one or more actuators that can change the beam axis of each laser source. Alternative light sources can be configured to produce light beams that generate similar light spots on a surface to that of lasers. A controller instructs the one or more actuators to change beam axis position relative to space in a randomized pattern for a selected session or sessions of operation. Optionally, an enclosure could contain the components and be mountable relative the poultry to allow the projection of the beam(s) from the source(s) to a surface at and around the poultry. The randomized movement can be programmed to follow any number of different regimens. Non-limiting examples of programmable variables include path direction(s), starts-stops along path, distances between starts and stops, speed between starts and stops, nature of the spot between starts and stops.

Another aspect of the invention comprises a system for projecting one or more laser beams or other light beams to produce light spots on a surface, including in the manners and with the apparatus discussed above. The system would include a controller that can be programmed and reprogrammed, as desired, to move the one or more spots relative to one or more enclosures containing poultry or surfaces that are in the presence of poultry. The system can be provided to a poultry producer or maintainer to install and use for poultry enrichment. The system can provide the producer a number of benefits, including but not necessarily limited to:

a. heavier birds (e.g. broilers) for more commercial value per input costs;
b. healthier birds for more commercial value for each set of produced poultry per input costs;
c. less bird mortality for more commercial value for each set of produced poultry per input costs, and
d. compliance with laws, regulations, and/or guidelines for poultry enrichment.

III. BRIEF DESCRIPTION OF THE DRAWINGS

The appended drawings consist of Figures, which help illustrate certain concepts of aspects of the invention.

Figure 1B:
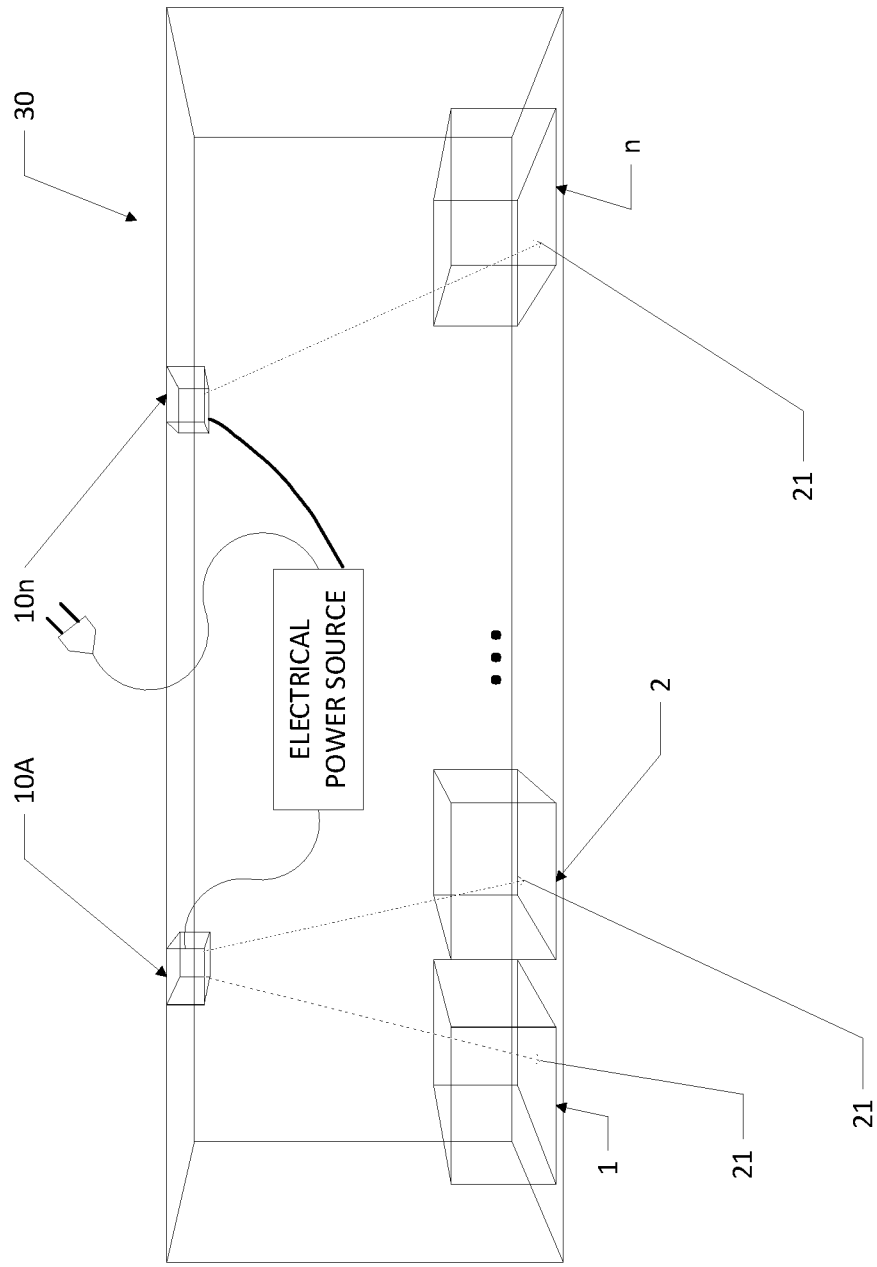
Figure 2:
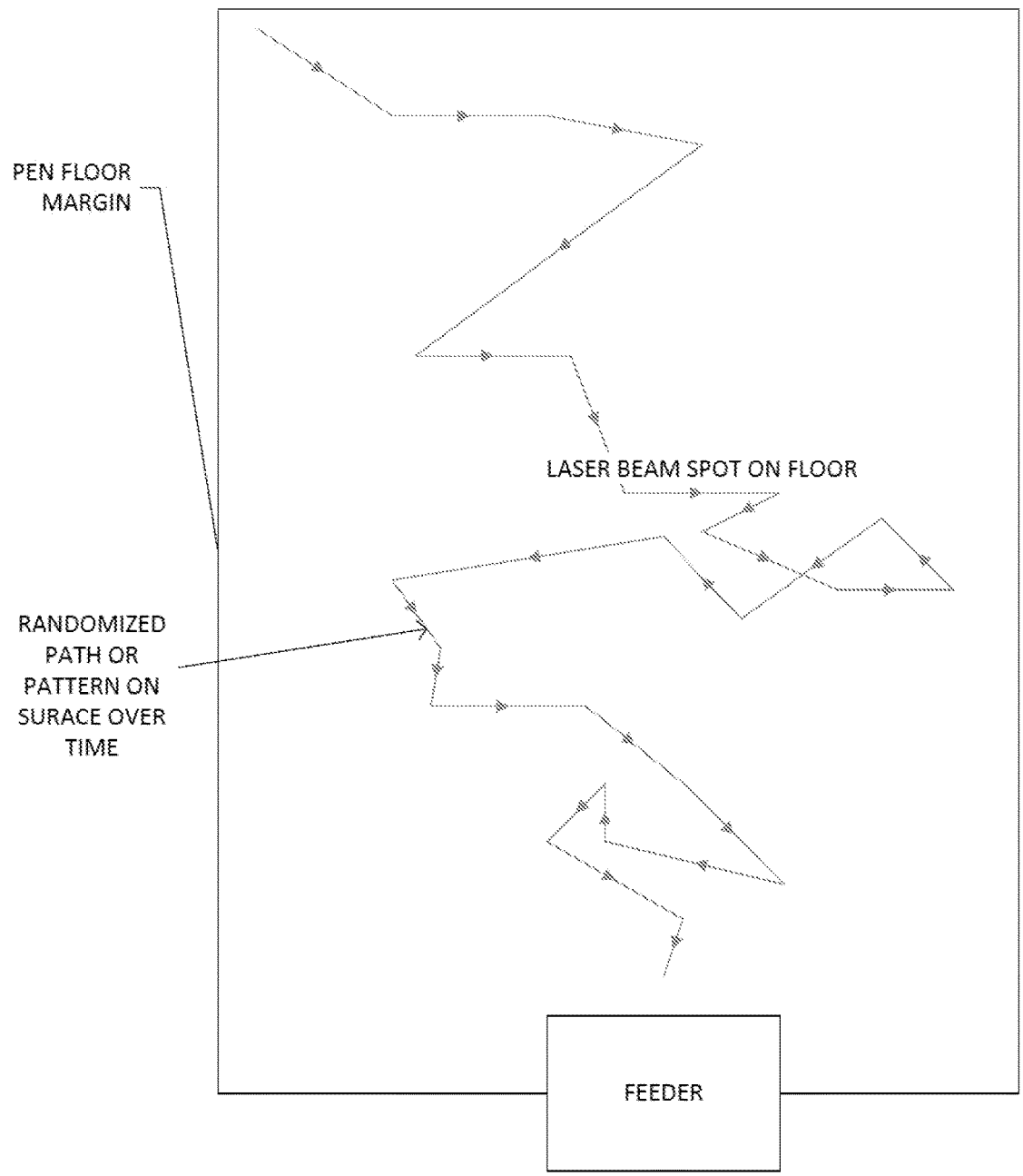
Figure 3:
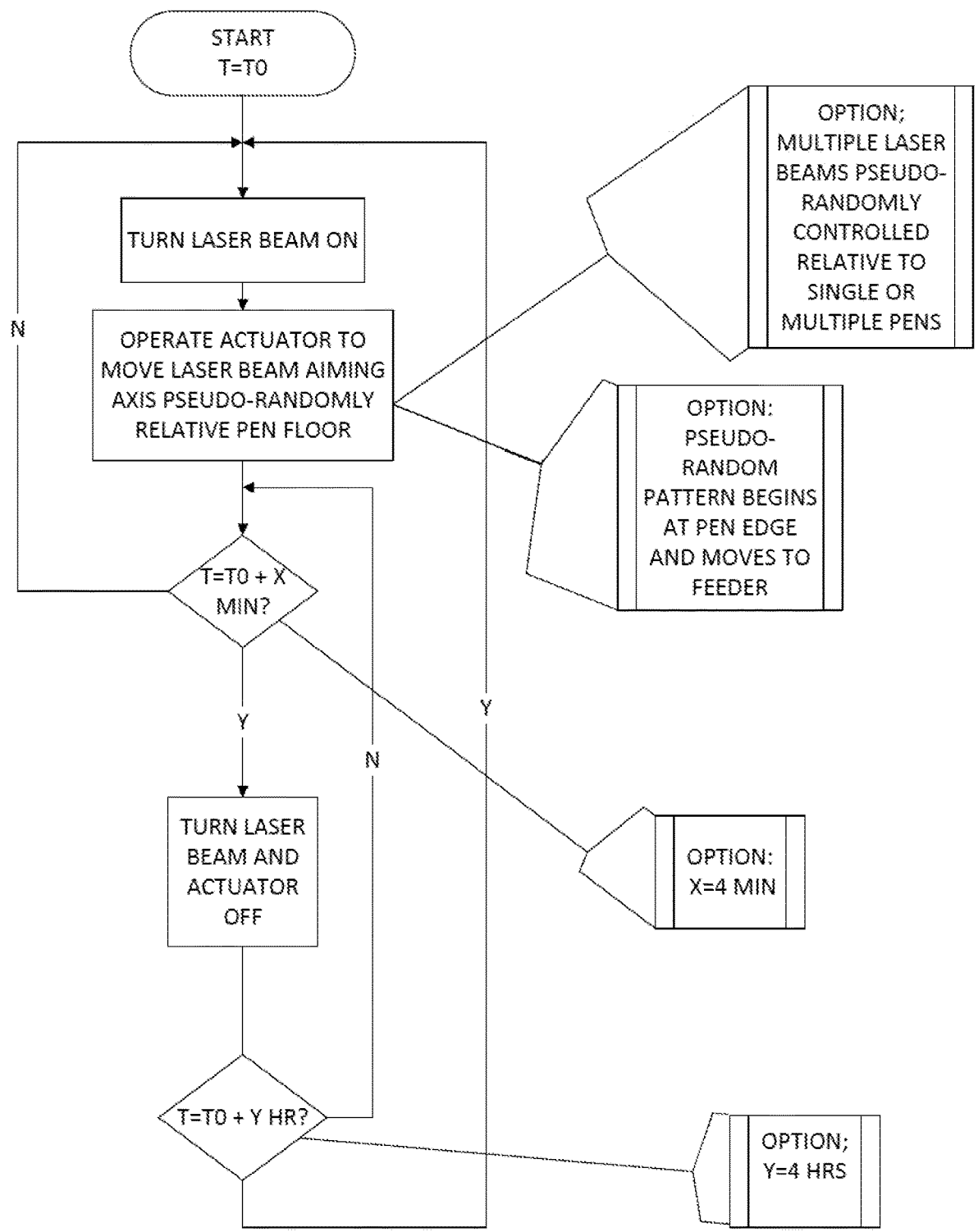

FIGS. 1A, 1B, 2, and 3 are highly diagrammatical illustrations of concepts according to aspects of the invention. FIG. 1A is a diagrammatic perspective view of an device and system according to an exemplary embodiment of the invention including a housing with at least one laser source that can be manipulated in direction and operation to each project a laser beam to produce a laser spot on a surface, such as a poultry pen floor. FIG. 1B is a diagrammatic perspective depiction of a plurality of the devices of FIG. 1A installed to project lasers to a plurality of different poultry pens according to aspects of the invention. FIG. 2 is a diagrammatic plan view of a poultry pen floor illustrating controlled movement of a laser beam spot across the floor according to aspects of the invention. FIG. 3 is a flow chart of a method of controlling a laser beam spot relative a surface according to aspects of the invention.

Figure 4A:
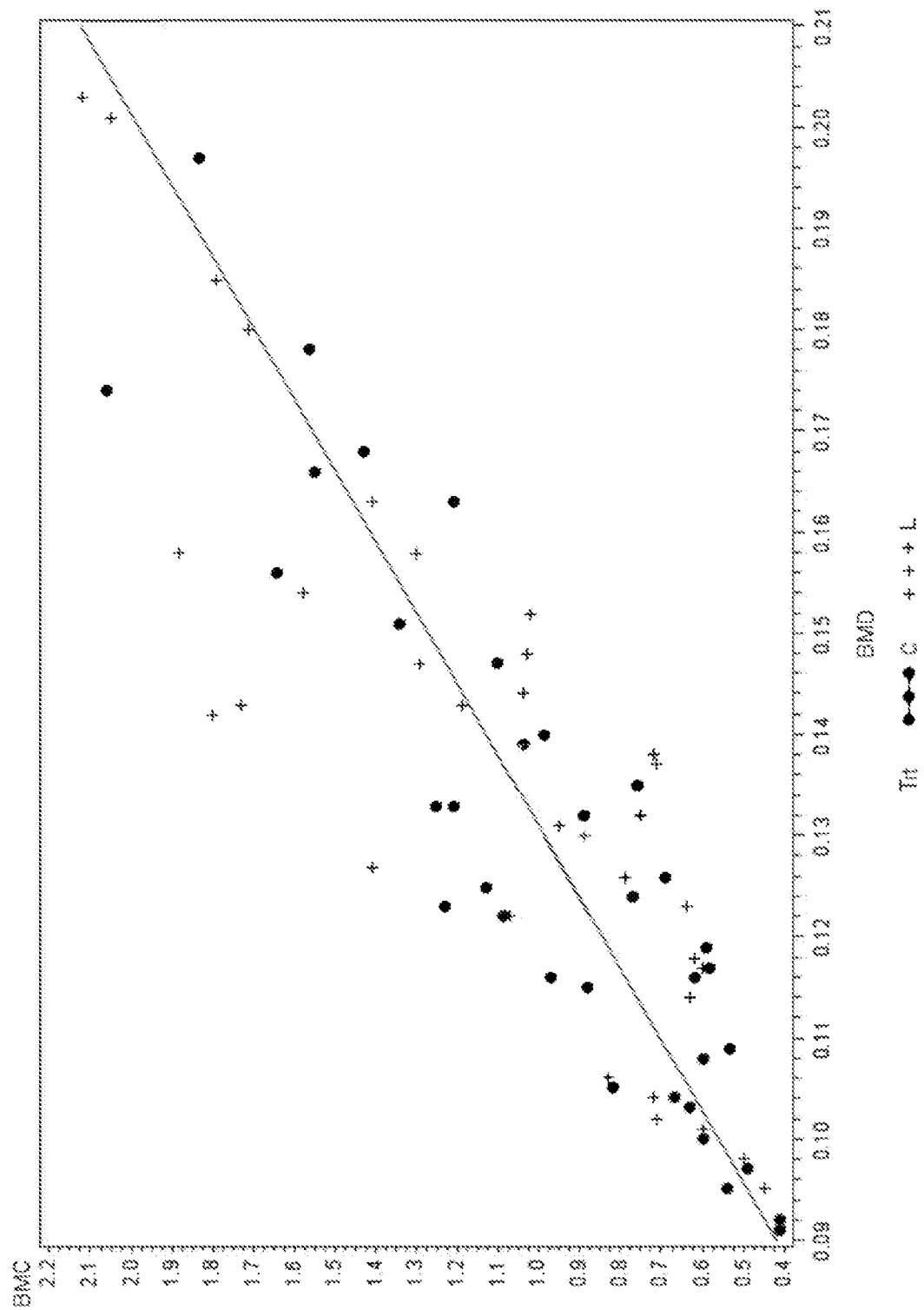
Figure 4B:
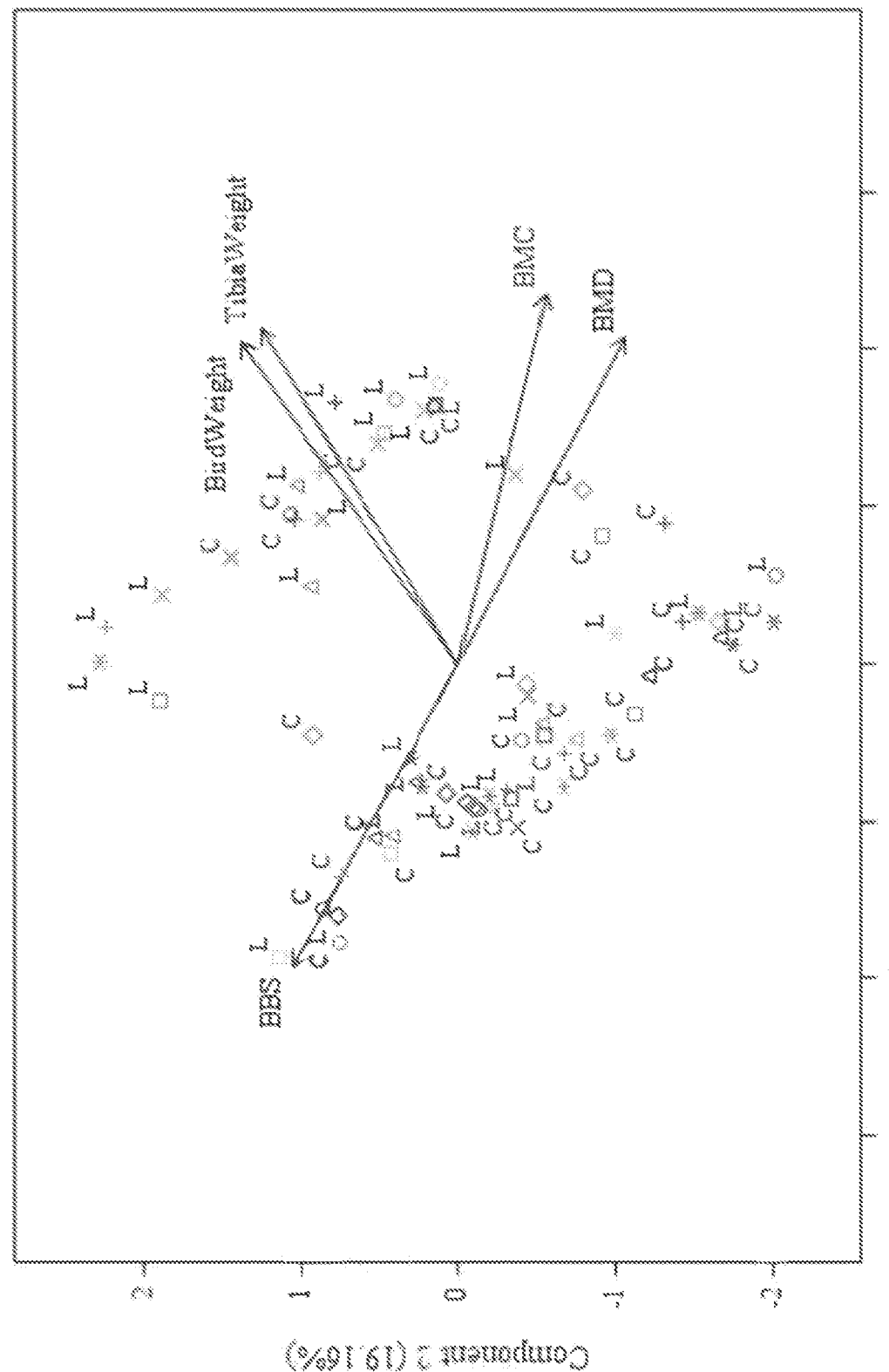

FIGS. 4A and 4B are graphs illustrating experimental efficacy of methodology according to an Example 1 exemplary embodiment of the invention relative to poultry comprising increasing performance of broilers exposed to a regimen according to aspects of the present invention.

Figure 5:
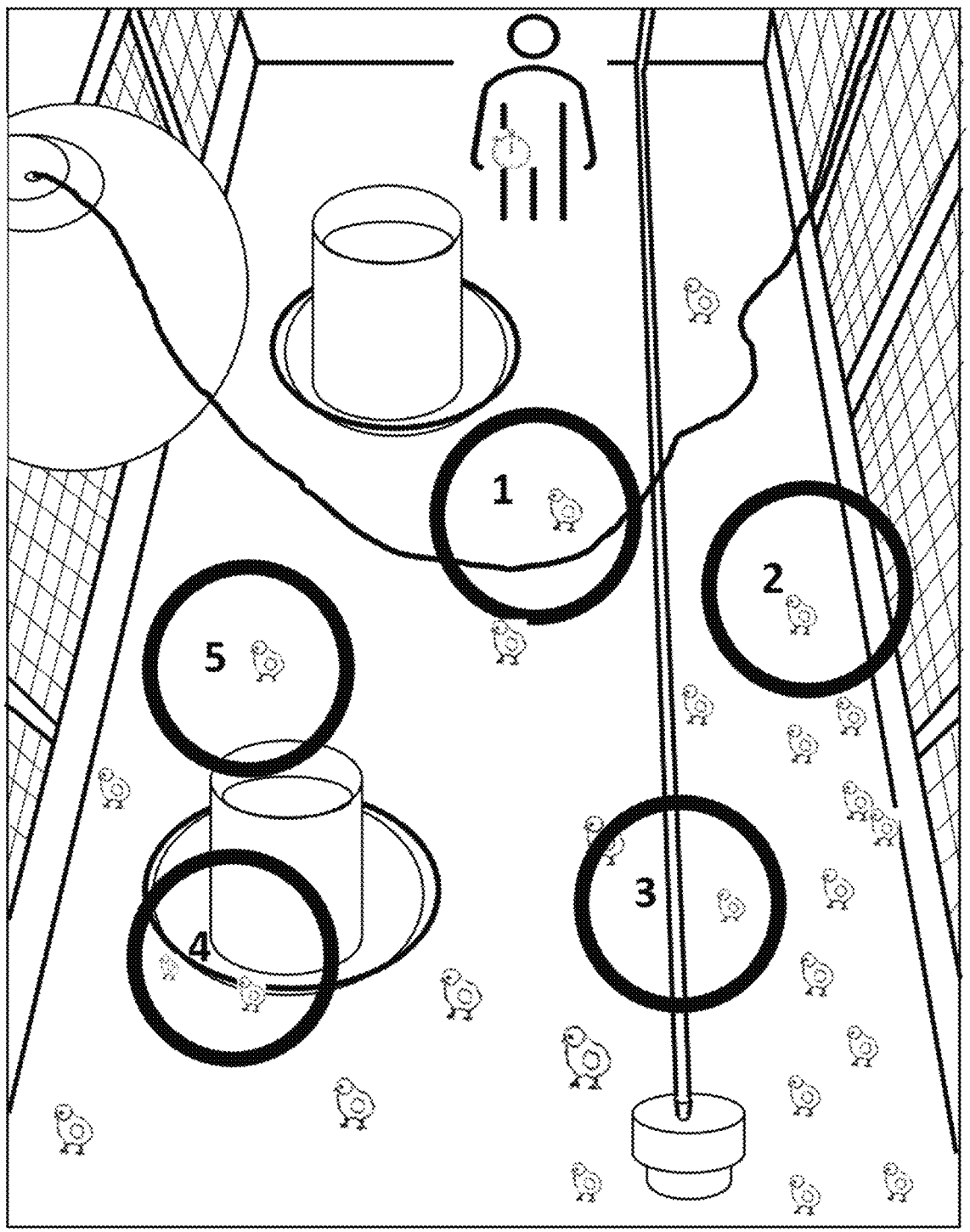

FIG. 5 is a photograph illustrating experimental method related to an Example 2 exemplary embodiment of the invention. In particular, it illustrates a digital human-approach paradigm (HAP) week 1 image used for evaluation. The numbered circles relate to: 1Bird 1: Interacting; Bird 2: Not interacting; Bird 3: At drinker; Bird 4: At feeder; Bird 5: Other.

FIGS. 6A-D, 7A-D, 8A-B, 9A-E, and 10A-E are graphs illustrating efficacy of Example 2 associated with the experimentation method of FIG. 5.

FIGS. 11A-B, 12A-B, 13A-B, and 14A-B are graphs illustrating experimental method and proof of concept from an Example 3 exemplary embodiment according to the invention, in particular, laser following results showing influencing of conspecifics by a subset of poultry following moving light spots.

FIGS. 15-28 are graphs and experimental data illustrating further proof of concepts according to aspects of the invention.

IV. DETAILED DESCRIPTION OF EXEMPLARY EMBODIMENTS OF THE INVENTION

A. Overview

For a better understanding of the invention, a few examples of forms and embodiments the invention can take will now be set forth in detail. It is to be understood these examples are neither inclusive nor exclusive.

For instance, the examples that follow focus on broilers as the species of poultry (birds bred and raised for meat production). However, as will be appreciated, aspects of the invention extend to the raising or maintenance of birds for other purposes, and other poultry species including but not limited to all ages of turkeys, laying hens, pheasants, quail, and other game, fowl, meat, breeding, and production birds, including but not necessarily limited to geese, ducks, pea fowl, and bantams, raised in any type of production method or system, including commercial and backyard non-commercial flock.

Some examples are discussed in the context of two laser beams. As will be appreciated, aspects of the invention can be effective with just one laser beam or more than two. As a practical matter, the system can be scaled up or down but in the context of a 1.2 m×2.4 m pen with approximately thirty birds, two laser spots have been found to be effective. As will be appreciated by those of skill in this technical area, the invention can be applied to a wide variety of environments. This includes but is not limited to different types of enclosures whether pens, cages, or the like, or larger confinements such as barns, buildings, or lots. But it also includes such things as backyards, aviaries, or more open places if there are one or more surfaces upon which a laser beam spot can be projected and visually seen and followed by the relevant birds (e.g. simply a floor or the ground, or even a wall, ramp, or structure).

It will be appreciated by those skilled in this technical art that light spots at least similar to laser spots can be generated with light sources other than lasers. Such light sources either naturally or with optics can be configured to produce substantially collimated beams from the distances discussed herein so that relatively small light spots are produced on a surface. By relatively small it is meant on the order of size of quite small bugs or insects (e.g. on the order of 1 mm in longest dimension) to other bugs, insects, or animals that are of interest as food to poultry (e.g. on the order of 1 mm to 35 mm in longest dimension, and sometimes for some poultry even larger). All of these examples are relatively small in comparison to, for example, spot lights on a surface of the diameter and nature such as discussed in Bizeray, D., Estevez, L. Leterrier, C, & Faure, J. M. Effects of increasing environmental complexity on the physical activity of broiler chickens. *Appl Anim Beh Sci* 79, 27-41. (2002), discussed earlier. Such spot lights are analogous to spot lights used in theatres or arenas to illuminate a substantial area. As such, light spots in these examples of according to invention are not spot lights in the context of Bizerary, et al., *Appl Anim Beh Sci* 79, 27-41. (2002).

It will also be appreciated that at least many of the exemplary embodiments describe movement of the light spots as randomized. This is in the ordinary meaning of the term as such movement is not completely deterministic. Thus, as in its ordinary meaning, it can include one or more randomized parameter variations in the variation of aiming directions of a beam that produces a light spot on a surface near the relevant poultry. The extent of randomization can vary. As such, the term randomized includes completely random, quasi-random, and pseudorandom, all of which are considered randomized because they exhibit some level of statistical randomness even though the latter two species may have some aspect or variable created by a deterministic algorithm. In some embodiments, this randomized movement emulates the unpredictable movement of a bug or insect crawling on the ground. It can vary in speed, direction, and starts-stops over time. Its movement cannot be predicted in advance given available information. As is known to those skilled in this technical field, control of actuators that can change aiming direction of a light source's beam can be randomized by an algorithm or control process that instructs the actuator as to its movement. This can be done in a variety of ways.

It will be understood by those skilled in this technical field that a number of variations are possible to practice the general aspects of the invention, and that such variations are a part of the invention.

B. Generalized Examples

1. Apparatus

As indicated above, at a general level (as diagrammatically illustrated at FIG. 1A), one way an apparatus (indicated generally at ref. no. 10) according to aspects of the invention can be practiced is as a combination of the following components: (a) one or more light sources 20 (e.g. laser sources or other), (b) an actuator or actuators 22 that can automatically control aiming direction of the beam of each light source relative a reference direction to produce a light spot on a surface at or about poultry; and (c) a controller or control circuit 24 that provides motion-control instructions to the actuators in a regimen that is correlated to efficacy of one or more of the benefits discussed herein relative to poultry health, welfare, or commercial value. In one example, there are plural laser sources, each driven according to a pre-determined aiming direction relative to time, speed of movement, and direction of movement.

A specific regimen is discussed in the specific example below. The apparatus facilitates a practical device to accomplish the same for producers. The system provides a combination of components to efficaciously accomplish one or more objects of the invention.

As a general matter, one or more lasers can be mounted in association with some sort of actuation device having motion control that can adjust the lasers aiming direction relative to the floor or other projection surface. As such, the specifics can take many different forms or embodiments. Specifics regarding lasers or other light sources, and actuators, as well as mounting structures or housing will be set forth in additional non-limiting examples below. Some sort of control component would allow automation of on and off times for the lasers, randomized adjustment of aiming directions, and other operating parameters.

The foundational concept is an apparatus that would be effective to project light beams to create light spots that randomly move around the floor of the pen or other surface in the presence of one or more poultry at predetermined times.

2. Method

As indicated above (with further reference to FIGS. 2 and 3), a methodology of promoting one or more of the benefits discussed herein is now discussed. At a general level, a laser or other light source is automatically controlled to project its beam to a poultry enclosure floor or other surface at or near poultry to produce a light spot on the surface, and then move the light spot around the floor or surface in a randomized fashion.

As diagrammatically indicated at FIG. 2, in one example, the laser source can be controlled so that the projected beam spot 21 on a pen floor moves in different directions across at least part of the floor. The spot can vary in direction, speed, start/stop, or in any fashion desired by the designer of the system. The path of FIG. 2 is shown to suggest such variable, but the actual path can vary. It is not necessary that the path be linear segments. They could be changed in non-linear ways. In some embodiments, the laser spot can be projected onto non-horizontal surface (e.g. walls, objects, containment screens, cages, feeders, watering systems, or netting, etc.). Other light sources that produce a similar light spot are possible.

At a general level, the method comprises automatically presenting to growing, at maintenance, or breeding poultry for pre-determined repeated session times each time period (e.g. day), randomized moving light spots at or near the poultry from spatially and temporarily controllable light sources (FIG. 3). The spot movement promotes one or more benefits to poultry or the poultry producer outlined herein as shown to be efficacious by experimental data by, e.g., programming an actuator to start to move the spot(s) and then, over a selected time period, change direction of movement and stop/restart movement in a randomized fashion. As such, the spot movement is controlled in the sense that a mechanical or electro-mechanical force changes the optical axis of each light beam over time. But it is randomized in several possible ways. For example, the control can be intentionally other than linear or fully deterministic in terms of direction, speed, or movement. As indicated at the non-limited example of FIG. 2, spot movement could vary in one, more than one, or all of those senses. Another example is that the control could be other than repetitive. By techniques known by those skilled in the art, any of starting point, direction, speed, movement, and ending point could be continuously varied over a single session or between sessions. In the extreme sense of the term, control could be fully random. For example, control signals or instructions that cause change in laser beam aiming direction could be intentionally varied in a randomized fashion. This is, for example, possible such as with random number generators as one of the control inputs to a digitally controlled actuator.

A specific spot movement regimen is discussed in the specific non-limiting example below but can be varied according to need or desire of the designer. It is to be understood that method efficacy does not require all possible benefits or goals be achieved, but that one or more can be.

As indicated above, a method according to the invention promotes various benefits to raising poultry in an enclosure or on a surface by presenting to poultry the randomized light spot movement on the surface (e.g. floor, walls, or feeding/watering system) at predetermined times. The spots (sometimes herein also called dots) are designed to draw the attention of poultry. In one embodiment of the invention, the randomized movement is intended to emulate movement of insects. In others it is to simply promote the birds to follow the dots as they move. In another, it is to promote some trained response from the poultry. In another, it is to promote movement in a minority of the birds that influences conspecifics to move.

In one example, a feeding station in an enclosure is accessible by all the birds. Each light spot movement session begins with randomized movement away from the feeding station but eventual migration towards the feeding station. This combined system promotes bird training to follow the dots to promote the benefits that follow from the same.

A system according to one specific aspect of the invention includes a pair of 1.2×2.4 meter (m) poultry pens 1, 2, . . . , n and floors of each. It is to be understood that this pen-size is but one example only, and that typically production enclosures are much larger. One example would be a building or an area of a building on the order of ~12-15 m wide and ~122-183 m long. Another example would be a circular building or area of ten or more meters in diameter. Other examples are lots having areas of ten or more meters in length and width. To the extent this description refers to pens on the order of ~1.2×2.4 m, it is by example only, and the reader will understand that the concepts of invention can be applied in analogous ways to other enclosures or areas for poultry, both larger and smaller. Similarly, the system can be scaled up or down not only in size or area for the one or more groups of poultry to move, but also in the number of lasers or other beam-producing sources to service such different sized areas. For example, the invention pertains to a single laser or other beam source for a relatively small (several feet by several feet) area all the way to a plurality of lasers or other beam sources effective to service a plurality of different areas or substantially large (e.g. hundreds of feet by hundreds of feet) areas.

Housing 12 (FIG. 1A) can be a sheet metal enclosure. But as can be appreciated this is a non-limiting example only. The housing can take many configurations and be made of many materials that are durable and washable for the intended uses discussed herein. Plastic is another non-limiting example. A lens which is transparent to the laser beam(s) (reference numeral 13) can cover the beam exit side of the housing to enclose it and protect it from the elements. Electrical power can be through a conventional electrical cord to an electrical power source.

By reference to FIG. 2, one non-limiting illustration of sequential randomized laser or other light spot movement relative the floor of a pen is shown. In this example, at least one original light dot starts out towards the outer margin of each pen and away from a food source at a starting time to an ending time of a predetermined period for the randomized dots (see starting point in upper left corner of FIG. 2). Movement of the dot from the original starting point through subsequent times follows a randomized movement and migration towards the feed source (see arrowed path from upper left corner to lower bottom of FIG. 2). Of course, the movement patterns can vary and do not always include starting at the outward aspect of the enclosure and may not move towards feed or water sources. Importantly, the movement, path, speed, spot characteristics can vary according to need or desire of the designer. FIG. 2 is but one non-limiting example.

One example of how a designer could program spot movement would be emulation of random insect movement. By empirical methods, the designer could watch actual such insects or video of the same, and emulate starts/stops, path, speed, etc. For example (for at least some insects) every fraction of a second there could be a fraction of an inch (or just several cms) movement that changes direction, starts/stops, or otherwise is designed to emulate a relevant insect. That direction can even cross back over its former path, remain in one spot for a period of time, or follow any random pattern. Parameters related to speed, direction, and time can be manipulated or even changed from session to session. They can vary over a single session. In other words, part of the randomized motion could be change in speeds along with change in direction during single or multiple sessions. On the other hand, however, it is possible for the designer to invent a spot movement based on criteria of the designer's choosing.

Further, a methodology according to one aspect of the invention can include mounting the laser or other beam source unit in a manner allowing the beam movement range and aiming direction to cover at least a substantial part of the floor or surface. Pre-programming regarding predetermined periods scheduled during the day for light spot sessions can be selected. Days may even be skipped. In one non-limiting exemplary embodiment, four different sessions of four-minutes each during a 24-hour day are automatically instigated by the circuit. This means those four-minute sessions will be at spaced apart 6-hour periods. As will be appreciated, during each four minute session, speed, direction, and timing of change of direction can be predetermined. In an alternative fashion, the programming might essentially change any or all of those parameters from session to session so that the birds in the pen will not be trained for one pattern repeated over and over.

3. System

As indicated at FIG. 1B, a system can use one or more of the above-described apparatus such as apparatus 10A-n for a regimen of operation according to the methodology of promoting one or more of the benefits discussed herein. This could involve one integrated housing 12 of one or more laser or other beam sources 20 with actuator(s) 22 (see FIG. 1A), or a plurality of such housings 12 distributed around one or more poultry raising buildings 30. Each building could have one or more poultry enclosures to segregate sub-sets of poultry (one non-limiting example being the pens discussed above). A controller 24 can be included at each housing 12. Alternatively, one controller 24 may be able to instruct more than one set of laser sources 20.

Therefore, benefits to poultry and/or producer can be leveraged by practicing the method with many birds. The system can be retrofitted to existing poultry-raising facilities or installed as original equipment. The mounting can be above the floor, which provides added benefits of avoiding structures that inhibit poultry or human movement or the risk of pathogenic issues with added structures on the floor or in direct contact with poultry.

A system according to the present invention can include the lasers, the actuators, the controller, a mounting structure to elevate the same above a poultry enclosure or projection surface at or near the poultry, and optionally, if part of the methodology, a feeding station.

C. Specific Examples of Exemplary Embodiments

A specific example of an apparatus according to the general apparatus and method and system of FIGS. 1A-B, 2, and 3 is now described.

1. Apparatus

With reference to FIGS. 1A-B, 2 and 3, in a specific embodiment a device 10 according to the invention could include a housing 12 (e.g. sheet metal) of 20.32 cm×20.32 cm×20.32 cm or so in width, height, and depth. It can be essentially box-type form factor (as shown) with one side open (which could optionally be covered by a light transmissive lens 13, e.g., glass or plastic). A mounting interface (e.g. sheet metal flanges or brackets 16, or other) can be designed to allow mounting of housing 12 to, e.g., ceiling beams, floor posts, or enclosure frame) above the floor. This could be nails, screws, bolts, or other techniques sufficient to support the weight of device 10. An electrical cord 18 can extend out of housing 12 for operative connection to an electrical power source (e.g. household or commercial electric service, or locally generated source). But as will be appreciated, the housing can take on a number of different form factors and sizes depending on the designer's needs or desires and the particular application it is put to. The apparatus design can vary according to the designer's need or desire. There may be benefits to mounting the apparatus on a ceiling or wall as opposed to a dedicated framework for elevating the apparatus. The apparatus can be mounted to any sufficient supporting structure at or near the surface to which the laser spots are to be projected.

One or more laser beam sources 20 are mounted inside housing 12. An actuator or actuators 22 are operatively associated with the laser sources 20 in a manner that the beam-aiming axis from each laser extends out of lens 13 but can be adjusted by the actuator(s) relative to a reference axis out of the lens 13. A control circuit or controller 24 can also be inside housing 12 (to protect it from environmental conditions including moisture, dust, and debris) and be configured to instruct actuator(s) 22 to change the direction of aiming axis of each laser source 20 during a time session. It is to be understood that the control circuit or controller 24 alternatively could be mounted outside housing 12 for easy access such as reprogramming. Some type of mounting structure or bracket(s) 16 can be associated with housing 12 to allow it to be easily mounted above an enclosure floor. The result of projection of laser beams from laser sources 20 is a laser spot 21 on the floor.

Specific commercially available examples of certain of the foregoing components are set forth below. It is be understood that these are non-limiting examples. It will be understood that variations and substitutions are possible according to designer's need or desire.

TABLE C1

| Component | Model No. | Manufacturer name/address |
|---|---|---|
| Laser source 20 | FH0054 Focusable 650 nm 5mW 3-5V red laser "dot" module diode w/driver plastic lens with clamshell packing (2 pack) | Farhop, Temple Terrace, FL (USA) |
| Actuator 22 | 2 DOF Pan & Tilt with Mg 995 Servos Sensor Mount for Arduino Robot Set Car Plane DIY with Mallofusa Cable Tie | Mallofusa |
| Controller 24 | Uno R3 microcontroller A000066 | Arduino |

The foregoing combination of components results in an apparatus 10 of relatively low total weight (e.g. in the range of no more than a few kilograms) so that each would be easy to elevate and mount.

The manner in which laser source 20 is mounted to an actuator 24, and then the actuator is instructed to automatically vary the aiming direction of the laser source to cause the movement of a laser spot on a floor, can be as set forth below.

By reference to the table above and the table below, the following partial parts list will be used to describe one implementation of the system. Those skilled in the art will be able to assemble and operate these components according to the descriptions herein.

TABLE C2

| Part description | Specific name for order | Quantity |
|---|---|---|
| 2 pack laser dot diode with lens | Farhop focusable 650 nm 5 mW 3-5V Red Laser "Dot" module diode (see above) w/driverplastic lens with clamshell packaging | 1 |
| Power adapter for Arduino Uno | Sunfounder DC 9V/650 mA Powerplug Adapter for Arduino Uno, R3 Mega 2560/1280 (~1 meter) | 1 |
| Pan & tilt motor | Mallofusa 2DOF (see above) DIY with Mallofusa Cable Tie | 2 |
| Mini laser dot diode head | Geebat 10 pcs mini laser dot diode module head red 650 nm 6 mm 5 V 5 mV diode | 1 |
| 3 way plug-in jumper wires | 3 way socket Haitronic 120 pcs 20 cm length JumperWires/DuPont cable multicolored 40 pin M to F, 40 | 1 |
| Arduino Uno | Arduino Uno R3 microcontroller A000066 | 1 |
| extension cord | Slimline 2241 Flat plug extension cord, 3 wire, 2.4 m., white | 1 |
| wall power adapter | iMBA Price 5 V DC Wall power adapter UL listed power supply (1.5 m., 5 V 2 A (2000 mA)) | 2 |
| aluminum mount | AixiZ aluminum mount & heat sink for 12 mm modules | 2 |
| Timer | With 3-prong outlet for appliances, energy saving timer, 15 A/1800 W | 1 |
| Box | Grainger Enclosures, Metallic, 20 cm H × 20 cm W × 20 cm D | 1 |

As will be appreciated by those skilled in this technical area, one way to implement the system is:

a. Mount the two Farhop red lasers to the two-degree freedom of movement (2 DOF) end of the Mallofusa pan & tilt actuator. This can include encasing each Farhop laser in an AixiZ mount and heat sink for heat management during laser operation.

b. Mount the double laser/pan & tilt actuator into the Grainer Enclosure box so that the laser aiming axes extend out of the open side over a desired range of movement.

c. Install the Arduino controller into the enclosure and set it up for programming and operation. This would include use of the Sunfounder DC power adapter, 3 way plug-in, Slimline extension cord to a power outlet, and the iMBA Priced wall power adapter. One skilled in the art would know how to configure to provide electrical power to all needed components in the enclosure (e.g. lasers, pa/tile actuator, and controller at the needed operational electrical power type and levels.

d. Connect and program the Arduino controller to instruct motion-control of the pan/tilt motors according to the randomized spot movement desired. This would include using the GenBasic jumper wires, Haitronic jumper wires, and any other needed components such as would be understood by those skilled in this technical area. The programming would include an output from the Arduino controller to the pan & tilt motors to effectuate the desired laser spot movement relative a surface to which the Farhop lasers are to be projected.

e. The programmable plug-in digital timer would be used here to start and stop operation of each laser spot random movement session. It can be easily programmed to start and stop electrical power to the system according to such a schedule. One non-limiting schedule is the 4 minute laser spot movement session once every 4 hours each day, as further discussed herein.

f. The assembled system can be mounted by appropriate fasteners and brackets in an elevated position relative to the desired area for the laser spot movement sessions. As will be appreciated, the tables above indicate to one skilled in the art other conventional components or techniques one could use when assembling and initiating the system.

It is to be understood and will be appreciated by those skilled in this technical area, that the foregoing is but one non-limiting example. Variations obvious to those skilled in this technical field are included.

2. Method

Several methods according to the invention will be discussed in detail later, including in the proof of concept section. It is to be understood that variations are possible according to a designer's need or desire.

Some possible pertinent parameters for the designer of such systems are set forth the table below. Those skilled in the art will appreciate that a range of values of each parameter is possible.

TABLE C3

| Parameter | Range or details |
|---|---|
| Laser beam spot 21 size | several mm dia. |
| Laser spot 21 color | ~At least color associated with visible frequency but is not limited thereto. |
| Laser spot 21 speed | ~0 to 5 cm/sec. |
| Laser spot 21 path | Randomized (efficacious for benefits of experimental results) |
| Laser spot 21 session time | ~0.5-6 mins/session |
| Number of sessions per day | 0-10 sessions/day |

In one specific non-limiting example, during one session the parameters could follow the following pattern:
1. Relatively constant speed while moving but could randomly vary within a range;
2. Randomized direction changes.
3. Intermittent starts/stops.

In the foregoing example, the laser could have the following non-limiting characteristics:
1. Red (650 nm central frequency)
2. Spot size of 2 mm diameter.

Of course, these characteristics can be varied according to need or desire.

3. System

As indicated above, and as intimated by FIG. 1B, in a multiple pen facility, other confinement, or non-confinement husbandry setup, one apparatus can be used per pen, but as shown, could be shared by plural pens (e.g. at least 2 pens). This presents economic benefits to the producer; including in capital costs, installation, and operation. As will be appreciated, because projected light beams are used, each apparatus is not constrained to a single pen.

But, further, plural apparatus 10A-n can be mounted in a facility having many pens. In this specific example, each apparatus 10 services two pens, which can reduce expenses by 50% over having one apparatus per pen. This includes cost of the apparatus 10, but also installation, electrical operating costs, and maintenance and repair and replacement over time.

It is again pointed out that the randomized laser spot sessions could be applied to other environments than these pens, including but not limited to, larger and different sized pens or enclosures and even indoors or outdoors general areas, aviaries, and other locations or set-ups. The designer would select the number and types of lasers, the types of laser movement and characteristics, and placement of the lasers. These could vary depending on application, including type of poultry and goals of the enrichment.

As will be appreciated, the following sections provides further details about exemplary structure and operation according to one or more aspects of the invention, as well as results of experiments that demonstrate efficacy.

D. Specific Example 1 (Relative to Performance of Broiler Chickens Without Sacrificing Well-Being or Environmental Qualities)

For further understanding of the invention and its aspects, below is an application of concepts according to the invention to a particular species of poultry, namely broilers, which, as is well known by those skilled in this technical art, are chicken bred and raise specifically for meat production.

This description is from M Meyer, A K Johnson, E A Bobeck, A novel environmental enrichment device improved broiler performance without sacrificing bird physiological or environmental quality measures, *Poultry Science*, Volume 98, Issue 11, November 2019, Pages 5247-5256, https://doi.org/10.3382/ps/pez417 Published: 30 Jul. 2019, which is incorporated by reference herein in its entirety. Exemplary embodiments of apparatus, systems, and methods according to the invention are described in detail. Proof of concept evidence is also included. Again, however, this is a non-limiting example of the invention. This will help the reader further understand objects of the invention by the details of this specific example and context.

A Novel Environmental Enrichment Device Improved Broiler Performance without Sacrificing Bird Physiological or Environmental Quality-Measures ABSTRACT Modern commercial broilers have been genetically selected for fast growth and heavy breast muscling, contributing to a top-heavy phenotype and increased leg lameness. A quick-growing phenotype coupled with poor leg health fosters inactivity. The objective of this study was to stimulate broiler movement using novel environmental enrichment and determine the impact of movement on production, leg health, and environmental parameters. A total of 1,200 Ross 308 broilers were housed in 40 pens with 30 birds/pen for 6 wk in 2 separate rooms (laser enrichment or control). Each enrichment device was mounted above 2 adjoining pens, projected 2 independent, randomly moving laser beams at the floor to stimulate innate predatory behavior, and was active 4 times daily in 4-min periods. Performance outcomes were calculated by pen and averaged per bird for each performance period and overall days 0 to 42. A total of 70 randomly selected focal birds were examined for breast blisters and footpad dermatitis each week and euthanized on day 42 for tibia quality measures. Air quality and litter moisture were sampled by week. Laser-enriched pens had greater average bird feed intake in starter ($P<0.001$), grower ($P=0.004$), finisher periods ($P=0.004$), and overall days 0 to 42 (0.19 kg/bird; $P=0.0003$). Average bird weight gain was also increased in enriched pens in each performance period: starter ($P=0.043$), grower ($P=0.001$), finisher ($P<0.001$), and overall days 0 to 42 (0.24 kg/bird; $P<0.001$). Enriched pens had improved feed conversion ratio (FCR) vs. control with a decrease of 3 FCR points in the grower ($P=0.031$), 18 points in the finisher ($P<0.001$), and 7 points overall ($P<0.001$). Enriched pens had higher ADG during starter ($P=0.048$), finisher ($P<0.001$), and overall (5.7 g/bird/d; $P<0.001$). No differences were found in breast blister, footpad dermatitis, tibia, air, or litter quality measures ($P>0.05$). In summary, a novel enrichment device based on bird visual feeding and predatory instincts positively affected performance through decreased FCR and increased ADG without sacrificing external animal-based measures, tibia quality, or air or litter quality.

1. INTRODUCTION

Due to intense genetic selection, modern broilers weigh 4 to 5 times more than broiler lines from the 1950s at the same timepoints, and are 2 to 3 times more feed-efficient (Havenstein et al., 2003; Zuidhof et al., 2014). However, this selection for increased growth rate has contributed to up to 30% of modern commercial broilers being affected by leg lameness or poor locomotion (Knowles et al., 2008; Bassler et al., 2013). Lame-ness leads to increased time spent lying down, which in turn increases litter contact and could result in a higher breast blister occurrence and contact dermatitis (Weeks et al., 2000; Nääs et al., 2009; Bassler et al., 2013). Furthermore, a lack of activity compounds lame-ness by negatively affecting bone strength, mass, and ability to bear weight properly (Lanyon, 1993; Rath et al., 2000). Contact dermatitis-driven tissue damage may be caused by urea in the litter generating ammonia, creating a chemical burn effect and is likely painful. The prevalence of this issue; affecting 21.87% of Ross 308 broilers in a recent year-long study, may be reflective of air and litter quality in the house (Haslam et al., 2006; Dinev et al., 2019). The National Chicken Council (NCC, 2017) Animal Welfare Guidelines and Audit Checklist for Broilers require that ammonia in the air never exceeds 25 ppm at bird height, and litter must be evaluated for friability and moisture.

Severe lameness hinders birds from accessing feed and water, and negatively impacts the industry economically, necessitating up to 2% culls in a $30 billion industry (Dunkley, 2007; USDA, 2017). In addition, studies have reported that broilers with severe leg lameness eat more analgesic-containing feed than healthy birds, and birds fed an analgesic diet showed improved speed of walking, indicating relief from pain and discomfort caused by leg abnormalities (McGeown et al., 1999; Danbury et al., 2000). The 2017 NCC broiler audit guidelines have recognized lameness as a detrimental welfare issue and recommend gait scoring 100 birds per flock to evaluate leg health within 1 wk of slaughter, and footpad scoring 200 paws at slaughter.

Past research in laying hens has shown that restricting exercise had a clear, negative impact on bird skeletal health (Shipov et al., 2010), and work in broilers has shown that motivating physical activity increased tibia strength and decreased lameness (Reiter and Bessei, 2009). Prayitno et al. (1997) concluded that activity driven by red light, early and late in the rearing period, improved locomotion compared to a blue light treatment where broilers were less active. Birds are visual feeders and prefer red and orange colors over green and blue (Ham and Osorio, 2007). Bizeray et al. (2002) studied the effects of red, blue, green, and yellow spot-lights moving across the floor but did not see a change in broiler physical activity, and the authors concluded that that the spotlights moved too quickly. Baxter and others (2019) implemented perches and dust baths but did not see an effect of enrichment on foraging, play, or activity, nor, in a separate paper published on the same study, leg health (Bailie et al., 2018). Platform use by broilers in Norring et al. (2016) likewise did not increase overall activity. A study by Jordan et al. (2011) showed that broiler activity and foraging was increased by scattering feed in the litter, but broilers in the enriched treatment had 13% lower weights at harvest.

Certainly, some forms of environmental enrichment have been shown to improve broiler welfare outcomes, as in Ventura et al. (2012), where barrier perches stimulated natural perching behavior and reduced aggressive interaction and rest disturbances compared to the control. Recent work by BenSassi et al. (2019) showed that increasing environmental complexity was associated with fewer skin concerns, lower mortality, fewer underweight birds, a lower overall rejection rate at har-vest, and less welfare problems overall. However, an enrichment option designed to motivate broiler activity and improve physical and performance outcomes is still lacking in the published literature. Thus, we developed a novel form of environmental enrichment de-signed to motivate physical movement through visual stimulation. The objectives of this work were to deter-mine the impact on bird physiology (leg lameness and footpad and breast condition), performance; and environment (air and litter quality).

2. MATERIALS AND METHODS

All live bird procedures were approved by the Iowa State University Institutional Animal Care and Use Committee.

a. Animals

A total of 1,260 straight-run Ross 308 broiler chicks (day of hatch; BW 47.38±0.14 g) were obtained from a commercial hatchery and transported to the Poultry Research and Teaching Unit at Iowa State University (International Poultry Breeders Hatchery, Bancroft, IA). A total of 1,200 broiler chicks were randomly assigned to treatment groups and the remainder were culled. A subset of 70 birds were randomly assigned upon arrival as focal birds, identified with wing bands, and marked with unique animal-safe food coloring (red, blue, green, purple, and black; Wilton, Woodridge, IL). Half of the focal birds were assigned to laser-enriched pens, and half were assigned to control pens (n=5 focal birds/pen in 14 pens). Food coloring was applied to a cotton ball, rubbed on the back of the chick's head and neck, and reapplied on an as-needed basis throughout the trial.

b. Housing and Feeding

Birds were housed in 40 floor pens (30 birds/pen) measuring 1.22 by 2.44 m across 2 rooms in the barn (20 pens/room). One room contained 20 enriched pens (exposed to laser device), and the other contained 20 control pens, with an anteroom separating the two so no crossover of enrichment device was possible. Ap-proximately 10-cm-deep fresh wood shavings provided bedding over the solid concrete floor, and polyvinyl chloride pipe dividers with mesh walls (1.22 m height) separated pens. High and low temperatures and humidity were monitored daily in the enriched and control rooms of the barn. Average temperatures are listed from the starter, grower, and finisher periods respectively from the enriched room: 85.47, 77.39, and 71.71° F., and the control room: 85.53, 77.46, and 71.50° F. Average relative humidity is listed from the starter, grower, and finisher periods respectively from the enriched room: 23.86, 27.21, and 33.93%, and the control room of the barn: 19.89, 23.93, and 27.75%.

Birds were gradually adjusted from 24 h light on days 0 to 7 (30 to 40 lux) to 20 h light (20 to 30 lux) from days 8 to 42. Chicks were brooded with 2 heat lamps/pen (22.9 cm reflectors with porcelain socket) using 125-W heat bulbs (Sylvania, Wilmington, MA) for the first week. Birds were fed an ad libitum diet formulated for Ross 308 commercial recommendations (Table D1) out of a hanging chicken feeder (BRHF151, Brower Equipment, Houghton, IA) gradually raised to accommodate bird height. Water was provided ad libitum from a hanging nipple water line (8 nipples/pen).

c. Laser Enrichment Device

A total of 10 laser enrichment devices designed and built specifically for this research were affixed over 20 pens in 1 room of the broiler barn. Each device was de-signed and calibrated to cover 2 adjoining pens. The enrichment device consisted of 2 independent red 650 nm lasers contained within a 20.5 by 20.5 cm metal box with a glass bottom mounted on a custom-designed structure made of 3 wooden beams (2.4 m height) raised above the pens. The lasers projected in the direction of the pen floor and moved in a random pattern at a variable speed between 7.6 and 30.5 cm/s for 4-min "laser periods": 05:30 to 05:34, 11:30 to 11:34, 17:30 to 17:34, and 23:30 to 23:34 daily for the entire trial period. Over-head snapshots of the activated laser in the pens were taken for evaluation for days 2, 16, 30, and 37. As this device was novel, and there is no ex-planation of broiler attention span in the current literature, the 4-min length of laser periods was tested with the knowledge that it would need to be validated and may need fine-tuning in future studies. The decision to expose broilers to laser periods 4 times/d was based off work by Jones et at (2000), which showed that laying hens exposed to environmental enrichment in the form of strings for limited daily time periods (10 min), rather than constant exposure, maintained interest in pecking the strings for 14 wk.

TABLE D1

Starter, grower, and finisher diets provided ad libitum to Ross 308 broilers.

| Ingredients[2] | Starter | Grower | Finisher |
| --- | --- | --- | --- |
| Corn (%) | 55.32 | 58.69 | 62.78 |
| Soybean meal (%) | 37.15 | 33.40 | 28.59 |

TABLE D1-continued

Starter, grower, and finisher diets provided ad libitum to Ross 308 broilers.

| Ingredients[2] | Starter | Grower | Finisher |
|---|---|---|---|
| Soy oil (%) | 2.02 | 2.98 | 3.97 |
| Salt (%) | 0.40 | 0.40 | 0.40 |
| DL-Methionine (%) | 0.33 | 0.30 | 0.27 |
| Lysine HCl (%) | 0.25 | 0.23 | 0.21 |
| Threonine (%) | 0.15 | 0.15 | 0.15 |
| Limestone (%) | 1.30 | 1.01 | 1.00 |
| Dicalcium phosphate (%) | 2.05 | 1.81 | 1.60 |
| Choline chloride 60 (%) | 0.40 | 0.40 | 0.40 |
| Vitamin premix[1] (%) | 0.63 | 0.63 | 0.63 |
| Calculated values | | | |
| Crude protein (%) | 23.05 | 21.50 | 19.50 |
| ME (kcal./kg) | 3,000 | 3,100 | 3,200 |
| Fat (%) | 4.59 | 5.59 | 6.64 |
| Digestible lysine (%) | 1.30 | 1.19 | 1.06 |
| Digestible threonine (%) | 0.92 | 0.87 | 0.80 |
| Digestible arginine (%) | 1.39 | 1.28 | 1.14 |
| Analyzed values (as fed) | | | |
| Dry matter (%) | 89.40 | 89.81 | 89.23 |
| Crude fat (%) | 6.42 | 7.63 | 8.74 |
| Crude protein (%) | 24.17 | 21.66 | 19.89 |

Each diet was fed for 14 D: starter diet weeks 0-2, grower weeks 2-4, and finisher weeks 4-6.
Analyzed values are presented on as as-fed basis.
[1]Vitamin and mineral premix provided per kg of diet: selenium 200 µg; vitamin A 6,600 IU; vitamin $D_3$ 2,200 IU; vitamin E 14.3 IU; menadione 880 µg; vitamin $B_{12}$ 9.4 µg, biotin 33 ug; choline 358 mg; folic acid 1.1 mg; niacin 33 mg; pantothenic acid 8.8 mg; pyridoxine 880 µg; riboflavin 4.4 mg; thiamine 1.1 mg; iron 226 mg; magnesium 100 mg; manganese 220 mg; zinc 220 mg; copper 22 mg; iodine 675 µg.
[2]Calculated according to NRC (1994).

d. Performance

The 6-wk trial was separated into a starter, grower, and finisher period that were 2 wk in length. All birds in each pen were weighed as a group, and then focal birds were weighed individually at the start of each period to determine weight gain. Feed disappearance/intake (FI) was recorded throughout. Feed conversion ratio (FCR) and ADG were calculated by pen and averaged by number of birds in the pen.

e. Breast Blisters and Footpad Dermatitis

Focal birds were examined the same day each week of the trial by the same researcher, on a different day than birds were weighed, in their home pens for breast blisters and footpad dermatitis, with all birds examined on day 42. Both examinations took place at the same day and time each week and were done by the same re-searcher. Footpad dermatitis was scored pass/fail using the American Association of Avian Pathologists Paw Scoring system (2015), where a normal yellow color or slight discoloration with hyperkeratosis on an area less than ½ of the footpad was scored a pass, and erosions, ulcerations, scabs, hemorrhages, or swelling on an area greater than ½ of the footpad was scored a fail. Breast blisters were scored on a present/absent basis based on the methods used by Greene et al. (1985), where blisters were considered present when a blister was equal to or larger than 1.27 $cm^2$, when there were 1 or more breast burns, or when there were scabs on breast skin. A brownish-colored scab would be considered "mild" and an ulcer with black exudates was considered "severe."

f. Tibia Quality

On day 42, focal birds were euthanized using carbon dioxide and the right tibia was collected from each bird and frozen at −20° C. until further analysis. Tibia (n=70) were thawed overnight, weighed, and scanned using dual energy x-ray absorptiometry (DXA, Hologic, Marlborough, MA). The bones were scanned in groups of 7 using the validated "rat whole body scan" protocol for bone mineral density (BMD) and bone mineral content (BMC).

Bone breaking strength of focal bird tibia was measured using the tensile test and compression method on an Instron 3367 Universal Test Machine (Norwood, MA). The machine had a 30 kN load capacity and 2 platons controlled to fracture the bone between them. Each tibia was individually fractured in a plastic bag wrapped in cheesecloth to prevent contamination of the machine or slippage due to the bag. Each tibia was placed on the bottom platon with the lateral/medial condyle end of the bone intentionally placed over the edge, out of reach of the platons, and the bend of the tibia facing down. The test was set up so that the top platon moved vertically downwards towards the bone at a rate of 10 mm/min and a 15% rate of load. The ma-chine was stopped at the distinct rapid decline in force (visualized on the monitor) and simultaneous sound of the bone fracturing. Load (kgf) was recorded at the point of break and divided by area of tibia ($cm^2$, obtained from DXA scanning) to calculate bone breaking strength as per the manufacturer's recommendations (Instron; Norwood).

g. Air and Litter Quality

Ammonia in the air (ppm) was measured at bird height in the front, middle, and back of each room on day/wk for weeks 2-6 with a hand-held ammonia monitor (GasAlert Extreme, BW Technologies, Schaumburg, IL) and ammonia test strips. The ammonia monitor was titrated every 14 D with an ammonia tank and provided an exact value, while the strips pro-vided a range of 5 ppm. Litter quality was analyzed weekly according to the NCC Audit Guidelines. Litter moisture was evaluated in 3 randomly selected pens in the front, middle, and back of each room of the barn. One handful of litter sample was gathered from 3 sections; litter within 15 cm of the water line of each pen was intentionally excluded. Litter quality was scored pass/fail by the same researcher weekly; to pass litter must be "loosely compacted when squeezed in the hand. If the litter remains in a clump when it is squeezed in the hand, it is too wet" (NCC, 2017).

h. Statistical Analysis

In this experimental design, individual control pens (n=20) were considered the experimental units, and laser-enriched pens were analyzed as a group of 2 pens with a shared laser device (n=10). Room within the barn was confounded by laser treatment, and thus was not included in the model, but environmental conditions, management, and feeding were kept as identical as possible between both rooms. All data were analyzed using SAS software version 9.4 (SAS Institute Inc.; 2016). PROC UNIVARIATE was used to assess the distribution of data prior to analysis. Performance and tibia quality data were normally distributed, and hence were analyzed using PROC MIXED, a mixed linear model, with treatment as a main effect. Principal component analysis (PROC PRIN COMP) was used to test for redundancy and correlation within the bone quality measures, and then multidimensional preference analysis (using PROC PRIN QUAL) was performed to visualize the correlation between variables and reduction to 2 components. Air quality measures were analyzed using PROC FREQUENCY and chi square to determine the distribution and association of readings by treatment. For all measures, a value of P 0.05 was considered significant and differences between means were detected using PDIFF.

3. RESULTS a. Performance

All performance measures, including FI, weight gain, FCR, and ADG, were averaged per bird by each 2-wk performance period and overall (days 0 to 42). FI was increased in laser-enriched birds in all periods compared to the control: 4% increase in the starter, P<0.001; 3.1% in the grower, P=0.004; 5.1% in the finisher, P=0.004; and 3.9% overall, P=0.003 (Table D2). Enriched birds had an increased intake of 5.52 kg/pen overall compared to the control (P=0.006). Weight gain was also increased in laser-enriched birds in each performance period when compared to the control: 2.6% in the starter, P=0.043; 5.5% in the grower, P=0.001; 13.8% in the finisher, P<0.001, and 7.9% overall, P<0.001 (Table D2). Enriched pens showed increased gains of 7.19 kg/pen overall compared to the control (P<0.001).

Enriched birds had improved FCRs compared to control birds with a decrease of 3 FCR points in the grower (P=0.031); 18 points in the finisher (P<0.001), and 7 points overall (P<0.001, Table D2). When averaged per bird, laser-enriched bird ADG was increased by 2.9% (P=0.048) in the starter period, 13.2% (P<0.001) in the finisher period, and 7.9% overall (P<0.001, Table D2), and was increased overall on a pen basis when compared to the control (0.17 kg/d; P<0.001).

TABLE D2

Ross 308 straight run broiler[1] performance outcomes including feed intake, weight gain, feed conversion ratio (FCR), and ADG by each 2-wk performance period and overall.

| Performance measure | Control[2] | Laser[3] | Pooled SEM | P-value |
|---|---|---|---|---|
| Feed intake (kg) | | | | |
| Starter | 0.48 | 0.50 | 0.003 | <0.001 |
| Grower | 1.56 | 1.61 | 0.012 | 0.004 |
| Finisher | 2.62 | 2.76 | 0.030 | 0.004 |
| Overall | 4.69 | 4.88 | 0.041 | 0.003 |
| Weight gain (kg) | | | | |
| Starter | 0.37 | 0.38 | 0.004 | 0.043 |
| Grower | 1.04 | 1.10 | 0.013 | 0.001 |
| Finisher | 1.37 | 1.59 | 0.018 | <0.001 |
| Overall | 2.80 | 3.04 | 0.026 | <0.001 |
| FCR[4] | | | | |
| Starter | 1.29 | 1.31 | 0.009 | 0.119 |
| Grower | 1.49 | 1.46 | 0.008 | 0.031 |
| Finisher | 1.92 | 1.74 | 0.024 | <0.001 |
| Overall | 1.68 | 1.61 | 0.010 | <0.001 |
| ADG[5] (kg) | | | | |
| Starter | 0.0265 | 0.0273 | 0.001 | 0.048 |
| Grower | 0.0740 | 0.0756 | 0.001 | 0.390 |
| Finisher | 0.0992 | 0.1143 | 0.001 | <0.001 |
| Overall | 0.0666 | 0.0723 | 0.001 | <0.001 |

Starter period indicates weeks 0-2, grower weeks 2-4, and finisher weeks 4-6.
Values presented as LSMeans (pooled SEM) averaged per bird (apart from FCR) with treatment as the main effect.
[1]Broiler chicks transported from International Poultry Breeders Hatchery (Bancroft, IA) on day of hatch to Iowa State Poultry Research and Teaching Farm: BW 47.38 ± 0.14 g.
[2]Control describes pens not exposed to laser enrichment.
[3]Birds exposed to laser enrichment device.
[4]FCR calculated by dividing kilogram of feed by kilogram of bird weight gain per pen, averaged by treatment for each performance period and overall.
[5]ADG calculated by dividing bird weight gain averaged per bird by number of days in each performance period and overall.

b. Breast Blisters and Footpad Dermatitis

Under our research conditions, no control or laser-enriched birds displayed breast blisters or footpad dermatitis.

TABLE D3

Focal bird (n = 70) right tibia quality measures and weight (LSMeans, pooled SEM) using treatment as a fixed effect.

| Measure | Control[1] | Laser[2] | Pooled SEM | P-value |
|---|---|---|---|---|
| Bone mineral density[3] (g/cm$^2$) | 0.129 | 0.138 | 0.005 | 0.203 |
| Bone mineral content[3] (g) | 0.975 | 1.107 | 0.078 | 0.237 |
| Bone breaking strength[4] (kgf/cm$^2$) | 9.941 | 11.143 | 0.693 | 0.225 |
| Right tibia weight (g) | 14.97 | 15.75 | 0.470 | 0.250 |

[1]Control describes birds from pens not exposed to laser enrichment.
[2]Laser describes birds in pens exposed to laser enrichment.
[3]Tibia were scanned for bone mineral density and content using the DXA "rat whole body scan" in groups of 7.
[4]Bones were fractured individually using the compression method on an Instron 3367 Universal Test Machine at a rate of 10 mm/min and a 15% rate of load. The machine was stopped at the distinct rapid decline in force as visualized on the monitor, and value is presented as load (kgf) divided by area of tibia (g/cm$^2$).

FIG. 4A shows regression of focal bird tibia (n=70) bone mineral content (BMC, g) and bone mineral density (BMD, g/cm$^2$). Content and density are highly correlated (r=0.857). 1. Control describes focal birds not exposed to laser enrichment device; 2. Laser describes focal birds exposed to enrichment device 4 times daily for 4-min laser periods; 3. Bone mineral content and density of the tibia were obtained using the DXA "rat whole body scan" in groups of 7; 4. BMC denotes bone mineral content (g), BMD denotes bone mineral density (g/cm$^2$).

c. Tibia Quality

DXA scan results of focal bird tibia showed no changes in BMC or BMD, although the enriched tibia were numerically higher in both categories compared to the control (Table D3). BMD and BMC were strongly correlated (FIG. 4A), as were BMC and tibia weight (r=0.720). Interestingly, BMD and tibia weight were only moderately correlated (r=0.479). Bone mineral content of the tibia and bird body weight were strongly correlated (r=0.677), but BMD and bird weight were again only moderately correlated (r=0.456).

Bone breaking strength, determined using the Instron 3367 Universal Test Machine compression method and reported as load (kgf)/area (cm$^2$), was numerically higher in enriched focal bird tibia than control, but the difference was not significant (Table D3). Bone breaking strength was moderately negatively correlated with tibia weight (r=−0.486) and bird weight (r=−0.325). The correlation between all bone measures can be visualized in FIG. 4B using a multidimensional preference analysis.

d. Air and Litter Quality

The birds started on fresh, dry litter that remained friable throughout, and the litter scored "pass" in all pens for the entire 6 wk (≤20 ppm) the birds were on trial.

Ammonia strip readings taken on a weekly basis were identical in both the enriched and control rooms of the barn. Before birds arrived, the baseline ammonia levels were 0 ppm in both rooms of the barn. The averaged readings were week 2, 5 ppm; week 3, 5 ppm; week 4, 10 ppm; week 5, 10 ppm; and week 6, 16.67 ppm. Variable readings only occurred on week 6, with 2 readings of 20 ppm and 1 reading of 10 ppm in each room of the barn.

FIG. 4B shows a multidimensional preference analysis of all focal bird tibia (n=70) measures 1-3: bone breaking strength (BBS), bird weight, tibia weight, bone mineral content (BMC), and bone mineral density (BMD). Abbreviations: C: control bird; and L: laser-enriched bird. Symbols denote individual focal birds. 1. Right tibia were collected from 70 focal birds on d42, weighed, DXA scanned for BMC and BMD, and fractured using an Instron 3367 Test Machine compression method for bone breaking strength; 2. The cosine between 2 variables indicates the correlation between the variables, the length of the arrows reflect the variance of the original variables. This is a 2-dimensional approximation of the dimensions; 3. Original variables have been transformed into new variables (Component 1 and 2) that account for most of the variance.

Means from the ammonia monitor were compared using a simple frequency and chi square distribution with enrichment treatment as a fixed effect. Treatment effect was not significant (P=0.112). In the control room of the barn, 60% of readings were 0 ppm, 20% were 3 ppm, and 20% were 8 ppm. In the enriched room, 60% of readings were 0 ppm, 20% were 3 ppm, and 20% were 4 ppm. Thus, according to the more accurate GasAlert ammonia monitor, the control room peaked at 8 ppm and the enriched room never surpassed 4 ppm at bird height.

4. DISCUSSION

At the commercial level, improved FCR is arguably the most valued production trait as it translates to greater weight gain from the same or lesser amount of feed, a cost savings in production, and thus improved sustainability (Stenholm and Waggoner, 1991). Reducing FCR by 17 points could equal to more than a 5% decrease in feed costs (Emmerson, 1997), which account for >70% of the costs of broiler production (Banerjee, 1992). The laser enrichment device successfully decreased FCR by 18 points in the finisher period of our study vs. control. The increased weight gain of 0.24 kg/bird overall could be translated to between $0.71 and $1.39 more saleable product/bird, using current breast meat prices as an example (USDA, 2019). Improved feed conversion may be attributed to decreased maintenance requirements, or more energy partitioned towards growth (Urdaneta-Rinconand Leeson, 2002).

Laser-enriched birds showed significantly increased physical movement during laser periods (Meyer et al., unpublished data). Increased physical activity has been reported to reduce leg disorder parameters in broilers (Prayitno et al., 1997; Reiter and Bessei, 2009) and laying hens (Shipov et al., 2010), but has also been associated with worse feed conversion (Akbar et al., 1985), or no change in weight gain or FCR (Prayitno et al., 1997; Reiter and Bessei, 2009; Ruiz-Feria et al., 2014). Indeed, feed conversion in chickens may have a behavioral component, as was suggested in laying hen genetics research by Fairfull and Gowe (1979), but whether this effect may be positive or negative based on exercise has remained unclear. Similar results to ours were seen by Sorensen et al. (2000) where broilers raised at a lower stocking density showed both increased weight gains and improved walking ability. It was hypothesized by Lewis and Hurnik (1990) that there is likely a "locomotory-neutral zone or comfortable upper limit" in broiler movement, meaning that there is an ideal activity level somewhere between the bare minimum distance traveled to access necessary resources and overexertion.

Researchers have successfully forced broilers out of the bare minimum range of movement by increasing distance or introducing barriers between feeders and waterers without compromising performance (Ventura et al., 2012; Ruiz-Feria et al., 2014), but other, non-resource-based methods have been less successful. For example, Bizeray et al. (2002) tested wheat scattered on the pen floor and colored, moving spot-lights but concluded that "forcing animals to exercise more . . . was more effective for increasing physical activity than was attempting to stimulate foraging activities." Shields et al. (2005) hypothesized that broiler exercise would increase, and leg lameness would decrease, when provided sand bedding, but they were unable to support this as birds rested and displayed more inactive behavior on the sand.

Thus, it appears that the success of the laser device and method according to the present invention in motivating broiler physical activity, while simultaneously improving FCR and ADG, is among the first to accomplish this goal. Further, we may speculate that the 4-min laser periods induced a suitable amount of physical activity without increasing maintenance requirements, hence sacrificing FCR or incurring negative changes to footpad quality, but different lengths of time would need to be tested to validate if this is the most ideal duration. The increased FI observed in laser-enriched pens may be attributed to the laser motivating the broilers to move, thus driving them towards the feeders. It has been established by Yngvesson et al. (2017) that when resting broilers are disturbed by their conspecifics (a common occurrence), they get up and walk away. We hypothesize that a similar effect was driven by laser-enriched birds, who were physically active at a level considerably greater than control birds at the same time during laser periods, triggering other birds in the pen to move and ultimately move towards the feeders, much like the presence of humans walking a commercial barn motivates broilers to rise and head towards feed. Yngvesson et al. did not record feeding behavior post-disturbance for comparison, but this hypothesis is supported by our finding that 71% of laser-enriched focal birds were at the feeder at least once either during or within 5 min following laser periods (Meyer et al, unpublished data).

It is thought that most skeletal support is established in broiler birds by day 18, following "intensive bone formation to provide rapid mineralization." However, bone porosity or density changes more slowly over time to support increasing bird weight (Williams et al., 2000). Further, bone strength and mass are increased with activity (Rath et al., 2000), and load-bearing bones need to develop bearing weight, or they will immediately fail to do so when given the opportunity (Lanyon, 1993). Thus, we hypothesized that the increased movement, activity, and growth seen in laser-enriched birds may have been reflected in improved tibia quality measures (Meyer et al., unpublished data). DXA scanning has been used successfully in broilers to measure BMD and BMC (Swennen et al., 2004; Shim et al., 2012; Castro et al., 2019), and bone breaking strength has been used to detect treatment differences as well (Rowland and Harms, 1970; McDevitt et al., 2006; Shim et al., 2012). Bone mineral density is believed to be reflective of mineral content (Rath et al., 2000); our highly correlated (r=0.857) BMD and BMC values agree with this. Further, BMD and BMC of the tibia obtained from DXA scanning were within normal range, similar to values seen in broiler tibia by Shim et al. (2012).

Body weight, tibia weight, BMD, and BMC collectively explain 71.25% of the total experimental differences seen in these variables (FIG. 4B). Body weight and tibia weight positively influence overall bone measures and tightly cluster, while BMC and BMD cluster with an overall weak negative influence on the collective bone-related outcomes. Although BMD is commonly used as an indicator of bone strength, as bone mineralization is believed to provide compression strength (Rath et al., 2000), our data indicate a weak negative correlation between BMD and BMC of tibia with bone breaking strength (FIG. 4B), an outcome that was not expected based on previous work in poultry (Leterrier and Nys, 1992). However, work done in humans (Divittorio et al., 2006) has indicated that in-creases in bone density are not consistently correlated with decreased occurrence of fractures, and work in non-human primates (Vahle et al., 2015) stated that BMD is not always indicative of bone will fail in "repetitive loading, as in a stress fracture, or when subjected to high impacts."

Our bone breaking methods using compression and a constant rate of load would have reflected this repetitive loading and may contribute to the lack of correlation seen between these bone quality measures. Further work is necessary to validate this unexpected, negative correlation. It is important to note that BMD, BMC, and breaking strength were each numerically higher in laser-enriched birds. These outcomes have previously been seen by Shim et al. (2012) in fast-growing broilers compared to slow-growing broilers, but when analyzed in terms of body weight of the birds, the slow-growing birds ultimately had better bone quality. However, in our study the body weight of birds was weakly negatively correlated with bone breaking strength ($r=-0.325$), indicating that this measure was not sim-ply reflective of tibia weight or bird weight, but rather a possible true numerical increase of bone quality in the enriched birds.

Commercially, contact dermatitis including breast blisters and footpad dermatitis necessitates downgrading of 15 to 30% of broiler carcasses/wk (Greene et al., 1985). Breast conditions range from "mild" brownish colored scabs to "severe" exudate and litter filled ulcers that are aggravated because broilers rest 60% of their body weight on the keel while lying (Nielsen, 2004). Footpad dermatitis is a similar condition, but on the bottom of broiler feet and toes, with symptoms of inflammation and necrotic lesions. This is an obvious animal welfare concern, but also represents a considerable economic loss to the industry, where paws are "the third most important economic part of the chicken behind the breast and wings . . . accounting for approximately $280 million a year" (Shepherd and Fairchild, 2010). However, in our clean research environment, neither of these conditions occurred. Other researchers have assessed these on commercial broilers at the slaughter-house to gather a true representation of the issue (Allain et al., 2009), and considering that our birds were housed on fresh pine shavings with a relatively lower stocking density and number of birds than a commercial broiler house (0.24 $m^2$/bird recommended by the NCC; 0.33 $m^2$/bird provided), we were not expecting a high occurrence in our flock. However, we were able to successfully show that the enrichment device did not negatively influence the birds' health by worsening breast or feet condition compared to the control.

Tied in with breast blisters and footpad dermatitis are air and litter quality. These conditions may be caused by ammonia, originating from urea in the litter compounded by mixing with leaked water from drinkers, causing a chemical burn effect. Haslam et al. (2006) showed that percentage of birds with footpad concerns was correlated with ammonia concentrations in the house and litter moisture, although they did not find this association with breast burns. In the cur-rent study, ammonia levels were low, peaking at 8 and 4 ppm on the control and enriched rooms of the barn, respectively, using the GasAlert monitor. This is well within the acceptable range of up to 25 ppm accepted by the NCC audit. Likewise, litter remained dry and friable throughout 6 wk in both rooms of the house. These outcomes indicate that the larger, more active laser-enriched birds were not generating more moisture in the litter from increased waste or stirring up greater quantities of ammonia over the course of the experiment.

Regarding impact of the laser on bird welfare, data from this study have thus far provided no evidence that animal welfare was negatively impacted by laser enrichment. There was not an increase in lameness, dermatitis, or mortality, nor did we see a decrease in body weight, tibia quality, or environmental conditions due to laser treatment. In the behavior companion paper (Meyer et al., unpublished data), the Human-Approach Paradigm was utilized as a measure of fearfulness. Results showed that a greater number of laser-enriched birds were closer to the unfamiliar human in the pen during week 6 of the trial than the control birds; hence, an increased fear response was not observed. Future work in this area should include taking physiological stress measures, such as serum or feather corticosterone, to determine if laser enrichment is causing a stress response in broilers. However, it has been shown that broilers are interested in exploring novel objects (Newberry, 1999), and have a propensity to peck at small objects (Hogan, 1973), so although it is certainly possible that in some cases birds may have been moving away from or unduly stressed by the lasers, thus far our data indicate they were not negatively impacted and were rather interested in the novel nature and small size of the laser dots.

In summary, these data have provided a strong indication of positive performance effects related to this novel environmental enrichment device. Furthermore, the environmental enrichment device did not result in any unintended negative consequences on the birds' tibia quality, breast and feet condition, or living environment. This unique device improved gains and feed conversion compared to the control, with peak performance results seen in the crucial grower and finisher periods. Following future validation in research and in a commercial setting, this enrichment option may be effective for producer implementation. The device does not come into contact with birds, there-fore reducing the potential for disease vectors (as in perches/straw bales/tiles) and can be used across multiple flocks. Further work is needed to refine the device and performance outcomes, and this work also needs to be extended to commercial conditions.

5. SUPPLEMENTARY DATA

Supplementary data are available at *Poultry Science* online at doi.org/10.3382/ps/pez417 (which is incorporated by reference herein).

6. REFERENCES

The following publications are referenced in the foregoing description of Section D and provide background information.

Akbar, M. K., J. S. Gavora, and R. W. Fairfull. 1985. Relationship between activity at a young age and feed efficiency in chickens. Poult. Sci. 64:1402-1404.

Allain, V., L. Mirabito, C. Arnould, M. Colas, S. L. Bouquin, C. Lupo, and D. V. Michel. 2009. Skin lesions in broiler chickens measured at the slaughterhouse: relationships between lesions and between their prevalence and rearing factors. Poult. Sci. 50:407-417.

American Association of Avian Pathologists. 2015. Animal Welfare and Management Committee. Accessed December 2017. https://www.aaap.info/animal-welfare.

Bailie, C. L., M. Baxter, and N. E. O'Connell. 2018. Exploring perch provision options for commercial broiler chickens. Appl. Anim. Behav. Sci. 200:114-122.

Banerjee, G. C. 1992. Poultry. 3rd ed. Oxford and IBH Publishing Co., Pvt. Ltd. Calcutta.

Bassler, A. W., C. Arnould, A. Butterworth, L. Colin, I. C. De Jong,

V. Ferrante, P. Ferrari, S. Haslam, F. Wemelsfelder, and H. J. Blokhuis. 2013. Potential risk factors associated with contact dermatitis, lameness, negative emotional state, and fear of humans in broiler chicken flocks. Poult. Sci. 92:2811-2826.

Baxter, M., C. L. Bailie, and N. E. O'Connell. 2019. Play behaviour, fear responses, and activity levels in commercial broiler chickens provided with preferred environmental enrichments. Animal. 13:171-179.

BenSassi, N., J. Vas, G. Vasdal, X. Averos, I. Estevez, and R. C. Newberry. 2019. On-farm broiler chicken welfare assessment using transect sampling reflects environmental inputs and production outcomes. PLoS One. 14:e0214070.

Bizeray, D., I. Estevez, C. Leterrier, and J. M. Faure. 2002. Effects of increasing environmental complexity on the physical activity of broiler chickens. Appl. Anim. Behav. Sci. 79:27-41.

Castro, F. L. S., S. Su, H. Choi, E. Koo, and W. K. Kim. 2019. L-Arginine supplementation enhances growth performance, lean muscle, and bone density but not fat in broiler chickens. Poult. Sci. 98:1716-1722.

Danbury, T. C., C. A. Weeks, J. P. Chambers, A. E. Waterman-Pearson, and S. C. Kestin. 2000. Self-selection of the analgesic drug carprofen by lame broiler chickens. Vet. Rec. 146:307-311.

Dinev, I., S. Denev, I. Vashin, D. Kanakov, and N. Rusenova. 2019. Pathomorphological investigations on the prevalence of contract dermtitis lesions in broiler chickens. J. Appl. Anim. Res. 47:129-134.

Divittorio, G., K. L. Jackson, V. L. Chindalore, W. Welker, and J. B. Walker. 2006. Examining the relationship between bone mineral density and fracture risk reduction during pharmacologic treatment of osteoporosis. Pharmacotherapy. 26:104-114.

Dunkley, C. S. 2007. Leg Problems in Broilers. The Poultry Site. Accessed June 2019. https://thepoultrysite.com/articles/leg-problems-in-broilers.

Emmerson, D. A. 1997. Commercial approaches to genetic selection for growth and feed conversion in domestic poultry. Poult. Sci. 76:1121-1125.

Fairfull, R. W., and R. S. Gowe. 1979. Feed consumption and feed efficiency in selected and control strains of egg stocks under long term selection for a complex of economic traits. Pages 230-245 in Selection Experiments in Laboratory and Domestic Animals.

A. Robertson, ed. Commonwealth Agricultural Bureaux.

Greene, J. A., R. M. McCracken, and R. T. Evans. 1985. A contact dermatitis of broilers-clinical and pathological findings. Avian Pathol. 14:23-38.

Ham, A. D., and D. Osorio. 2007. Colour preferences and colour vision in poultry chicks. Proc. Biol. Sci. 274:1941-1948.

Haslam, S. M., S. N. Brown, L. J. Wilkins, S. C. Kestin, P. D. Warriss, and C. J. Nicol. 2006. Preliminary study to examine the utility of using foot burn or hock burn to assess aspects of housing conditions for broiler chicken. Br. Poult. Sci. 47:13-18.

Havenstein, G. B., P. R. Ferket, and M. A. Qureshi. 2003. Growth, livability, and feed conversion of 1957 versus 2001 broilers when fed representative 1957 and 2001 broiler diets. Poult. Sci. 82:1500-1508.

Hogan, J. A. 1973. Development of food recognition in young chicks: I. Maturation and nutrition. J. Comp. Physiol. Psychol. 83:355-366.

Jones, R. B., N. L. Carmichael, and E. Rayner. 2000. Pecking preferences and pre-dispositions in domestic chicks: implications for the development of environmental enrichment devices. Appl. Anim. Behav. Sci. 69:291-312.

Jordan, D., I. Stuhec, and W. Bessei. 2011. Effect of whole wheat and feed pellets distribution in the litter on broilers' activity and performance. Eur. Poult. Sci. 75:98-103.

Knowles, T. G., S. C. Kestin, S. M. Haslam, S. N. Brown, L. E. Green, A. Butterworth, S. J. Pope, D. Pfeiffer, and C. J. Nicole. 2008. Leg disorders in broiler chickens: prevalence, risk factors and prevention. PLoS One. 3:e1545.

Lanyon, L. E. 1993. Skeletal responses to physical loading. Pages 485-505 in Physiology and Pharmacology of Bone. Handbook of Experimental Pharmacology. Vol. 107. G. R. Mundy, and T. J. Martin, eds. Springer Verlag, New York, NY.

Leterrier, C., and Y. Nys. 1992. Composition, cortical structure and mechanical properties of chicken tibiotarsi: effect of growth rate. Br. Poult. Sci. 5:925-939.

Lewis, N. J., and J. F. Hurnik. 1990. Locomotion of broiler chickens in floor pens. Poult. Sci. 69:1087-1093.

McDevitt, R. M., G. M. McEntee, and K. A. Rance. 2006. Bone breaking strength and apparent metabolisability of calcium and phosphorus in selected and unselected broiler chicken genotypes. Br. Poult. Sci. 47:613-621.

McGeown, D., T. C. Danbury, A. E. Waterman-Pearson, and S. C. Kestin. 1999. Effect of carprofen on lameness in broiler chickens. Vet. Rec. 144:668-671.

Nääs, I. A., I. C. L. A. Paz, M. S. Baracho, A. G. Menezes, L. G. F. Bueno, I. C. L. Almeida, and D. J. Moura. 2009. Impact of lameness on broiler well-being. J. Appl. Poult. Res. 8 18:432-439.

National Chicken Council. 2017. National Chicken Council Animal Welfare Guidelines and Audit Checklist for Broilers. Accessed November 2017. https://www.nationalchickencouncil.org/wp-content/uploads/2017/07/NCC-WelfareGuidelines-Broilers. pdf.

Newberry, R. C. 1999. Exploratory behaviour of young domestic fowl. Appl. Anim. Behav. Sci. 63:311-321.

Nielsen, B. L. 2004. Breast blisters in groups of slow-growing broilers in relation to strain and the availability and use of perches. Br. Poult. Sci. 45:306-315.

Norring, M., E. Kaukonen, and A. Valros. 2016. The use of perches and platforms by broiler chickens. Appl. Anim. Behav. Sci. 184:91-96.

Prayitno, D. S., C. J. Phillips, and D. K. Stokes. 1997. The effects of color and intensity of light on behavior and leg disorders in broiler chickens. Poult. Sci. 76:1674-1681.

Rath, N. C., G. R. Huff, W. E. Huff, and J. M. Balog. 2000. Fac-tors regulating bone maturity and strength in poultry. Poult. Sci. 79:1024-1032.

Reiter, K., and W. Bessei. 2009. Effect of locomotor activity on leg disorder in fattening chicken. Berl. Munch. Tierarztl. Wochenschr. 122:264-270.

Rowland, L. O., and R. H. Harms. 1970. The effect of wire pens, floor pens and cages on bone characteristics of laying hens. Poult. Sci. 49:1223-1225.

Ruiz-Feria, C. A., J. J. Arroyo-Villegas, A. Pro-Martinez, J. Bautista-Ortega, A. Cortes-Cuevas, C. Narciso-Gaytan, A. Hernandez-Cazares, and J. Gallegos-Sanchez. 2014.

Effects of distance and barriers between resources on bone and tendon strength and productive performance of broiler chickens. Poult. Sci. 93:1608-1617.

SAS Institute Inc. 2016. SAS/ACCESS® 9.4 Interface to ADABAS: Reference. Cary, NC: SAS Institute Inc.

Shepherd, E. M., and B. D. Fairchild. 2010. Footpad dermatitis in poultry. Poult. Sci. 89:2043-2051.

Shields, S. J., J. P. Garner, and J. A. Mench. 2005. Effect of sand and wood-shavings bedding on the behavior of broiler chickens. Poult. Sci. 84:1816-1824.

Shim, M. Y., A. B. Karnuah, A. D. Mitchell, N. B. Anthony, G. M. Pesti, and S. E. Aggrey. 2012. The effects of growth rate on leg morphology and tibia breaking strength, mineral density, mineral content, and bone ash in broilers. Poult. Sci. 91:1790-1795.

Shipov, A., A. Sharir, E. Zelzer, J. Milgram, E. Monsonego-Ornan, and R. Shahar. 2010. The influence of severe prolonged exercise restriction on the mechanical and structural properties of bone in an avian model. Vet. J. 183:153-160.

Sorensen, P., G. Su, and S. C. Kestin. 2000. Effects of age and stocking density on leg weakness in broiler chickens. Poult. Sci. 79:864-870.

Stenholm, C. W., and D. B. Waggoner. 1991. Developing future-minded strategies for sustainable poultry production. Poult. Sci. 70:203-210.

Swennen, Q., G. P. Janssens, R. Geers, E. Decuypere, and J. Buyse. 2004. Validation of dual-energy x-ray absorptiometry for determining in vivo body composition of chickens. Poult. Sci. 83:1348-1357.

Urdaneta-Rincon, M., and S. Leeson. 2002. Quantitative and qualitative feed restriction on growth characteristics of male broiler chickens. Poult. Sci. 81:679-688.

United States Department of Agriculture. 2017. Broilers: Production and Value of Production by Year, US. Accessed June 2019. https://www.nass.usda.gov/Charts_and_Maps/Poultry/brprvl.php.

United States Department of Agriculture. 2019. USDA National Re-tail Report-USDA Livestock, Poultry, & Grain Market News. Accessed June 2019. http://www.ams.usda.gov/market-news/livestock-poultry-grain.

Vahle, J. L., Y. L. Ma, and D. B. Burr. 2015. The Nonhuman Primate in Nonclinical Drug Development and Safety Assessment. 1st ed. Academic Press, Elsevier, Inc.

Ventura, B. A., F. Siewerdt, and I. Estevez. 2012. Access to barrier perches improves behavior repertoire in broilers. PLoS One. 7:e29826.

Weeks, C. A., T. D. Danbury, H. C. Davies, P. Hunt, and S. C. Kestin. 2000. The behaviour of broiler chickens and its modification by lameness. Appl. Anim. Behav. Sci. 67:111-125.

Williams, B., S. Solomon, D. Waddington, B. Thorp, and C. Farquharson. 2000. Skeletal development in the meat-type chicken. Br. Poult. Sci. 41:141-149.

Yngvesson, J., M. Wedin, S. Gunnarsson, L. Jonsson, H. Blokhuis, and A. Wallenbeck. 2017. Let me sleep! Welfare of broilers (*Gallus domesticus*) with disrupted resting behavior. Acta Agric. Scand. 67:123-133.

Zuidhof, M. J., B. L. Schneider, V. L. Carney, D. R. Korver, and F. E. Robinson. 2014. Growth, efficiency, and yield of commercial broilers from 1957, 1978, and 2005. Poult. Sci. 93:2970-2982.

E. Specific Example 2 (Relative to Broiler Chickens and Increased Physical Activity)

For further understanding of the invention and its aspects, below is a still further application of concepts according to the invention to a particular species of poultry, namely broilers, which, as is well known by those skilled in this technical art, are chicken bred and raise specifically for meat production.

Exemplary embodiments of apparatus, systems, and methods according to the invention are described in detail. Proof of concept evidence is also included. Again, however, this is a non-limiting example of the invention. This will help the reader further understand objects of the invention by the details of this specific example and context.

A Novel Environmental Enrichment Device Increased Physical Activity and Walking Distance in Broilers Abstract Modern broilers are selected for fast growth and a large proportion of breast tissue, contributing to a top-heavy phenotype, leg disorders, and inactivity as birds reach market weight. Therefore, the objective was to motivate broilers to move through environmental enrichment. Twelve hundred Ross 308 broilers were housed in pens of 30 for 6 wk; 600 birds were exposed to a novel laser enrichment device (LASER) and 600 were control. Each device projected 2 randomly moving red laser dots onto the floor 4 times/day for 4-min "laser periods". Seven LASER and 7 control pens, with 5 focal birds/pen (n=70), were randomly selected to be video-recorded d0-8 and once weekly for the remainder of the trial. Videos were analyzed to measure broiler time-budget and behaviors such latency to feed and distance walked during laser periods. Focal birds were gait scored weekly on-farm. A test of the Human-Approach Paradigm was carried out on wk 1 and 6 on all pens. LASER birds were more active on d0, 1, 3, 4, 5, 7, and 8, moving 254% more on d7 ($P \leq 0.05$). Time spent active was increased in LASER treatment by 114% on wk 2; 157% on wk 3; 90% on wk 4; and 82% on wk 5. LASER birds spent more time at the feeder on d0, 1, 2, 5, 8, and on wk 1 and 5, with 84% more time at feeder than control on d5 ($P \leq 0.05$). LASER birds walked further during laser periods on d0-8, reaching 646.5 cm greater (d1), and on wk 2, 3, 4, and 5, with an increase of 367.5 cm on wk 2 ($P \leq 0.05$). Over wk 1-6, 60.54±7.4% of focal birds in the laser treatment were at the feeder during or within 5 mins following laser periods. The laser enrichment device was successful in stimulating broiler physical activity and feeding and did not negatively impact walking ability.

Key words: broiler, environmental enrichment, well-being, lameness, behavior.

1. Introduction

Today's commercial broiler is up to 5 times heavier than its 1950's predecessor at the same age due to genetic selection for 3-fold improved feed efficiency and a 300% increased growth rate, resulting in a bird reaching market weight in as little as 4-6 wk (Havenstein, et al., 2003; Knowles, et al., 2008, Zuidhof, et al., 2014). However, this selection for increased growth rate has contributed to up to 30% of modern commercial broilers suffering from leg lameness or and reduced ability to move (Knowles, et al., 2008; Bassler, et al., 2013). Increased age and lameness both contribute to decreased time standing or walking. Sound birds spend around 76% of their time sitting or lying down, while lame birds spend up to 86% of their daily time budget inactive. At harvest weight (approximately 2 kg), healthy birds are reported to spend only 3.3% of their day walking, versus 1.5% in lame birds (Weeks, et al., 2000). Weeks and others hypothesized that fast-growing, more feed efficient broilers are inherently more inactive. Inactivity increases litter contact and could result in a higher occurrence of breast blisters and contact dermatitis (Weeks, et al., 2000; Bassler, et al., 2013; NUAs, et al., 2018), which are likely painful conditions caused by urea in the litter generating ammonia, creating chemical burns (Haslam, et al., 2007). Hence, past broiler research has studied physical activity and methods to increase active behavior.

Reiter and Bessei (2009) used treadmill training to force broilers to exercise for sessions lasting 20 min or 100 m wk 1-6 and saw improved locomotion. In an additional test from the same study, when distance was gradually increased over d0-5 from 2 to 12 m between feed and water, locomotion was increased threefold compared to the control, where resources remained 2 m apart throughout. Similar methods have been successfully used to encourage broilers above the minimum range of movement by increasing distance or introducing barriers between feeders and waterers without compromising performance (Ventura, et al., 2012; Ruiz-Feria, et al., 2014), but other, non-resource-based methods have been less successful.

Prayitno and others (1997) used ambient red light to stimulate activity in broilers but saw birds with a mean final body weight 47-79±12.4 g lighter than birds in a blue light treatment. However, broilers in the blue light were significantly less active. Bizeray and colleagues (2002a) tested different forms of enrichment by scattering wheat on the floor of the pen in one treatment, colored, moving spotlights in another, and barriers between feed and water in a third, but concluded that "forcing animals to exercise more . . . was more effective for increasing physical activity than was attempting to stimulate foraging activities". Shields and others (2005) hypothesized that broiler exercise would increase, and leg lameness would decrease when provided sand bedding, however, birds rested and displayed more inactive behavior on the sand. Ventura et al. (2012) implemented barrier perches as environmental enrichment but saw no increase in walking. Straw bales as a form of "freedom food" were successful in increasing broiler activity, but performance or walking ability data were not reported. Performance may have been negatively impacted in the straw bale treatment due to increased fiber in the gut, indicated by the increased drinking behavior (Kells, et al., 2001).

The National Chicken Council (NCC) guidelines for broilers (2017) have recognized leg lameness as a welfare concern and recommend gait scoring 100 birds/flock to evaluate leg health within 1 wk of slaughter using the U.S. Gait Scoring technique. This is a three-point scoring system that has been validated in commercial broiler flocks for high reliability compared to a 6-point system (Webster, et al., 2008). However, gait-scoring individual broilers in a research pen, rather than a commercial barn, may prove problematic due to limited space, feeders, and waterers in a confined area. Lameness hurts the industry economically, necessitating up to 2% culls in a $30 billion industry (USDA, 2017; Dunkley, 2018), and there is also considerable evidence that leg lameness is painful for the broiler. Birds with leg lameness eat more analgesic-containing feed than healthy birds, and birds fed an analgesic diet showed improved speed of walking, indicating relief from pain and discomfort caused by leg abnormalities (McGeown, et al., 1999; Danbury, et al., 2000).

Environmental enrichment has shown the ability to reduce fearfulness in broilers (Altan, et al., 2013). The Human-Approach Paradigm (HAP) is a validated measure of fearfulness in pigs that uses an unfamiliar human in the pen as a stimulus (Weimer, et al., 2014). The HAP has not been studied thus far in broiler chickens but is a potentially useful measure that takes into account both the movement and the orientation of the animal in relation to the human. The previously mentioned study by Bizeray et al. (2002a) is the only research that has measured the effects of environmental enrichment in the form of moving lights projected onto broiler pen floors. The authors implemented red, blue, green, and yellow spotlights but saw no change in broiler physical activity, and thus concluded that that the spotlights were too large and moved too quickly for broilers to follow. Moving light/visual enrichment successful in motivating broiler activity and improving well-being outcomes is absent in the literature. Furthermore, birds are visual feeders and prefer the color red (Ham and Osorio, 2007). Hence, the present work measured the effects of slowly moving, small particle-sized red laser dots projected onto broiler pen floors throughout the rearing period as a unique enrichment option. The objectives of this work were to stimulate broilers visually using a novel form of environmental enrichment to motivate physical movement, hence increasing walking distance and improving walking ability.

2. Materials and Methods

All live bird procedures were approved by the Iowa State University Institutional Animal Care and Use Committee.

a. Animals 1260 straight-run Ross 308 broiler chicks (day of hatch; BW 47.38±0.14 g) were obtained from a commercial hatchery and transported to the Poultry Research and Teaching Unit at Iowa State University (International Poultry Breeders Hatchery, Bancroft, Iowa) for a 6-wk grow-out experiment in floor pens. 1200 were randomly assigned to treatments and the remainder were culled following standard operating procedures of the farm. Seventy birds were randomly assigned upon arrival as focal birds (n=5 birds/pen in 14 camera pens), identified with wing-bands, and marked with unique animal-safe food coloring (red, blue, green, purple, and black; Wilton, Woodridge, Illinois). Food coloring was applied to a cotton ball, rubbed on the back of the chick's head and neck, and reapplied on an as-needed basis throughout the 6-wk trial.

b. Housing and Feeding

Birds were housed in 40 1.22 by 2.44 m pens of 30 across 2 rooms in the barn. One room contained 20 LASER pens (exposed to enrichment device), and the other contained 20 control pens, with an anteroom separating the 2 rooms so no crossover of enrichment device was possible; environmental conditions and management were kept the same across rooms. Approximately 10 cm deep fresh wood shavings provided bedding over the solid concrete floor, and PVC pipe dividers with mesh walls (1.22 m height) separated pens. High and low temperatures and humidity were monitored daily in the LASER and control rooms. Average temperatures are listed from the starter, grower, and finisher periods respectively from the LASER room of the barn: 85.47° F., 77.39° F., and 71.71° F., and the control room: 85.53° F., 77.46° F., and 71.5° F. Average relative humidity is listed from the starter, grower, and finisher periods respectively from the LASER room: 23.86%, 27.21%, and 33.93%, and the control room of the barn: 19.89%, 23.93%, 27.75%.

Birds were gradually adjusted from 24 h light on d0, defined as day of arrival and placement, (30-40 lux) to 20 h light (20-30 lux) from d8-42. Chicks were brooded with 2-heat lamps/pen (22.9 cm reflectors with porcelain socket) using 125-watt heat bulbs (Sylvania, Wilmington, MA) for the first wk. Birds were fed an ad libitum diet formulated for Ross 308 commercial recommendations out of a hanging chicken feeder (BRHF151, Brower Equipment, Houghton, IA) gradually raised to accommodate bird height. Water was provided ad libitum from a hanging nipple water line (8 nipples/pen). Mortality throughout the trial was 3.5% in control birds and 3.33% in LASER birds.

c. Laser enrichment device

Ten novel laser enrichment devices designed and built specifically for this research were affixed over 20 pens in 1 room of the barn. Each device was designed and calibrated to cover 2 adjoining pens. The enrichment device consisted of 2 independent red 650 nm lasers contained within a 20.5 by 20.5 cm metal box with a glass bottom mounted on a custom-designed structure made of 3 wooden beams (2.4 m height) raised above the pens. The lasers projected in a random pattern at a range of 7.6-30.5 cm/second onto the pen floor for 4-min "laser periods": 05:30 to 05:34, 11:30 to 11:34, 17:30 to 17:34, and 23:30 to 23:34 daily for the entirety of the trial.

d. Video Camera Set-Up and Training

Seventy focal birds (n=5/pen) were randomly assigned to 14 randomly selected pens (7 LASER, 7 control) equipped with 1 Sony HDR-CX440 Handycam (Sony Corp. of America, New York, New York) each. Cameras were affixed above each pen using brackets adjusted to capture the entire pen. Filming occurred in real-time (30 fps) for the first 10 days of the trial (d0-9) and once weekly for the remainder. Video observers were trained by an individual with previous animal behavior observation experience to 90% agreeability using the 4-min laser period video clips from any day recorded (d0-9, 16, 23, 30, and 37). All clips recorded were analyzed for the entirety of the enrichment period in LASER and control pens. Observers were not blinded to treatment; either the lasers or the supporting structure were visible in the videos/images.

e. Broiler Bird Home Pen Behavior

Trained observers watched the red-colored focal bird in each video-recorded pen (n=14) during 4-min laser periods and categorized bird behavior continuously throughout the clips using a pre-determined behavior ethogram (Table E1) on d0-9, 16, 23, 30, and 37. Frequency and duration (s) of each behavior were recorded; duration was then converted to percent of time spent on each behavior per 4-min period.

TABLE E1

Broiler bird home pen behavior ethogram; focal bird behavior was measured continuously during 4-min laser periods, 4 times daily at 05:30, 11:30, 17:30, and 23:30 for d0-9, 16, 23, 30, and 37

| Measure[1] | Defined |
| --- | --- |
| Active | Bird legs were in a continuous forward motion (walking or running). |
| Inactive | Bird stood in one place or rested its abdomen on the litter, head rested or raised while any part of its body was or was not in contact with another bird. |
| At feeder | Bird head over feeder circle, bird in feeder or bird stood on feeder tray. |
| At drinker | Bird stood beneath drinker line. |
| Other | Dust-bathed, preened (head/beak twisted around in contact with feathers), or any behavior not otherwise identified. |

TABLE E1-continued

Broiler bird home pen behavior ethogram; focal bird behavior was measured continuously during 4-min laser periods, 4 times daily at 05:30, 11:30, 17:30, and 23:30 for d0-9, 16, 23, 30, and 37

| Measure[1] | Defined |
| --- | --- |
| Out of view[2] | Bird was obstructed or not observed due to being under the heat lamp or inside the feeder and could not be seen. |

[1]All behaviors were collected as duration, defined as length of time behavior was exhibited in seconds
[2]Behaviors categorized as "Out of view" were so infrequent that the data could not be analyzed; relaxed convergence criteria was attempted to $10^{-4}$ f. Latency to Feed Latency to feed following laser turn-off was measured only in LASER pens on d0-9, 16, 23, 30, and 37 due to necessity of laser turn-off and to determine if birds exposed to laser enrichment went to the feeder after the conclusion of laser exposure. At feeder behavior during laser periods was collected in both LASER and control pens as direct comparative measure. A student observer watched laser period video from the 7 LASER pens and identified the red-colored focal bird. At the end of the 4-min period, when the laser dots disappeared, the observer started a timer. The timer was stopped when the focal bird exhibited "at feeder behavior" (Table E1) or when 5 mins had passed without the bird feeding. Latency to feed was recorded in seconds. Following data collection, latency to feed measures were categorized into 4 mutually exclusive categories, including: A) at feeder during laser period only (obtained from broiler home pen behavior data), B) at feeder when laser turned off, C) went to feeder <5 min following laser turn off, and D) never went to feeder.

g. Walking Distance

The distance walked by the blue-colored focal bird in each video-recorded pen (n=14) was measured over the 4-min laser periods (d0-9, 16, 23, 30, and 37). The observer taped a clear sheet protector over the computer screen and watched each min individually. At the beginning of each min, video was stopped, and the observer drew a line at the bird's beak. Video was resumed, and if the bird moved the video was paused again and a line was drawn at the new position of the beak where the bird stopped. This was repeated each min. Next, the observer used a ruler to draw a line connecting each stopping mark. After drawing the interconnecting line, the observer opened a pen template image in Adobe Photoshop (Adobe Systems Inc, San Jose, California).

The observer then used a known length within the pen (58.4 cm between 2 segments of the water line, measured on-farm) to standardize the custom ruler tool on Photoshop, measured in pixels (58.4 cm=approximately 194 pixels). The tool would then equate x number of pixels to centimeters. The observer placed the clear sheet protector over the template image and used the custom ruler tool to measure the interconnecting lines drawn from video. This was repeated for each individual min and then a sum of all line measurements, or the total distance walked each period, was calculated.

h. Walking Lameness

All focal birds (n=70) were removed from their home pens once weekly and assessed for lameness. Two researchers conducted the lameness test, with 1 researcher assigning scores. Birds were placed on a custom-designed plywood runway 1.80 m long and 0.46 m wide, with 0.30 m tall walls on all sides. The runway had 0.15 m start and finish sections, a 1.5 m walking space, and delineations marking every 0.30 m and 2.5 cm. Birds were placed on the runway starting section. Birds either walked 1.5 m independently or were encouraged to walk by (1) a researcher slowly moving their hand back and forth directly behind the bird (2) a researcher gently tapping the bird on the vent region with a gloved hand or (3) a researcher both waving behind and gently tapping the bird with a ping-pong paddle. Individual birds were considered to have completed the task when both feet had crossed into the finish section. Scores were assigned using a 0-2 scale adapted from NCC guidelines where 0 indicated the ability to walk 1.5 m with no signs of lameness, 1 indicated the ability to walk 1.5 m but showed unevenness in steps or sat down at least once, and 2 indicated a bird that could not walk 1.5 m.

i. Human-Approach Paradigm

The Human-approach paradigm (HAP) was completed once during wk 1 and once during wk 6 on all birds (n=1200) beginning at 09:00; pen order was kept the same each wk (n=40 pens). The barn was emptied of personnel apart from 2 researchers carrying out the HAP. Prior to the HAP, the researchers determined optimal bracket angle and camera location for each pen, so that 1 image captured an entire pen. Colored tape identified bracket location; locations ranged between 47.75-59.00 cm measuring out from the central PVC pipe. The HAP image was taken with a hand-held camera (Pentax Optio W90, Pentax Imaging Company, Golden, Colorado). The camera's focal length was 28 m with a 12.1-megapixel resolution.

Methods were based on swine nursery work completed by Weimer, et al (2014). Briefly, researcher A was defined as an unfamiliar human in the pen and researcher B placed the camera/bracket and took the image. Researcher A wore different colored coveralls than the rest of the research and farm crew, but the same boot covers. The researchers approached each pen quietly and recorded the number of birds per pen. Researcher B positioned the bracket on the pen's side in the pre-determined location and then Researcher A stepped into the opposite side of the pen with a stopwatch in their right hand. Researcher A took one step towards the center of the pen opposite Researcher B and crouched facing the camera with their body angled towards the birds and both arms held close to the body. Once in position, Researcher A began the stopwatch, avoiding looking at the birds for 15 s. After 15 s, Researcher A stopped the watch and looked up at the birds. Researcher B took an image at the precise moment Researcher A looked up.

One student observer, trained using the same methods as video observers but with wk 1 HAP images, reviewed the images. Within each digital image of individual pens, broilers were classified into 2 categories: interacting or not interacting. Interacting was defined as any bird in physical contact with or orientated directly towards the unfamiliar human. Birds classified as not interacting were further categorized into 3 mutually exclusive behaviors: feeder, drinker, or other (Table E2). Further, the pen images were split into fourths by tracing over PVC pipe supports every 0.6 m in the pen with a clear sheet and a marker. The number of birds present in each quadrant of the pen was counted, with quadrant 1 containing the unfamiliar human (FIG. 5).

FIG. 5 relates to: Digital Human-Approach Paradigm (HAP) wk 1 image used for evaluation[1], where numbered circles relate to: [1]Bird 1: Interacting; Bird 2: Not interacting; Bird 3: At drinker; Bird 4: At feeder; Bird 5: Other.

TABLE E2

Broiler behavior classification using a digital image analysis upon conclusion of human-approach paradigm (HAP[1]). Birds were first categorized as interacting or not interacting, then not interacting birds were separated into 3 mutually exclusive categories[2]: feeder, drinker, or other.

| Measure | Definition |
|---|---|
| Classification at 15 s using digital image evaluation | |
| Interacting | Using a ruler and a clear sheet protector taped to the screen, a line was drawn from the midpoint of the bird's head to the pen edge. If the line intersected with researcher A, or if any part of the bird was physically contacting researcher A, the bird was classifed as interacting. |
| Not interacting | Birds not exhibiting the above two behavioral classifications. |
| Further classification of not interacting using digital image evaluation | |
| Feeder | Bird head over feeder circle, bird in feeder or bird stood on feeder tray. |
| Drinker | Bird stood beneath drinker line. |
| Other | Laying (rested its abdomen on the litter, head rested or raised[3]), preening (dust bathed or head/beak twisted around in contact with feathers), wings stretched out, piling (group of three or more birds pressed against each other and/or on top of each other, all bird heads facing away from the human in the pen and not performing any other discernible behavior[4]), or not visible. |

[1]HAP was carried out on all pens once on wk 1 and once on wk 6. An unfamiliar human entered the pen and after 15 s, a photograph was taken to measure the birds' response
[2]Ethogram adapted from Weimer et al. 2014
[3]Kristensen, et al., 2007
[4]Campbell, et al., 2016 j. Statistical Analysis

In this experimental design, individual control pens (n=20) were considered experimental units, but LASER pens were analyzed as a group of 2 pens with 1 shared laser device (n=10). All data were analyzed using SAS software version 9.4 (SAS Institute Inc., 2016, Carey, NC). PROC UNIVARIATE was used to assess the distribution of data prior to analysis. Home pen behavior, walking distance, and HAP data were all abnormally distributed (Poisson distribution), thus were analyzed using PROC GLIMMIX. GLIMMIX fits models to data with non-constant variability, correlations, or that are not normally distributed. Home pen behavior and walking distance data were analyzed by day (d0-8) and by wk (d2, 9, 16, 23, 30, and 37), utilizing all laser periods within each day. Each model (behavior, walking distance, and HAP) included the fixed effect of treatment (enrichment versus control), wk or day, and the treatment by wk or day interaction, with the random effect of pen (or enriched pair of pens) within treatment, as birds were randomly assigned to pens.

Latency to feed and walking lameness categorical data were analyzed using PROC FREQUENCY and CHI SQUARE. The distribution of latency to feed data were observed by day and wk; only LASER focal birds were analyzed, thus treatment was not included in the model. Lameness score distributions were observed by treatment and the association of score to treatment. For all measures, a value of $P \leq 0.05$ was considered significant and differences between means were detected using PDIFF.

3. Results a. Broiler Home Pen Behavior

The day x treatment interaction was significant for all behaviors measured: active, inactive, time at feeder, drinker, and other (P<0.01). Birds out of view occurred so infrequently that data could not be analyzed: the frequency of out of view behavior on d0-8, respectively, were 0.11±0.31; 0.36±1.08; 0.27±0.59; 0.29±0.53; 0.55±1.01; 0.46±0.77; 0.27±0.66; 0.1±0.36; and 0.05±0.21. Out of view frequency for wk 1-6, respectively, were 0.27±0.59; 0.05±0.21; 0, 0.04±0.19; 0.05±0.23; and 0.02±0.13. LASER birds spent more time active (walking or running) on d0, 1, 3, 4, 5, 7, and 8 compared to the control (P≤0.05, FIG. 6A). The greatest increase in active behavior was observed on d7, where LASER birds moved 17.4±1.6% more, equal to a 253% increase, than their control counterparts. LASER birds were less inactive than the control on d2, 3, 4, 5, 6, and 8, with a peak 29.3±3.3% decrease on d2 (P≤0.05, FIG. 6B).

FIGS. 6A-D relate to: Ross 308 broiler home pen behavior results of focal bird during 4-min laser periods: day x treatment LSMeans (±SEM)[1] percent of time spent: (A) active; (B) inactive; (C) at feeder[2]; and (D) at drinker; with day and treatment as main effects, d0-8[3].

[1]Values lacking a common superscript are significantly different (P≤0.05)
[2]At feeder convergence criteria relaxed to 10'
[3]Individual P-values from d0-8, respectively: A) <0.0001, <0.0001, 0.5052, <0.0001, <0.0001, 0.0172, 0.5317, <0.0001, <0.0001; B) 0.6692, 0.3802, <0.0001, 0.0042, <0.0001, 0.0157, 0.001, 0.5467, 0.0041; C) 0.0141, <0.0001, 0.0276, 0.0036, 0.0918, 0.0022, 0.5056, 0.0946, 0.002; and D) 0.0002, <0.0001, 0.0023, 0.0702, 0.5939, 0.041, <0.0001, <0.0001, 0.0176.

Figure 6A:
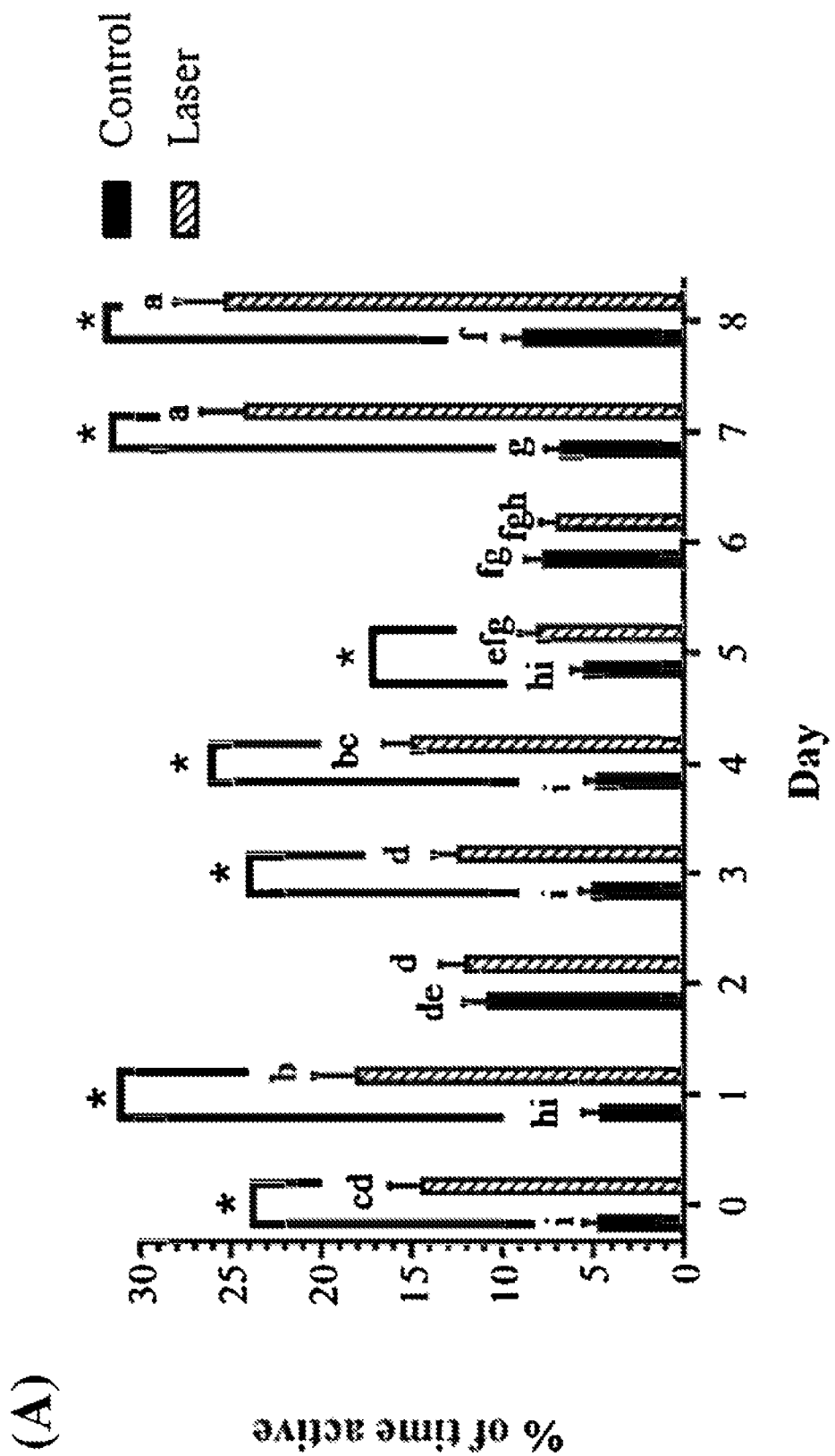
Figure 6B:
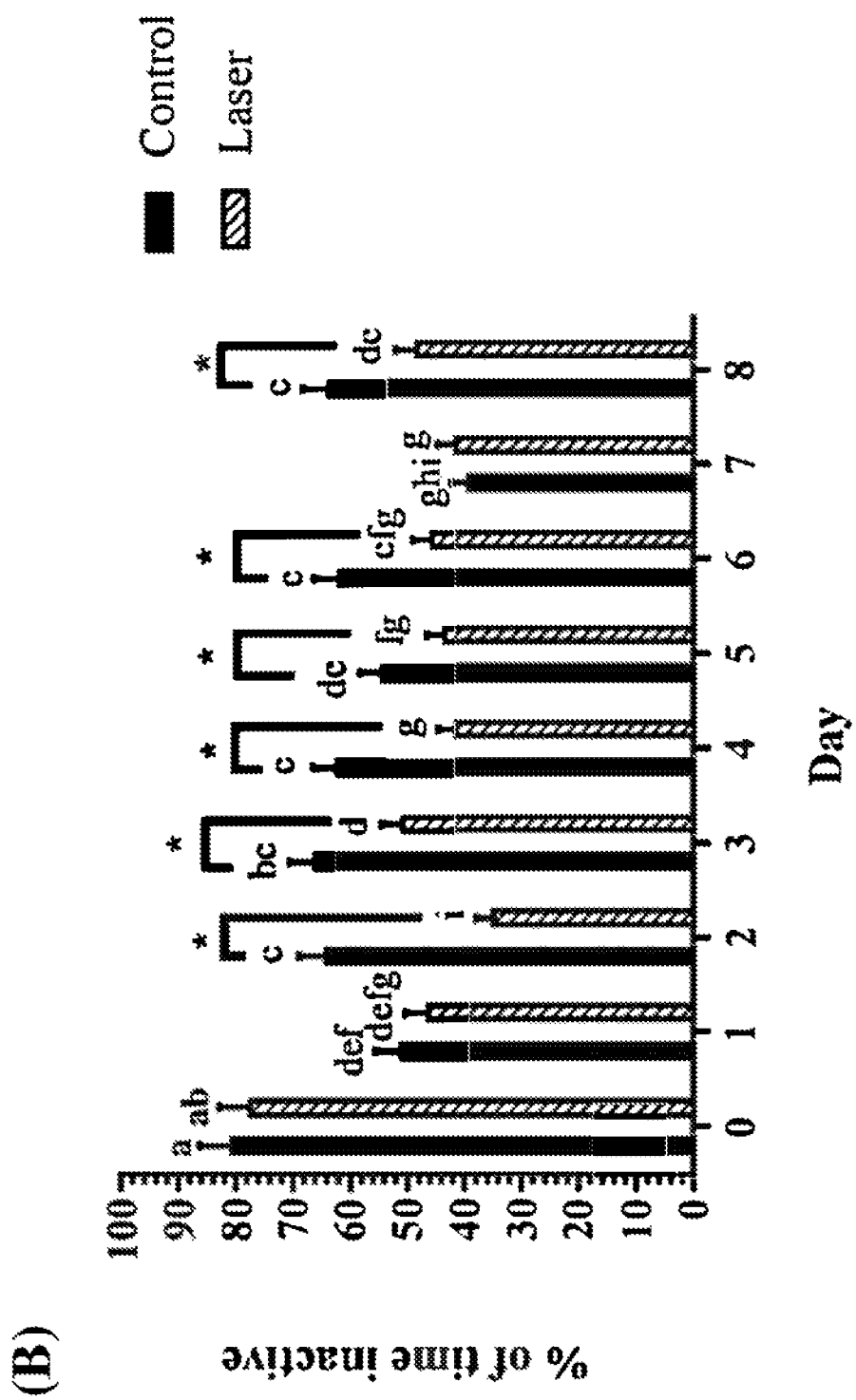
Figure 6C:
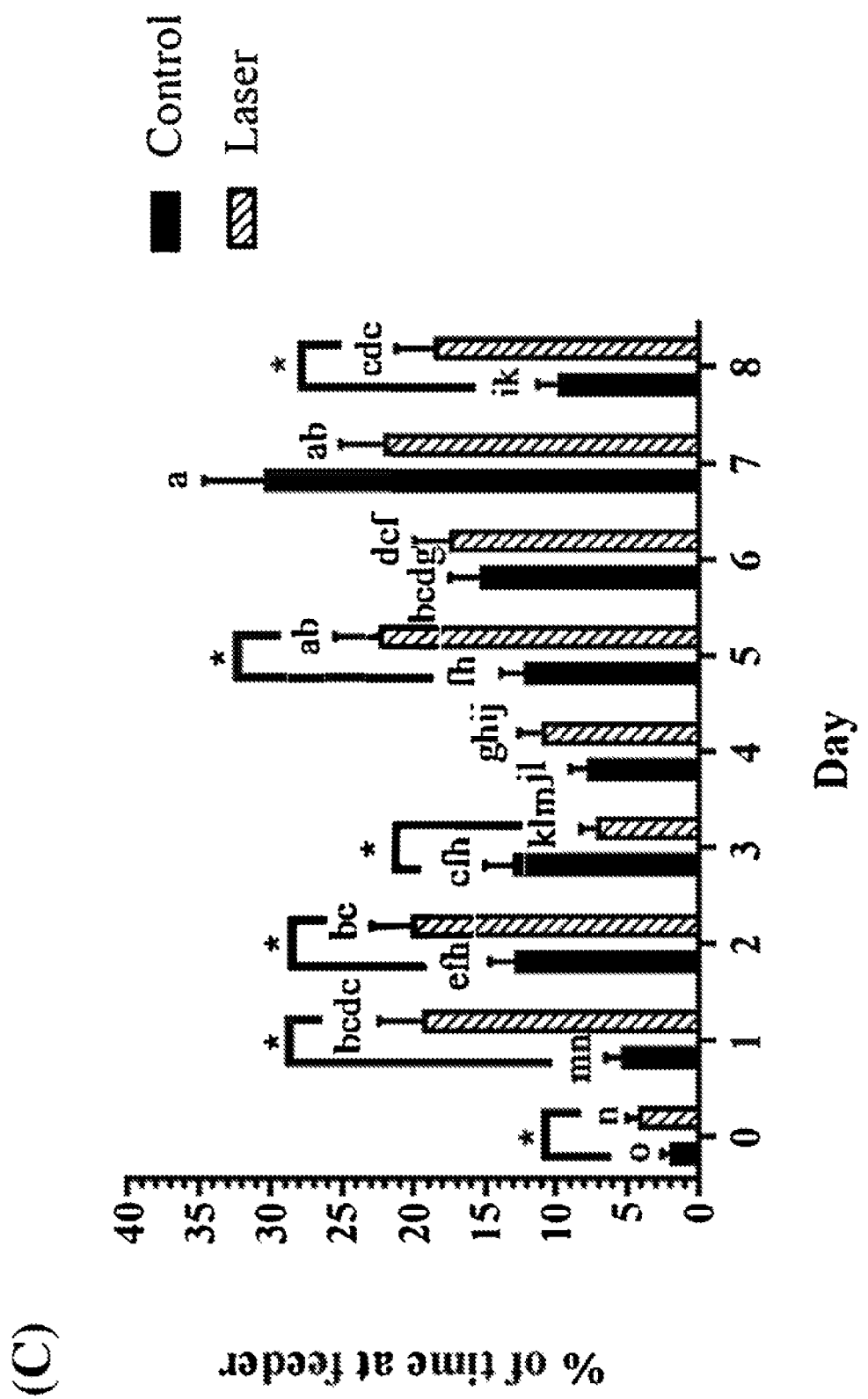
Figure 6D:
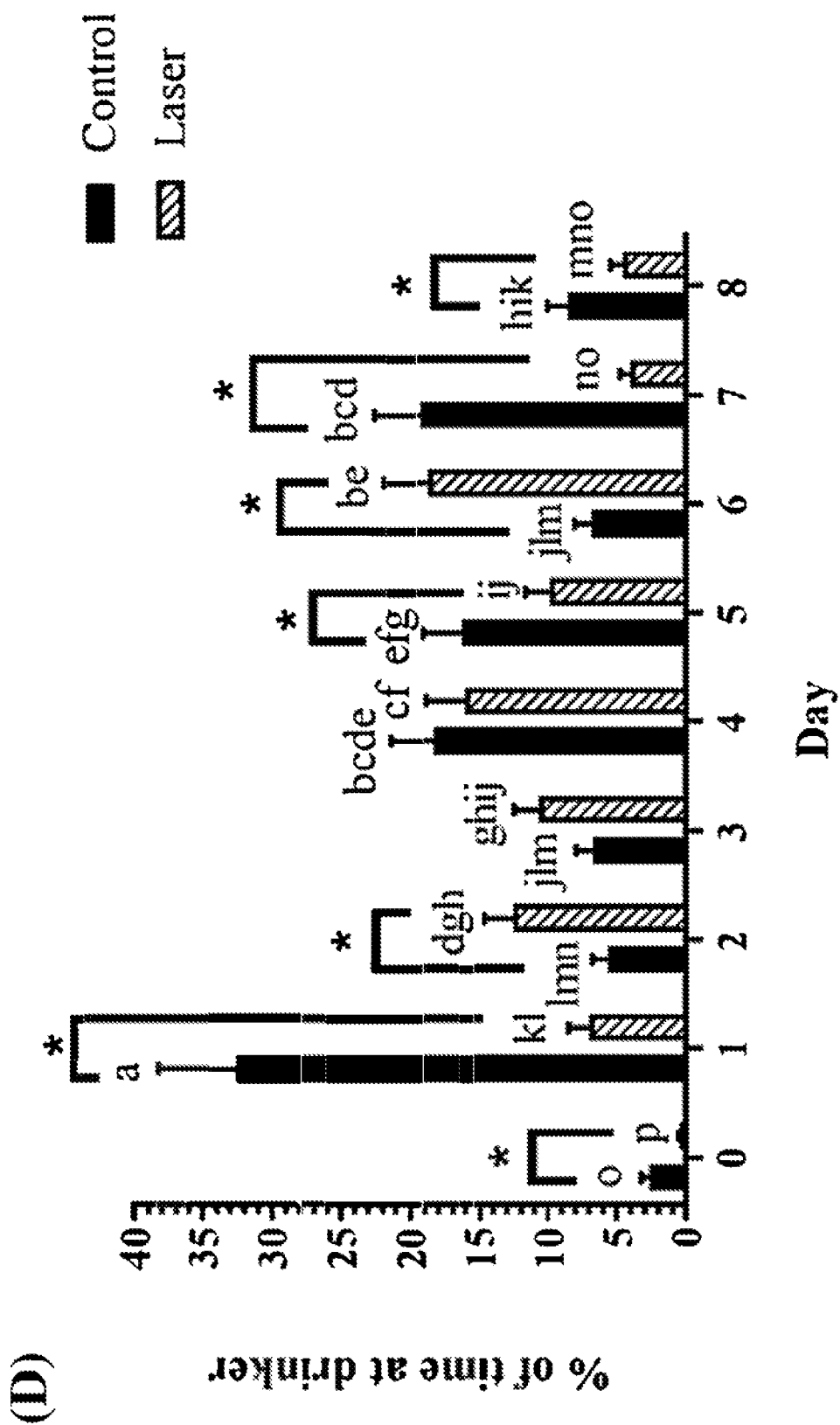
Figure 7A:
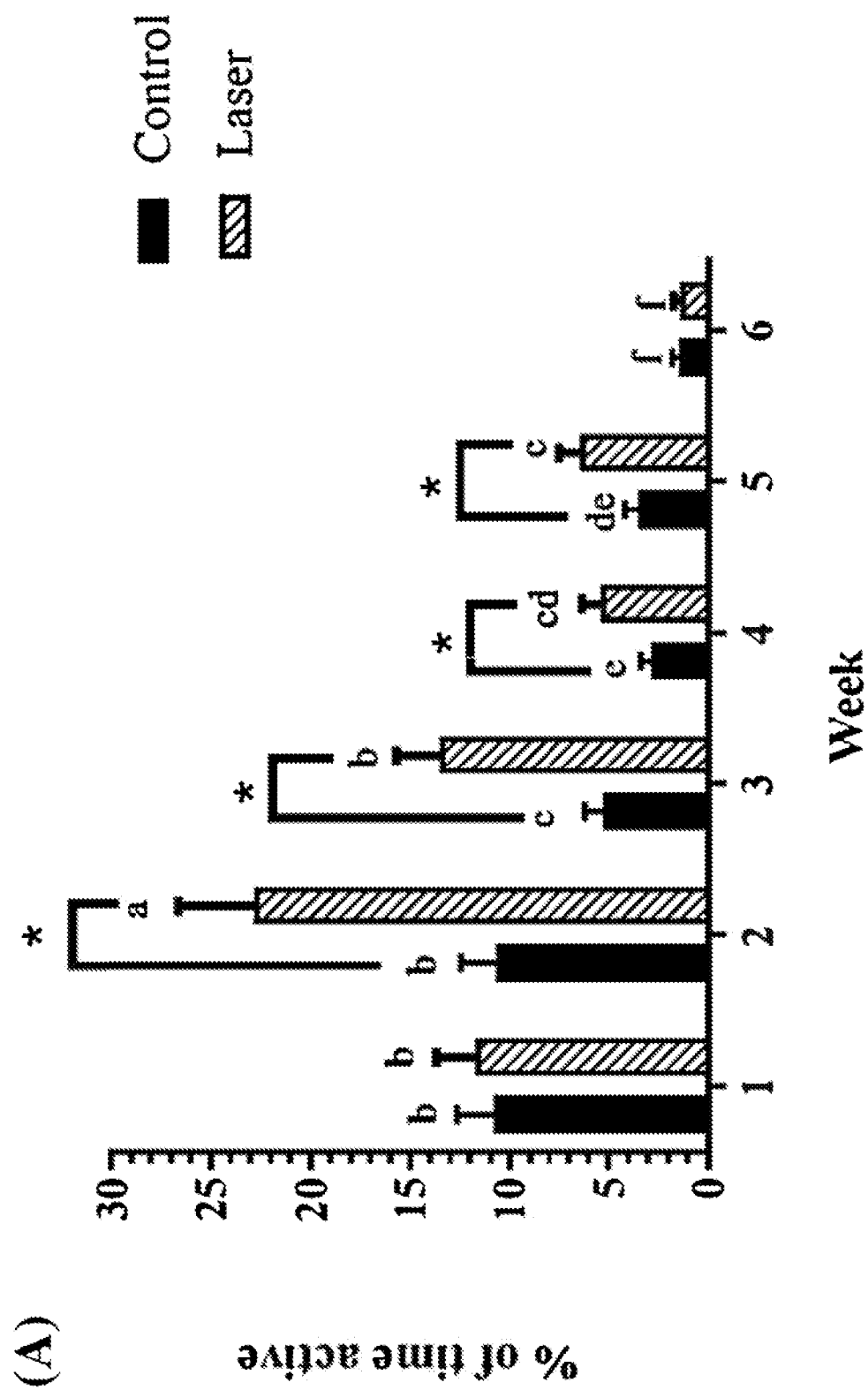
Figure 7B:
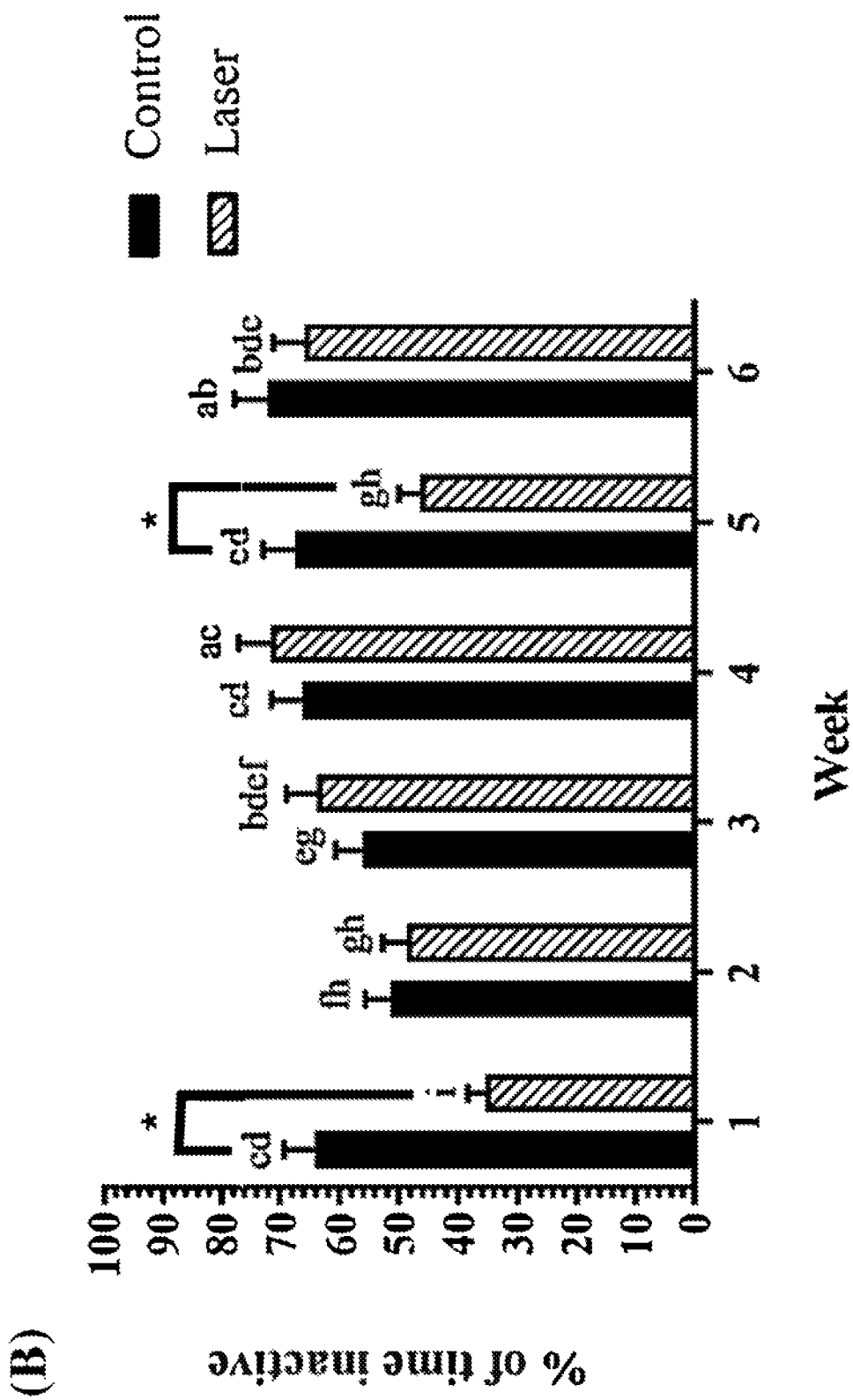
Figure 7C:
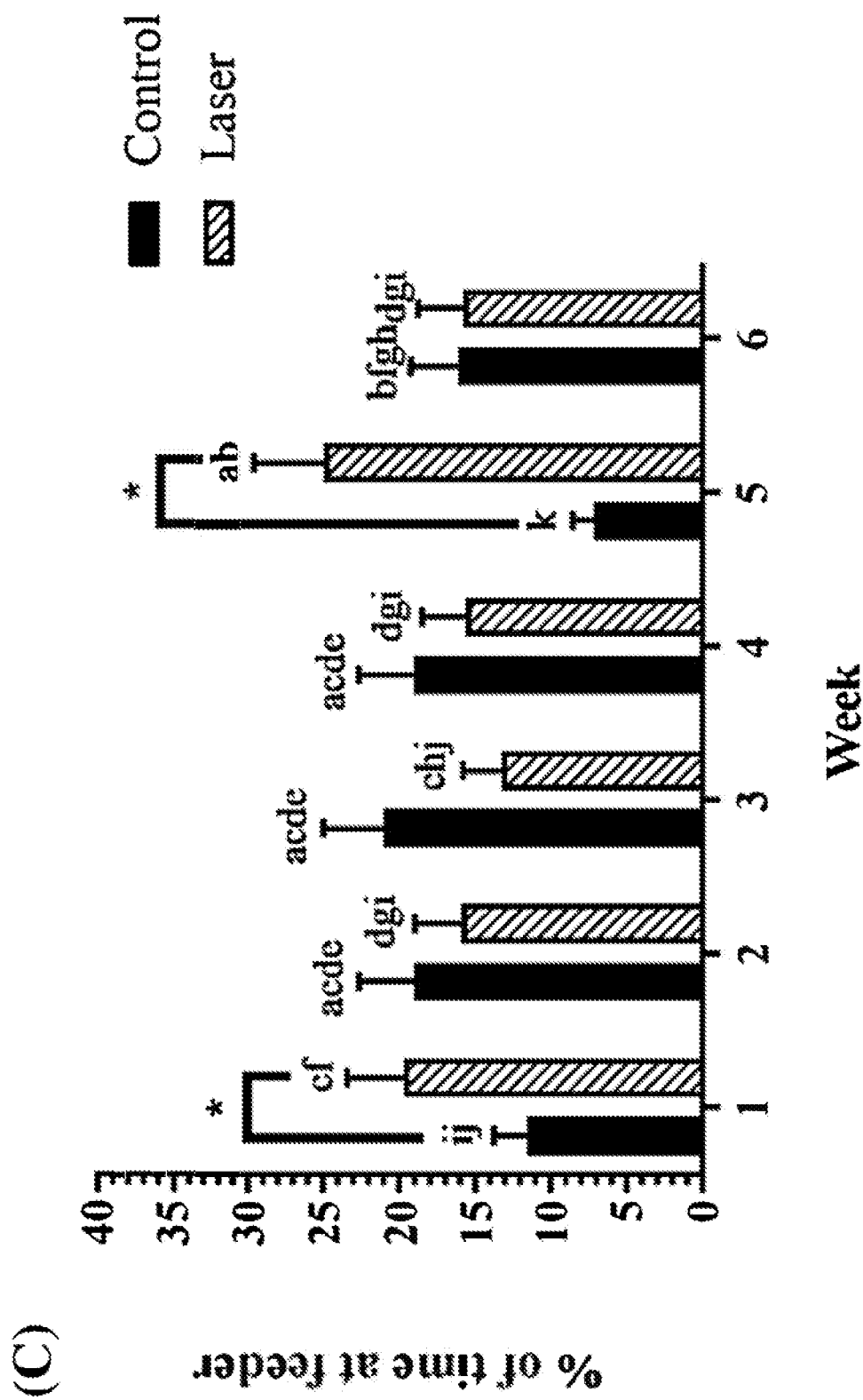
Figure 7D:
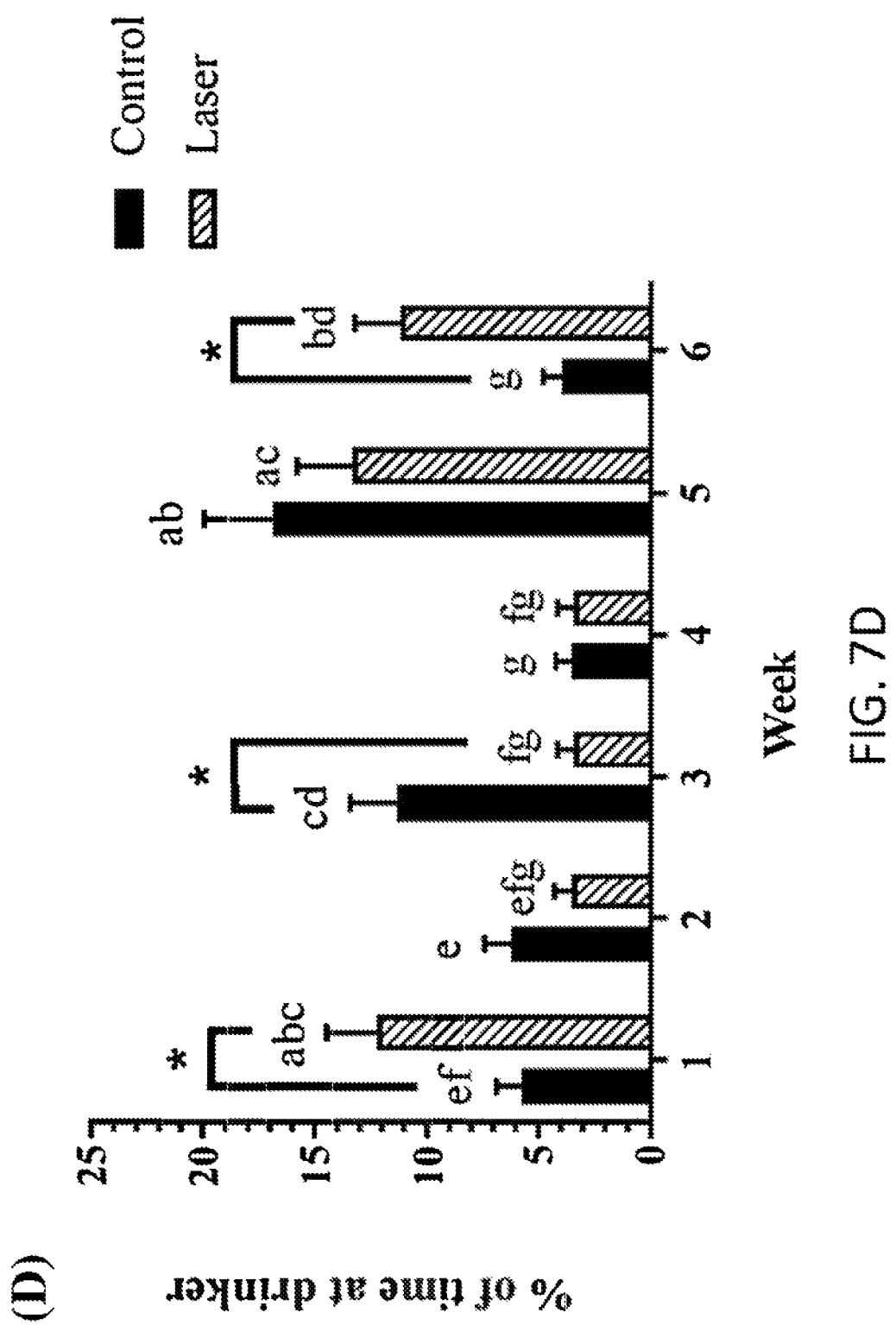

LASER birds spent more time at feeder on d0, 1, 2, 5, 8 than the control (P≤0.05, FIG. 6C). On d5, LASER birds were at the feeder 10.2±2.4% more than control birds, equal to an 83.7% increase. Control birds spent a greater amount of time at the feeder on d3. Control birds spent a greater percent of time at drinker on d0, 1, 5, 7, and 8, but LASER birds spent more time at drinker on d2 and 6 (P≤0.05, FIG. 6D). Control birds displayed a greater percent of "other" behaviors on d2, 5, and 8, while LASER birds showed a greater percent of this behavior on d4 (P≤0.05). Other behavior did not contribute heavily to focal bird time budget, with a maximum percent of 4.01±0.59% in LASER birds (d3) and 4.02±0.63% in control birds (d2). The estimated mean time budgets of laser-enriched birds over d0-8 were: 14.1±1.29% active, 47.09±2.83% inactive, 14.05±1.87% at feeder, 6.62±1.13% at drinker, and 1.37±0.19% engaged in other behaviors. The estimated time budgets of control birds over d0-8 were: 6.34±0.60% active, 59.8±3.57% inactive, 9.8±1.32% at feeder, 10.17±1.69% at drinker, and 1.66±0.23% engaged in other behavior.

When analyzing one d/wk (Thursday of each week) the wk x treatment interaction was significant in all behavior categories (P≤0.01). LASER birds spent a greater percent of their time active than control birds on wk 2, 12.2±2.8% greater (114% increase); wk 3, 8.2±1.6% greater (157% increase); wk 4, 2.5±0.74% greater (90% increase); and wk 5, 2.9±0.87% greater (82% increase, P≤0.05, FIG. 7A). LASER birds spent less time inactive than the control on wk 1 and 5 (P≤0.05, FIG. 7B). Time at feeder was increased in wk 1 by 8.2±3.0%, and in wk 5 by 17.8±3.0%, a 247% increase, in LASER birds (P≤0.05, FIG. 7C). Time spent at drinker was increased in LASER birds by 6.5±1.7% in wk 1 and 7.2±1.43% on wk 6 and was 7.9±1.4% higher in control birds on wk 3 (P≤0.05, FIG. 7D). Other behavior showed no differences by treatment within individual weeks. The estimated mean time budgets of laser-enriched birds over wk 1-6 were: 7.49±1.2% active, 53.77±4.07% inactive, 17.19±3.17% at feeder, 6.49±1.18% at drinker, and 0.83±0.45% engaged in other behavior. The estimated mean time budgets of control birds over wk 1-6 were: 4.55±0.73% active, 62.64±4.73% inactive, 14.75±2.72% at feeder, 6.75±1.22% at drinker, and 0.77±0.42% engaged in other behavior.

FIGS. 7A-D relate to: Ross 308 broiler home pen behavior results of focal bird during 4-min laser periods: week by treatment LSMeans (±SEM)[1] percent of time spent: (A) active; (B) inactive; (C) at feeder; and (D) at drinker; with day and treatment as main effects, wk 1-6[2]

[1]Values lacking a common superscript are significantly different (P≤0.05)
[2]Individual P-values from wk 1-6, respectively: A) 0.7414, 0.0013, 0.0001, 0.014, 0.0182, 0.931; B)<0.0001, 0.6187, 0.2516, 0.492, 0.0008, 0.4202; C) 0.049, 0.5083, 0.0867, 0.4501, <0.0001, 0.9323; and D) 0.006, 0.0519, <0.0001, 0.939, 0.3656, 0.0002.

b. Latency to Feed

Latency to feed categorical distributions were affected by day (d0-8, P<0.01) and by wk (wk 1-6, P=0.03). Over days 0-8, 15.34±0.40% of LASER focal birds were at the feeder during laser periods (but not in 5 mins following laser turning off), 33.33±0.73% went to the feeder in <5 mins following laser turn off, 22.22±0.48% were already at the feeder when laser periods ended, and 29.1±0.77% never went to the feeder during or in 5 mins following laser period. Individual daily proportions are presented in FIG. 8A. Over wk 1-6, 5.44±0.37% of birds were at the feeder during laser periods only, 28.57±0.76% went to feeder within 5 min of laser turn off, 26.53±0.62% were already at the feeder when the laser turned off, and 39.46±0.96% were never at the feeder. Weekly breakdowns are presented in FIG. 8B.

Figure 8A:
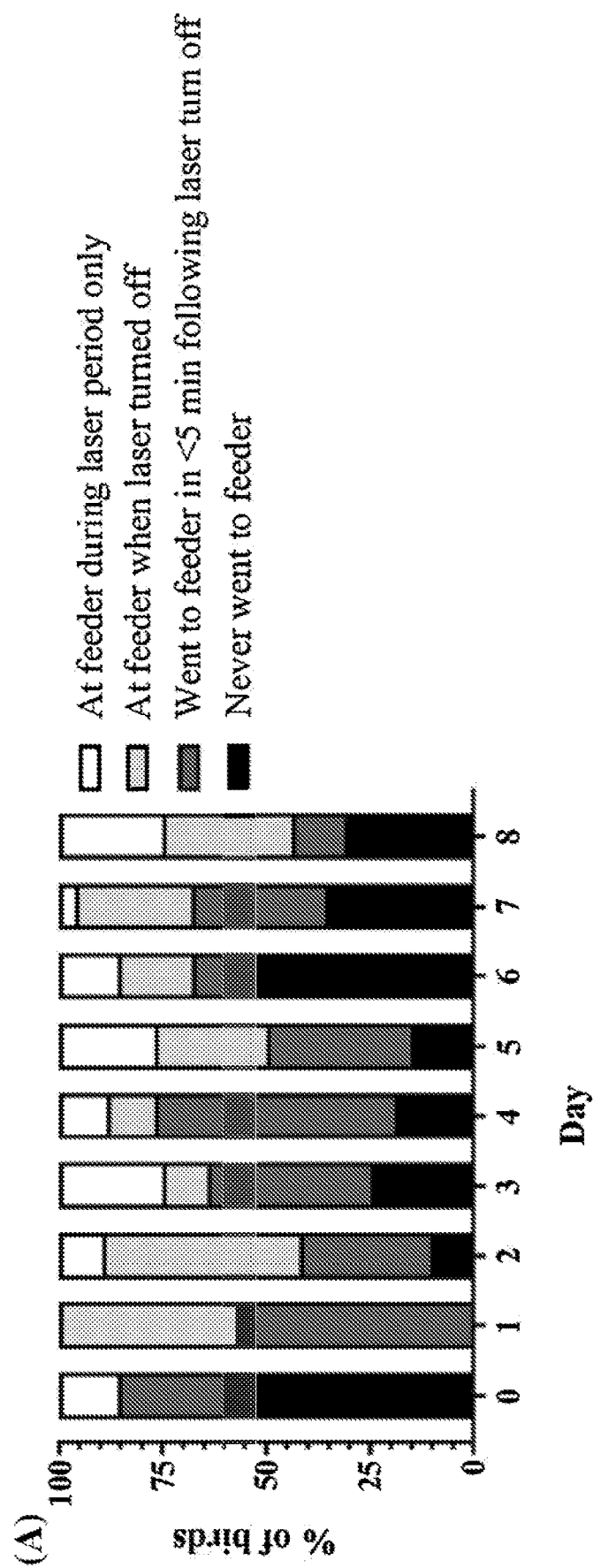
Figure 8B:
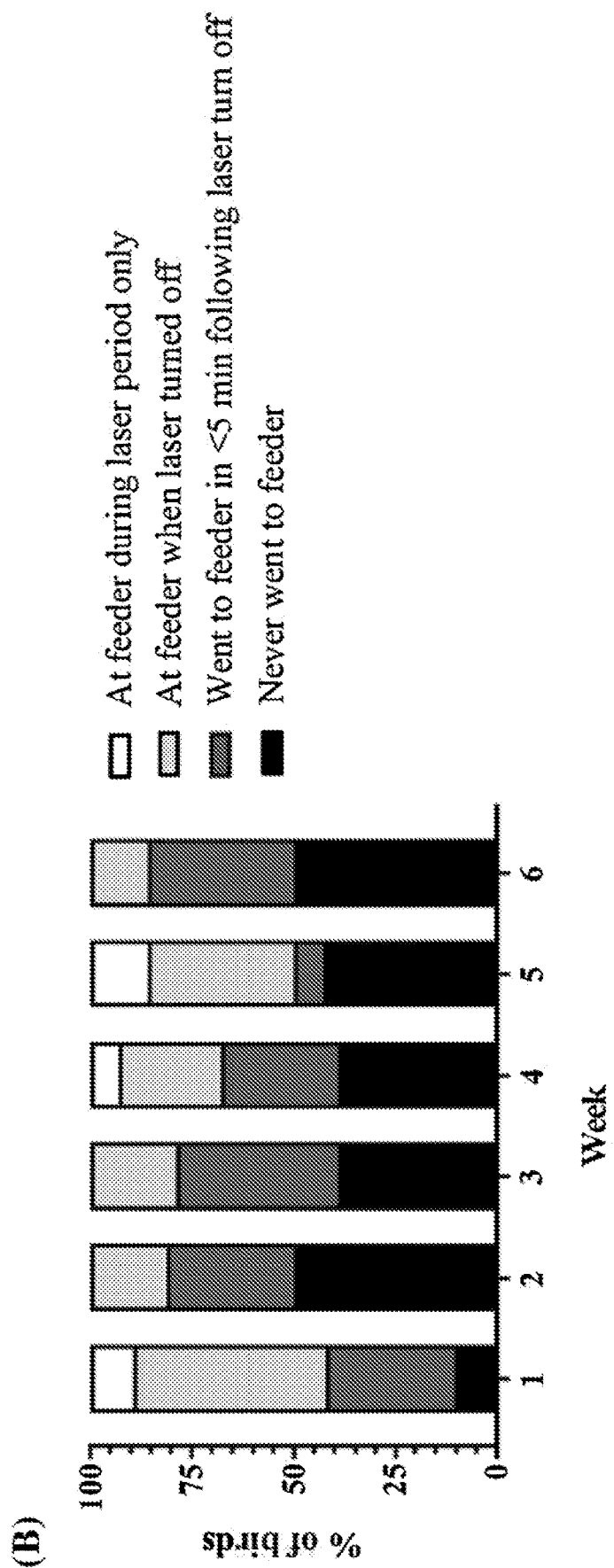
Figure 9A:
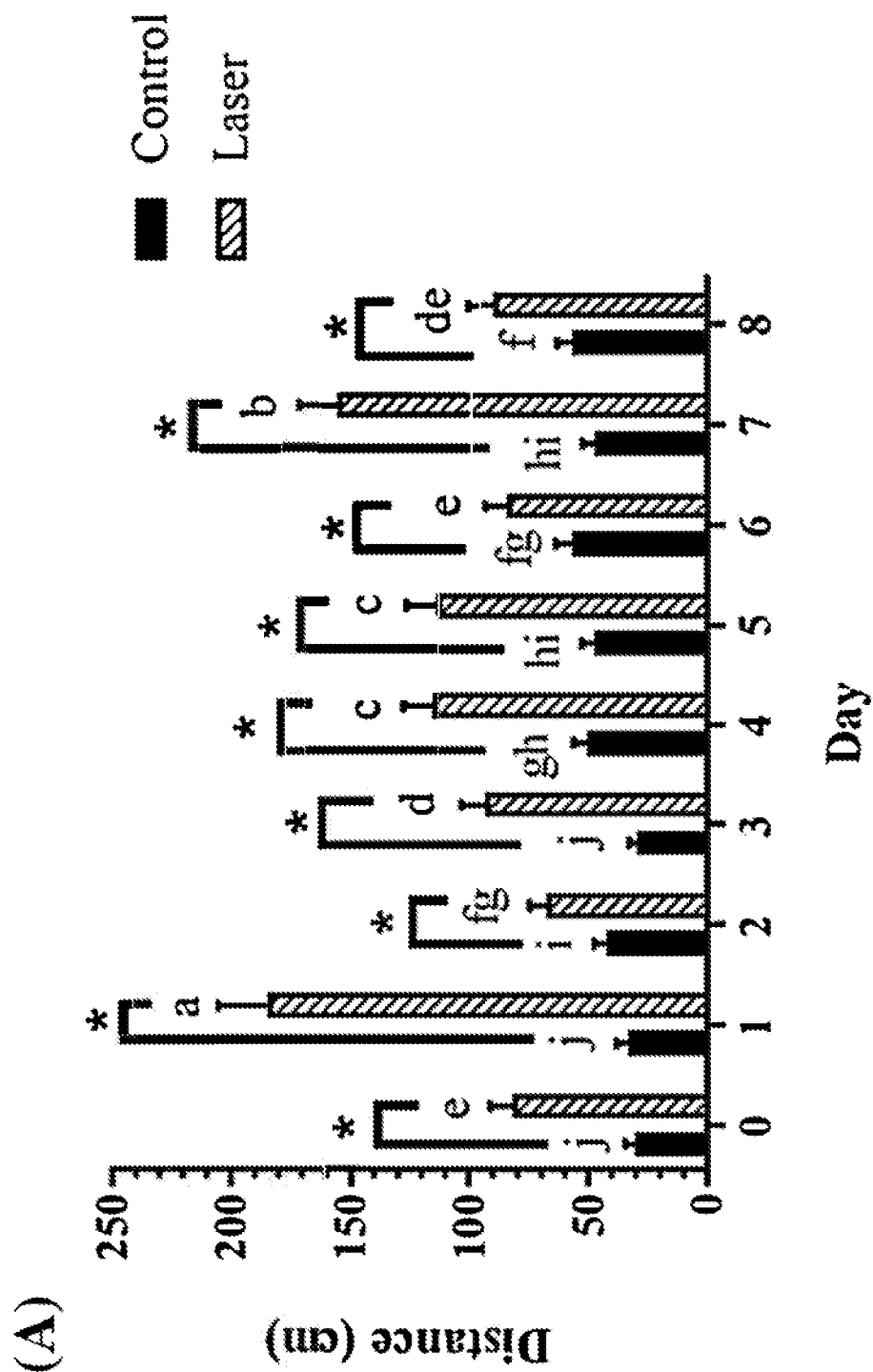
Figure 9B:
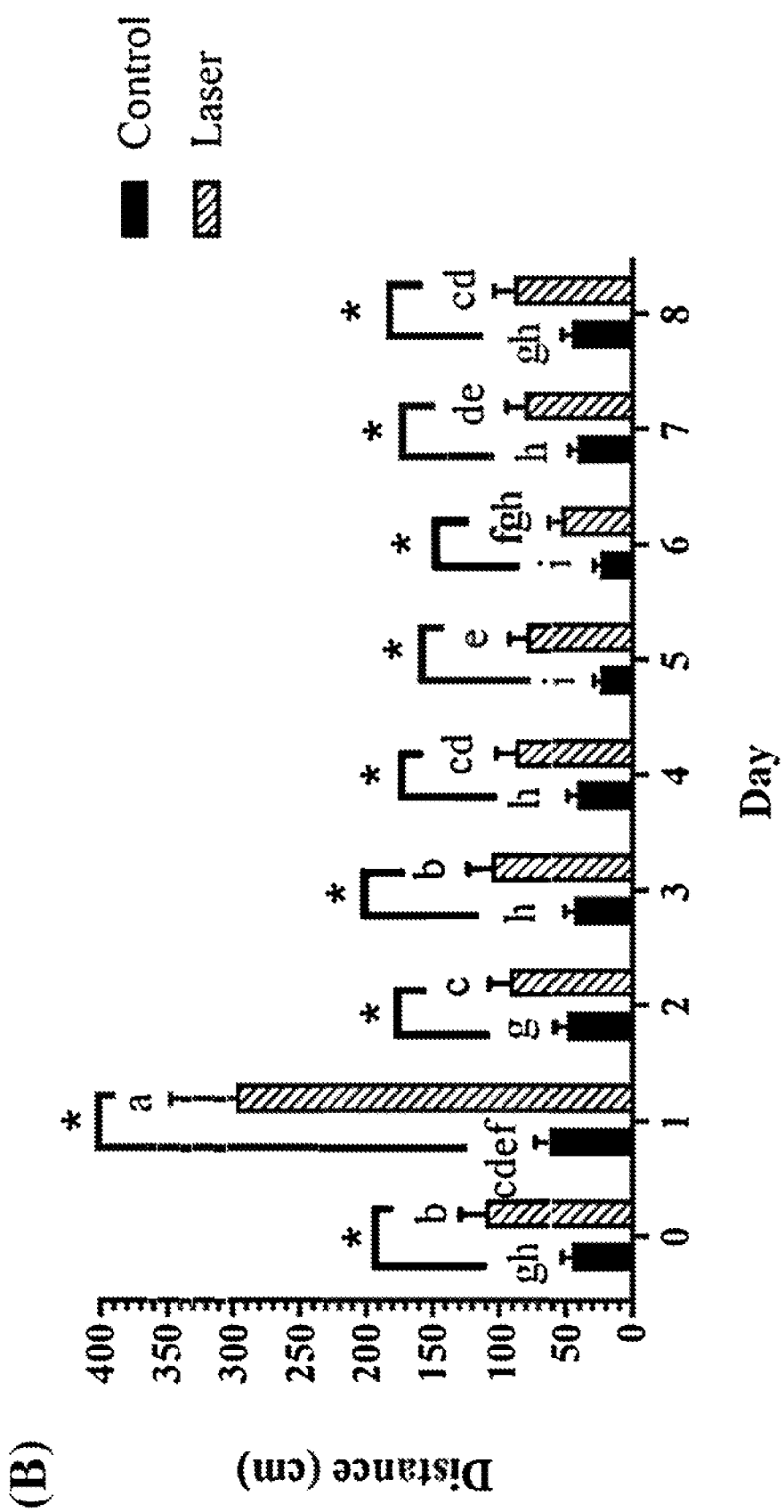
Figure 9C:
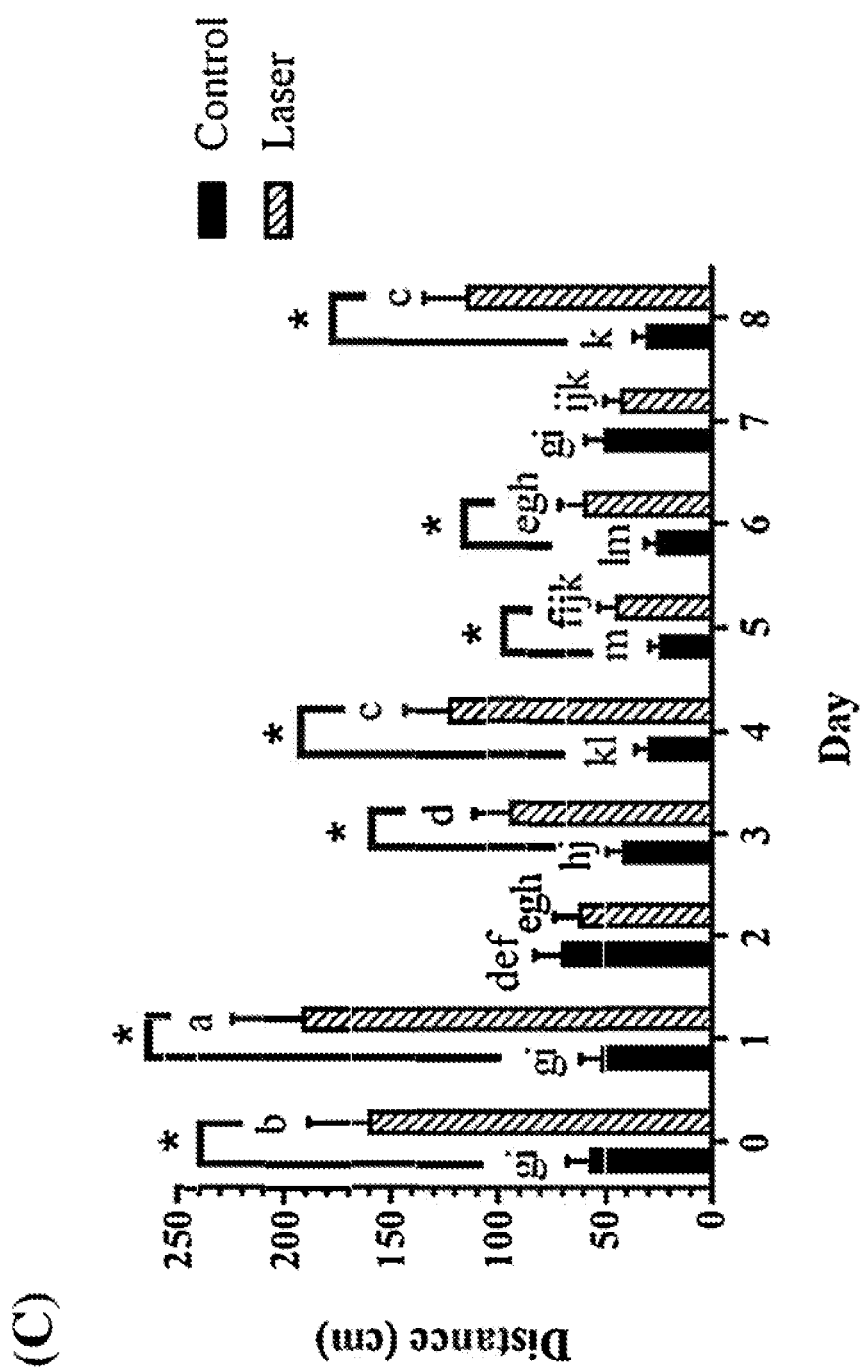
Figure 9D:
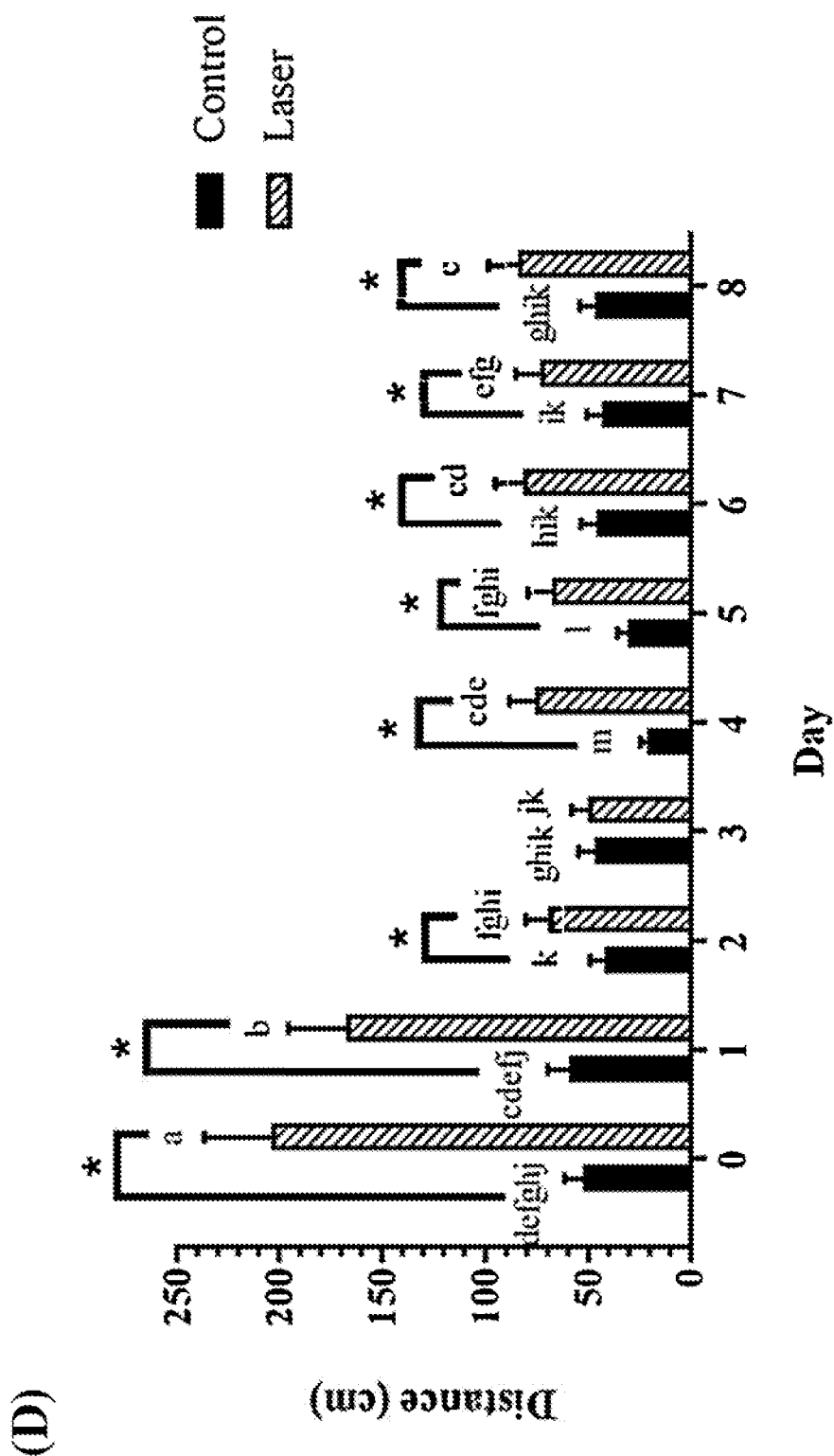
Figure 9E:
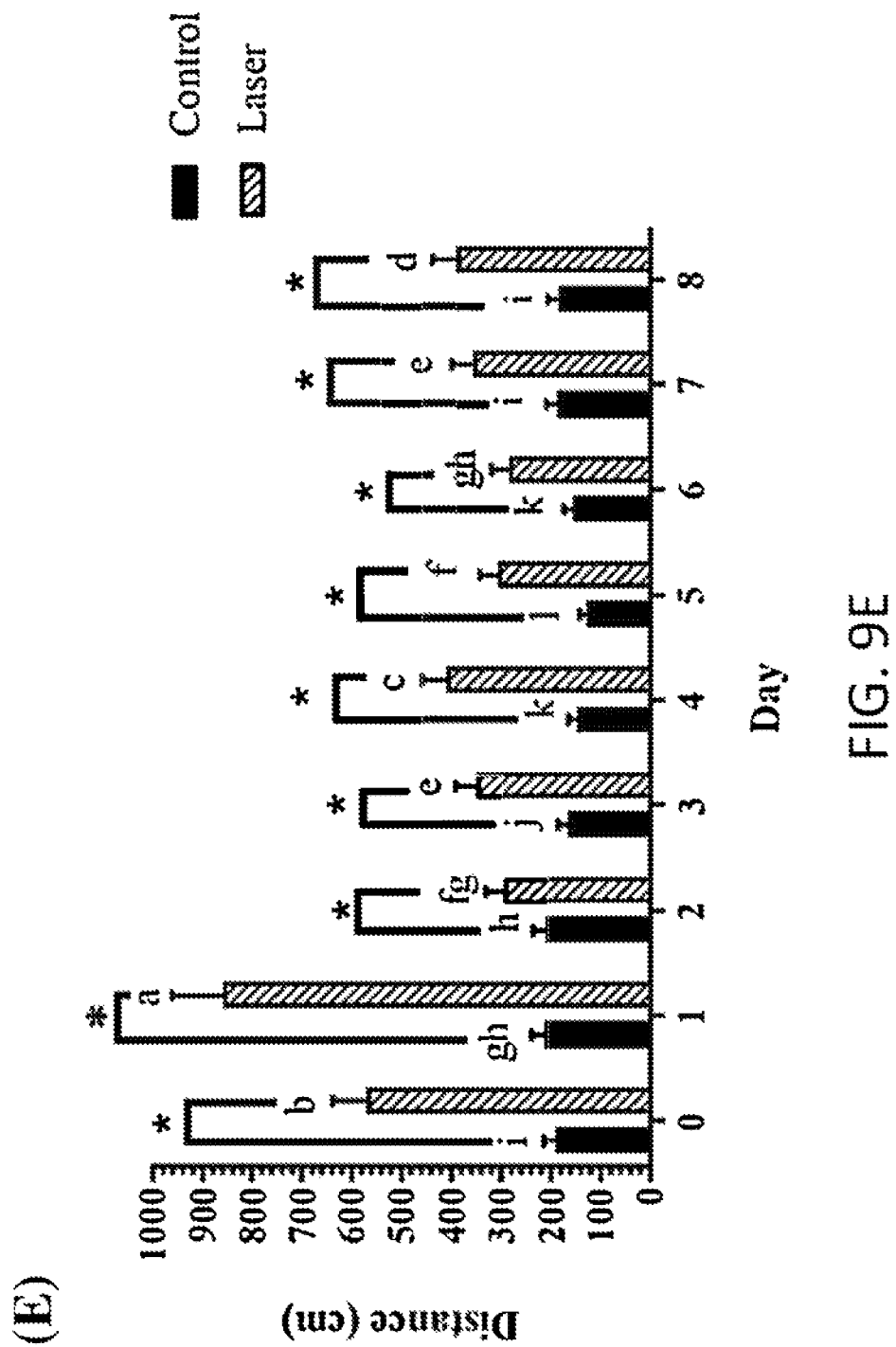

FIGS. 8A-B relate to: Ross 308 broiler latency to feed of LASER focal birds (n=7) by: (A) day, P=0.0014; and (B) week, P=0.03. Latency was recorded in seconds using video recordings from laser periods and for 5 min following, then separated into 4 mutually exclusive categories c. Walking Distance For the first 9 days on trial, the day x treatment interaction was significant for each min individually and total distance walked (P≤0.01). LASER birds walked further in the first min on all days, with increases up to 151.1±12.9 cm on d1, a 452% increase, and 107.5±11 cm on d7, greater than a 228% increase (P≤0.05, FIG. 9A). Likewise, LASER birds walked more on all days during the second min, with an increase of 236.3±30 cm, or a 237% increase, on d1 (P<0.05, FIG. 9B). During min 3, LASER birds walked more than control on d0, 1, 3, 4, 5, 6, and 8, with a peak increase of 139.8±21.2 cm, or a 270% increase, on d1 (P≤0.05, FIG. 9C). In min 4, LASER birds walked greater distances on d0, 1, 2, 4, 5, 6, 7, and 8, walking 150.9±21 cm (287%) more on d0 and 108.4±19.2 cm (183%) more on d1 (P≤0.05, FIG. 9D). Over the total 4-min laser periods, LASER focal birds walked a greater distance than control on all days, with increases reaching up to 646.45±64.6 cm, a 303% increase (d1,P≤0.05, FIG. 9E). FIGS. 9A-E relate to: Mean walking distance (cm) of focal bird during 4-min laser periods day x treatment LSMeans (±SEM)[1] during: (A) min 1; (B) min 2; (C) min 3; (D) min 4; and (E) total distance walked[2] (4 min), with day and treatment as main effects, d0-8[3]

[1]Values lacking a common superscript are significantly different (P≤0.05)
[2] Total distance convergence criteria relaxed to $10^{-6}$
[3]Individual P-values from d0-8, respectively: A) <0.0001, <0.0001, 0.0051, <0.0001, <0.0001, <0.0001, 0.015, <0.0001, 0.0046; B) 0.0002, <0.0001, 0.0091, 0.0002, 0.0021, <0.0001, 0.0013, 0.0045, 0.0052; C)<0.0001, <0.0001, 0.6176, 0.0008, <0.0001, 0.0154, 0.0008, 0.4844, 22<0.0001; D)<0.0001, <0.0001, 0.0421, 0.7928, <0.0001, 0.0008, 0.0141, 0.0247, 0.0119; and E) 23<0.0001, <0.0001, 0.0469, <0.0001, <0.0001, <0.0001, 0.0004, 0.0002, <0.0001.

Analyzed on a weekly basis (1 d/wk) the wk x treatment interaction was significant for each min individually and total distance walked (P≤0.01). During min 1 of laser periods LASER birds walked more on wk 1, 2, 3, 4, and 5, with increases up to 88.6±15.7 cm (130%) on wk 2 and 51.2±7 cm (215%) on wk 5 (P≤0.05, FIG. 10A). During min 2, LASER focal bird walking distance was higher on wk 2 and 5 (P≤0.05, FIG. 10B). In the third min, the LASER birds walked more on wk 2, 3, 4, and 5, with increases up to 80±19.7 cm (108%) on wk 2, P≤0.05, FIG. 10C. Within min 4 LASER focal birds walked further than the control on wk 2 and 4, with an increase of 83.4±19.1 cm (176%) on wk 2 (P≤0.05, FIG. 10D). Total distance walked during 4-min laser periods was increased on wk 2-5 in LASER pens, with the greatest increase of 367.5±61.9 cm, or 150%, on wk 2 (P≤0.05, FIG. 10E).

FIGS. 10A-E relate to: Mean walking distance (cm) of focal bird during 4-min laser periods: week by treatment LSMeans (±SEM)[1] during: A) min 1; B) min 2[2]; C) min 3; D) min 4; and E) total distance walked; with week and treatment as main effects, wk 1-6[3]

[1]Values lacking a common superscript are significantly different (P≤0.05)
[2] Min 2 convergence criteria relaxed to 10'
[3]Individual P-values from wk 1-6, respectively: A) 0.0125, <0.0001, 0.0426, <0.0001, <0.0001, 0.1839; B) 0.0977, <0.0001, 0.3027, 0.0662, <0.0001, 0.0833; C) 0.5823, 0.003, 0.0012, 0.0008, 0.0057, 0.4316; D) 0.2079, 0.0009, 0.1009, <0.0001, 0.2708, 0.2253; and E) 0.1363, <0.0001, 0.0165, <0.0001, <0.0001, 0.9931.

d. Walking Lameness

Out of the 420 lameness measures taken (70 focal birds/wk for 6 wk), 400 were scored 0 (no signs of lameness). There were 18 scores of 1 (bird showed unevenness in steps or sat down at least once), and only 2 scores of 2 (bird could not walk 1.5 m). In the control birds, 96.19% of scores were 0, 2.86% were scores of 1, and 0.95% of scores were 2. In the LASER birds, 94.29% of scores were 0, 5.71% were scores of 1, and no scores were 2. The chi square relationship of score by treatment was not significant (P=0.13).

e. Human-Approach Paradigm

The wk x treatment interaction was significant for percent of birds interacting (P≤0.01). During wk 1, control birds interacted 2.2±0.73% more (P≤0.05), but on wk 6 there were no differences in birds interacting. Averaged over both treatments and wk 1 and 6, 95.59±2.19% of birds were not interacting and there was not a wk x treatment interaction (P=0.35, Table E3). In the not interacting further classified behavior categories, there were 3.7±1.0% more control birds at the drinker on wk 1 and 1.8±0.59% more LASER birds at the drinker on wk 6, with a wk x treatment interaction (P<0.01). There were no differences in percent of birds at the feeder wk 1 or 6 (wk x treatment interaction P=0.62), and no differences in birds exhibiting other behaviors on wk 1 or 6 (wk x treatment P=0.22, Table E3).

Regarding bird location in the home pen during the HAP, the main effect of wk was significant for all quadrants of the pen and the wk x treatment interaction was significant for the first and second quadrants (P≤0.01). There were no differences in percent of birds in the first quadrant on wk 1, but there were 3.3±1.07% greater LASER birds in this quadrant on wk 6, more than double the percent of control birds (P≤0.05). There were 2.8±0.89% more control birds in the second quadrant on wk 1 (P≤0.05), but no differences in this quadrant on wk 6.

TABLE E3

Human-approach paradigm (HAP) results; percent of Ross 308 broilers Interacting vs Not Interacting and Not Interacting behavior further classified using digital image evaluation. Values presented as wk x treatment LSMeans (pooled SEM) on wk 1 and 6. N = 80 observations

| | Week 1 (%) | | Pooled | Week 6 (%) | | Pooled | P-value | |
|---|---|---|---|---|---|---|---|---|
| Behavior | Control | Laser | SEM | Control | Laser | SEM | Wk | Wk*Trt |
| Interacting | 5.46 | 3.22 | 0.74 | 2.80 | 4.31 | 0.63 | 0.09 | <0.01 |
| Not interacting | 94.00 | 96.33 | 2.18 | 96.93 | 95.09 | 2.19 | 0.70 | 0.35 |
| Not interacting further classification | | | | | | | | |
| Feeder | 4.55 | 4.67 | 0.87 | 3.81 | 3.53 | 3.67 | 0.03 | 0.62 |
| Drinker | 10.62 | 6.94 | 1.03 | 3.35 | 5.13 | 0.59 | <0.01 | <0.01 |
| Other | 83.62 | 86.93 | 2.07 | 92.11 | 90.24 | 2.14 | <0.01 | 0.22 |

[1]HAP was carried out on all pens once on wk 1 and once on wk 6. An unfamiliar human entered the pen and after 15 s, a photograph was taken to analyze the birds' response
[2]Data was collected in bird counts, converted to percent of birds in the pen exhibiting each behavior

TABLE E4

Human-approach paradigm (HAP) results; percent of Ross 308 broilers present in each quadrant of the pen. Values presented as wk x treatment LSMeans (pooled SEM) on wk 1 and 6. N = 80 observations

| | Week 1 (%) | | Pooled | Week 6 (%) | | Pooled | P-value | |
|---|---|---|---|---|---|---|---|---|
| Quadrant | Control | Laser | SEM | Control | Laser | SEM | Wk | Wk*Trt |
| 1 | 6.86 | 5.57 | 1.41 | 3.00 | 6.34 | 1.07 | <0.01 | <0.01 |
| 2 | 8.95 | 6.18 | 0.89 | 20.44 | 22.18 | 2.10 | <0.01 | <0.01 |
| 3 | 26.00 | 26.62 | 1.46 | 38.38 | 36.07 | 1.86 | <0.01 | 0.29 |
| 4 | 58.68 | 62.08 | 4.03 | 36.98 | 36.83 | 2.60 | <0.01 | 0.36 |

[1]HAP was carried out on all pens once on wk 1 and once on wk 6. An unfamiliar human entered the pen and after 15 s, a photograph was taken to analyze the birds' response
[2]Data was collected in bird counts, converted to percent of birds in the pen exhibiting each behavior

4. Discussion

Motivation is understood to be a process driven by both external/environmental and internal/physiological factors resulting in goal-oriented behavior or action (Toates, 1986). Motivation in broiler birds, however, is not well understood. It has been shown that food and exploring novel objects motivates broilers (Newberry, 1999, Bokkers, 2002; Bokkers, 2004). A combination of these motivations may have driven the increase in active behavior seen every day in the first 9 d except d2 and 6 (FIG. 6A). Further, the performance of LASER birds was not compromised but was improved, with an overall decrease of 0.07 FCR points and total increased weight gain of 0.24 kg/bird (Meyer, et al., 2019). Thus, the success of the novel laser device tested here in motivating, not forcing an increase in active behavior and walking distance, is among the first to accomplish increased movement in combination with improved performance.

We hypothesize that this success may be due in part to the laser dots stimulating pecking behavior, a documented response to small particles in broilers (Hogan, 1973), or to visual-based foraging and predatory behavior natural to the chicken's junglefowl ancestors (Fernandez-Juricic, 2004). Junglefowl continuously move while foraging (Arshad, 2000), a behavior that may have been replicated in broilers choosing to follow lasers around the pen in this study. However, during wk 6, there were no differences in proportion of active/inactive behavior due to enrichment. This is likely a result of maximal body weight overriding motivation to move as birds neared the end of the grow-out, rather than habituation to the lasers, as a similar pattern is observed in declined use of perches after wk 5 in broilers (Bokkers, 2003). Further, work in laying hens when exposed to environmental enrichment in the form of strings for limited daily time periods (10 min), rather than constant exposure, maintained interest in pecking at the strings for 14 weeks (Jones, et al., 2000).

Figure 10A:
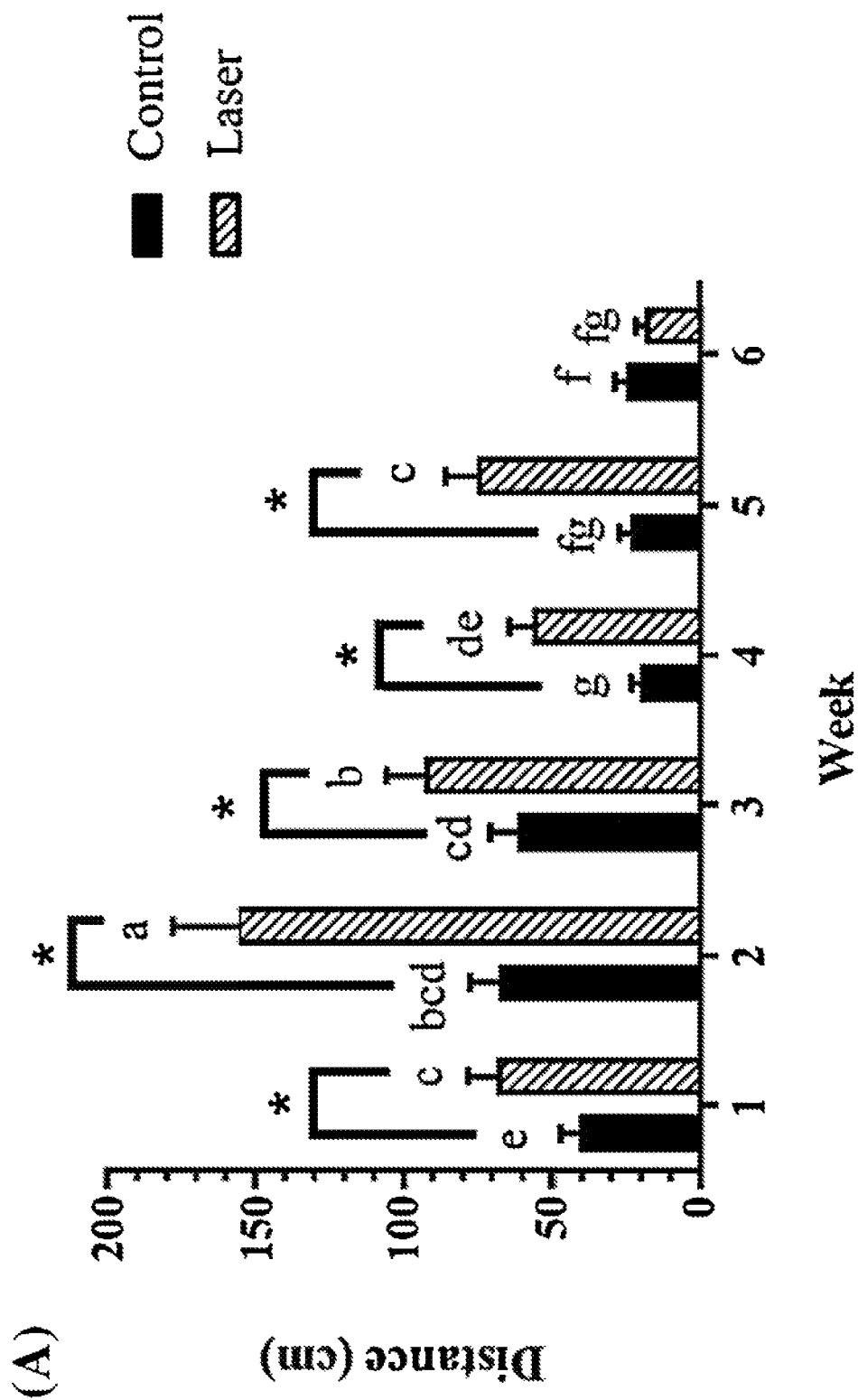
Figure 10B:
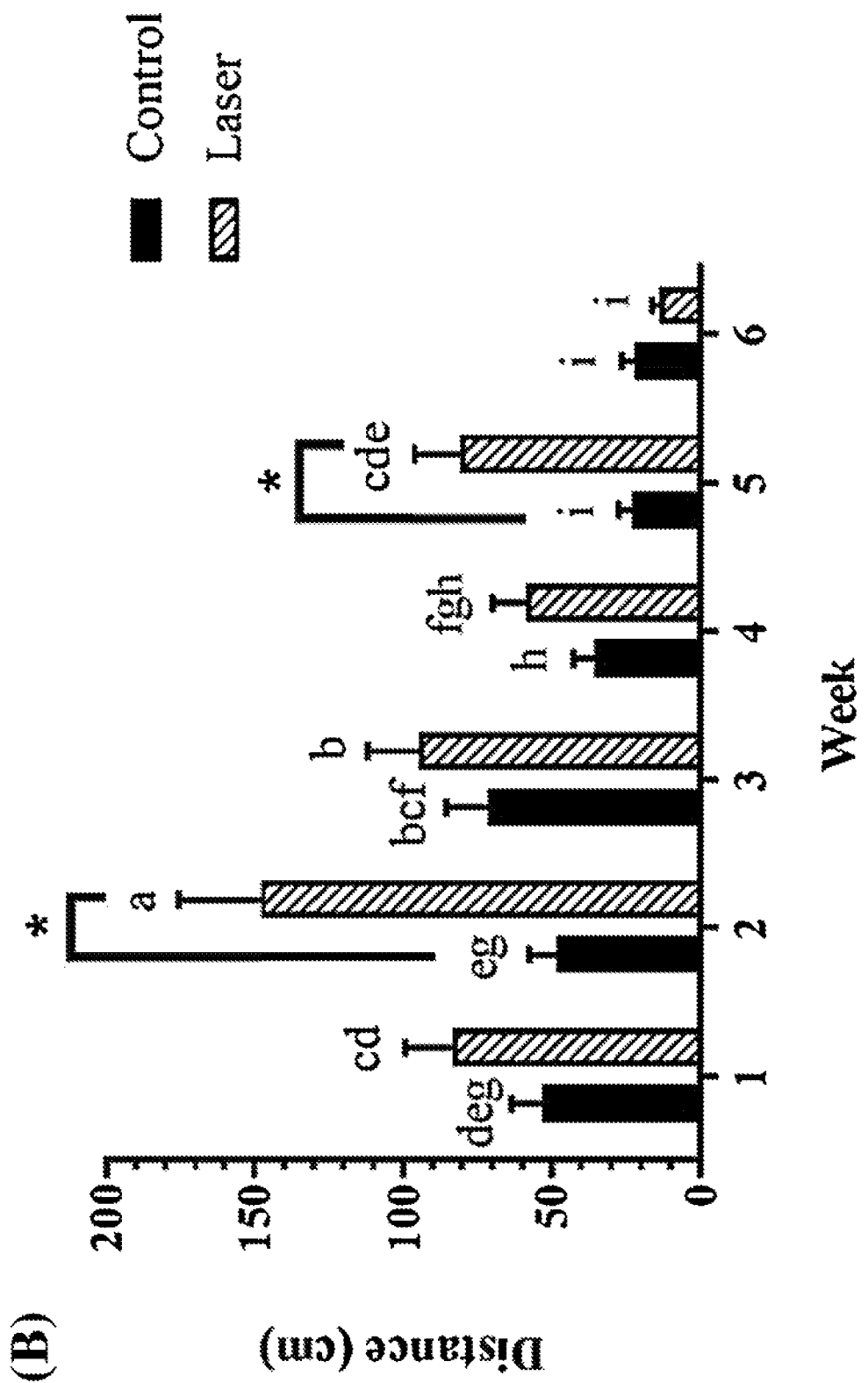
Figure 10C:
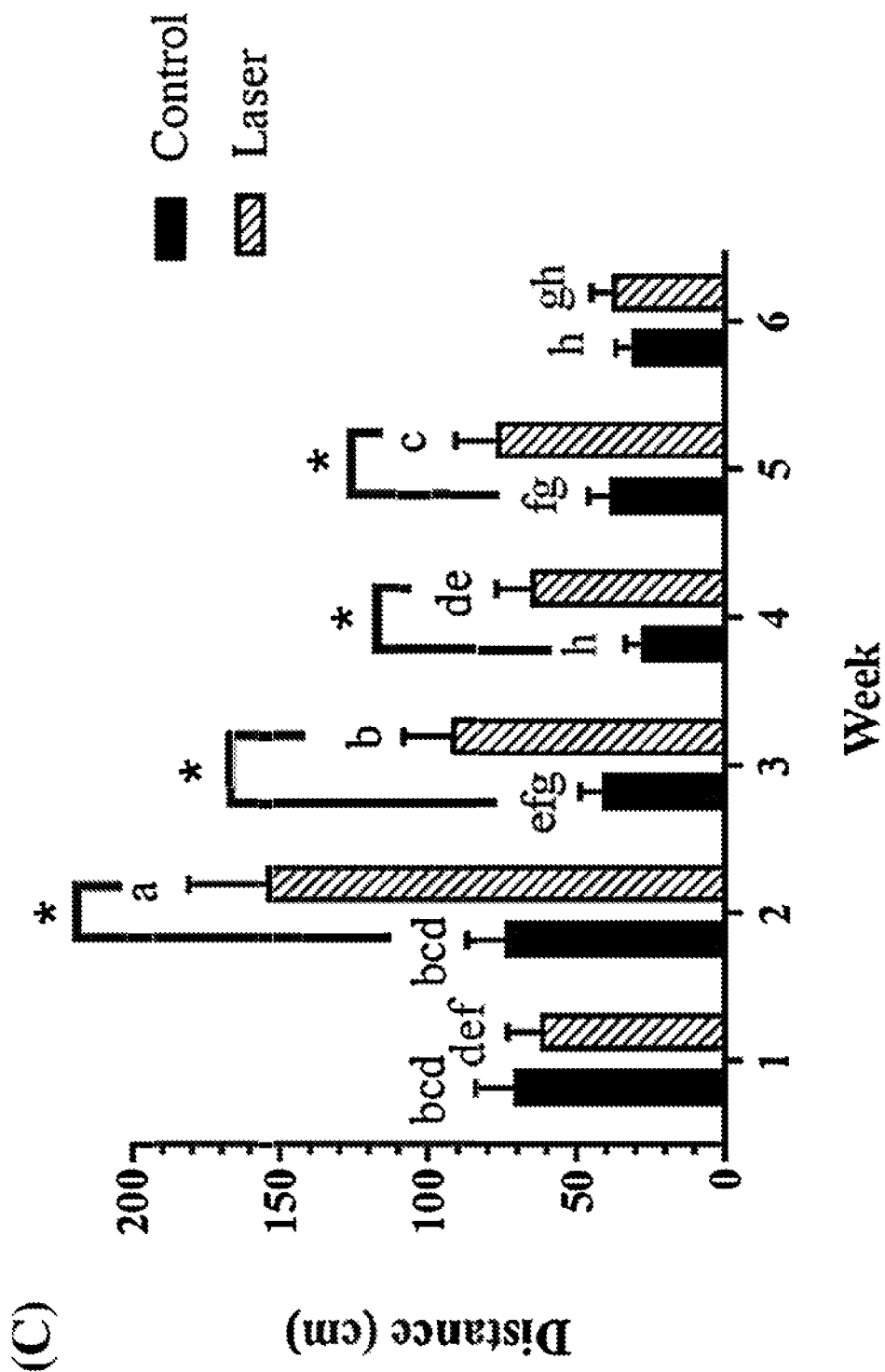
Figure 10D:
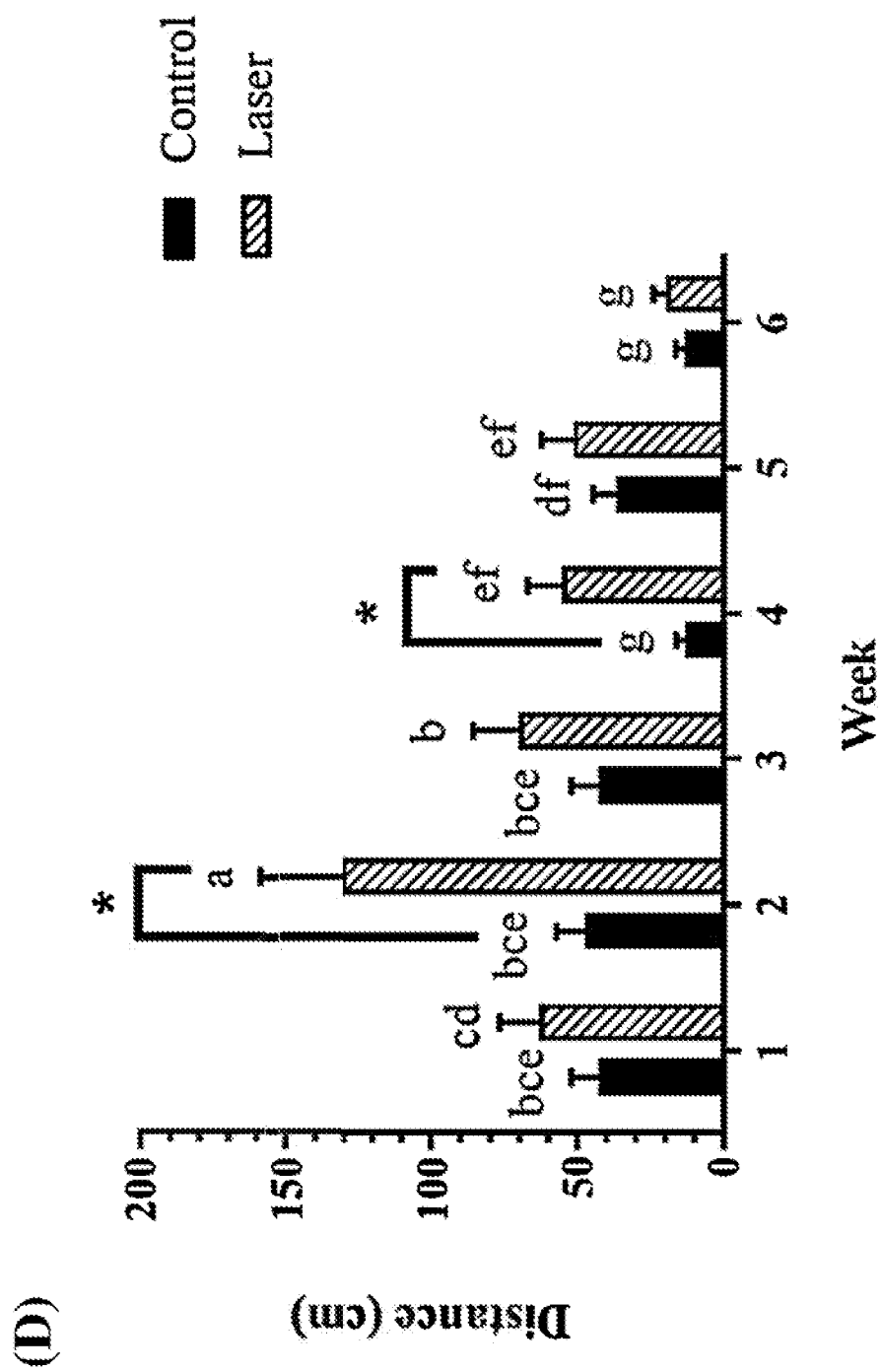
Figure 10E:
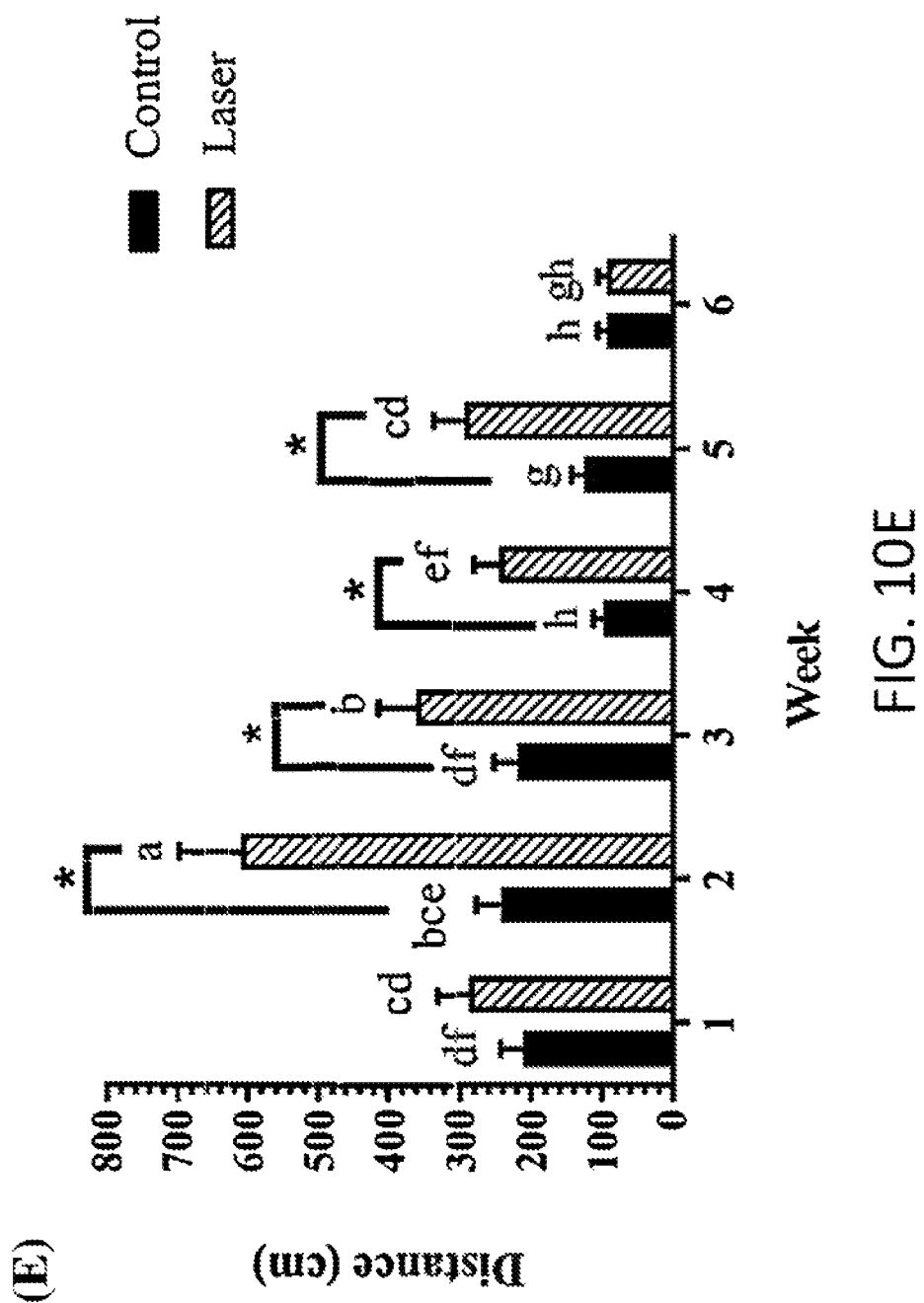

An interesting behavior pattern was detected in the weekly walking distance analysis where min 3 more closely followed min 1 than min 2 in terms of increased distance walked, and LASER birds walked more than the control wk 2-5 during this min (FIG. 10C). Hence, it appears that recording the distance walked during each min of the 4-min laser period is necessary, as over time birds moved more in min 1 and 3 than 2 and 4. This likely contributed to the increased total distance walked during laser periods wk 2-5 by LASER focal birds (FIG. 10E), resulting in a 215% increase in walking distance on wk 5, a notable outcome in birds nearing-market weight.

As the device was entirely novel, a 4-min laser period was used with the intention to determine if this length of time was successful in stimulating bird activity and walking distance. Our data indicate that within the first 9 days, a 4-min period was effective in promoting walking up to and including min 4. When viewing the entire 6-wk grow-out, following wk 4 the increase in walking distance and active behavior declined after min 3. Thus, it is possible that a 3-min laser period would suffice for broilers older than 4 wk, but for birds 4 wk or younger, 4-min periods were effective. Although no difference in activity was seen during wk 6 (d35-42), weight gain was increased by 0.22 kg and FCR was decreased by 18 points in the critical finisher period (Meyer, et al. 2019). The increased weight gain of 0.24 kg/bird overall could be translated to the range of $0.71-$1.39 more saleable breast meat/bird, using current prices (USDA, 2019). Additionally, the inclusion of this device would not require altered management or human labor to increase bird activity and could be easily cleaned and re-used over multiple flocks. Birds cannot physically interact with the device, hence no changes to biosecurity/cleaning are needed. This is practical compared to other forms of enrichment designed to stimulate activity that must be cleaned or replaced within and between flocks, such as straw bales (Kells, et al, 2001), pecking strings (Bailie and O'Connell, 2015), or other novel objects (Altan, et al., 2013). Additionally, the laser does not promote object-guarding behavior within the bird hierarchy.

The increased distance walked in proportion to the increase in activity (walking or running) makes it likely that LASER birds were moving at an increased speed to account for this increased distance. Future studies using this device that incorporate a walking speed measure could validate this hypothesis. In work by Dawkins and others (2009) an increased walking speed, along with increased time spent walking, resulted in decreased lameness. However, in our research conditions, a score of 2 was rare and no LASER birds received a 2, hence we did not detect a difference due to laser enrichment. Taking into account the increased weight gain and improved FCR in LASER birds (Meyer, et al., 2019), no detection of lameness is a positive outcome. These data indicate that the paradigm postulated by Weeks et al. (2000) that selection for improved FCR leads to less active animals, and thus more lameness, may have been counteracted by the increased exercise stimulated by the laser device.

The increase in feeder behavior seen in LASER birds on proportionally more days/weeks is logical, as LASER birds had 0.02 kg greater feed intake in the starter period, 0.05 kg greater in the grower, and 0.14 kg greater in the finisher (Meyer, et al. 2019). Further, feeding latency showed that d0-8, approximately 71% of LASER focal birds were at the feeder at least once either during or within 5 min following laser periods. Over wk 1-6, 60.5% of LASER focal birds were at the feeder either during or shortly following laser periods. This is a positive result, along with the increased time spent at feeder in LASER birds, indicating that the device increased bird movement but may have also encouraged feeding, perhaps by stimulating natural foraging or predatory behavior. In 3 4-min timepoints selected for behavior and walking distance analysis that were not during scheduled laser periods (06:30, 18:30, and 22:30), LASER birds walked further than control birds on d1 and wk 6, spent more time active on d1 and 3, and were at the feeder more on wk 4 and 5 ($P<0.05$, unpublished data). These data indicate a maintenance of activity and feeder behavior outside of the laser periods.

The HAP was used here to measure fearfulness in the flock, a measure validated in swine by Weimer and others (2014), based on methods used in pigs and cattle by Hemsworth, et al. (1996). Results in these species have shown that animals with positive, regular interactions with humans were quicker to approach, indicative of decreased fear. Environmental enrichment has been shown to decrease fear responses in poultry, for example reducing freezing, avoiding novel objects, and latency to enter an unfamiliar environment (Jones and Waddington, 1992). Classical music (a form of sensory enrichment) played to layer-type chicks decreased tonic immobility duration and heterophil: lymphocyte ratio (Dávila, et al., 2011). However, in work by Bizeray, et al. (2002b) a barrier treatment increased tonic immobility (a measure of fearfulness in birds). The "touch test" and "avoidance distance test" have been validated in laying hens, where response to humans was positively influenced by more than minimal human contact (Graml, et al., 2008). Within this study, the overall proportion of control birds interacting with the human decreased from wk 1 to 6, while the proportion of LASER birds interacting increased.

A greater number of LASER birds were counted in quadrant 1, closest to the unfamiliar human, during wk 6 than control birds. Importantly, there was no evidence of piling, a negative behavior associated with fear in poultry (Campbell, et al., 2016). However, this method requires further research in broilers and is likely to be more applicable in poultry species that naturally tend to approach people, such as commercial turkeys. Other stress markers, including measuring corticosterone concentrations from the serum or feathers, have been validated in broilers and may be an alternative methodology for determining stress (Weimer, et al., 2018).

In summary, these data have provided strong evidence that this novel environmental enrichment device positively increased broiler bird physical activity without impacting lameness. This unique tool motivated broilers to move of their own volition by stimulating them visually, encompassing physical, occupational, sensory, and nutritional enrichment. The laser device is practical and applicable to commercial barns without changing grow-out procedures or negatively impacting bird welfare or performance.

REFERENCES REGARDING SECTION E

Altan, O., C. Seremet, and H. Bayraktar. 2013. The effects of early environmental enrichment on performance, fear and physiological responses to acute stress of broiler. Arch. Geflugelk 77:23-28.

Alvino, G. M., G. S. Archer, and J. A. Mench. 2009. Behavioural time budgets of broiler chickens reared in varying light intensities. Appl Anim Behav Sci 118:54-61.

Arshad, M., Zakaria, M., Sajap, A. S., Ismail, A. 2000. Food and Feeding Habits of Red Junglefowl. Pak J Biol Sci 3:1024-2026.

Bailie, C. L., and N. E. O'Connell. 2015. The influence of providing perches and string on activity levels, fearfulness and leg health in commercial broiler chickens. Animal 9:660-668.

Bassler, A. W., C. Arnould, A. Butterworth, L. Colin, I. C. De Jong, V. Ferrante, P. Ferrari, S. Haslam, F. Wemelsfelder, and H. J. Blokhuis. 2013. Potential risk factors associated with contact dermatitis, lameness, negative emotional state, and fear of humans in broiler chicken flocks. Poult Sci 92:2811-2826.

Bizeray, D., I. Estevez, C. Leterrier, and J. M. Faure. 2002a. Effects of increasing environmental complexity on the physical activity of broiler chickens. Appl Anim Behav Sci 79:27-41.

Bizeray, D., I. Estevez, C. Leterrier, and J. M. Faure. 2002b. Influence of increased environmental complexity on leg condition, performance, and level of fearfulness in broilers. Poult Sci 81:767-773.

Bokkers, E. A. M., Koene, P. 2002. Sex and type of feed effects on motivation and ability to walk for a food reward in fast growing broilers. Appl Anim BehavSci 79:247-261.

Bokkers, E. A. M., Koene, P. 2003. Behaviour of fast- and slow-growing broilers to 12 weeks of age and the physical consequences. Appl Anim Behav Sci 81:59-72.

Bokkers, E. A. M., Koene, P., Rodenburg, T. B., Zimmerman, P. H., Spruijt, B. M. 2004. Working for food under conditions of varying motivation in broilers. Animal Behaviour 68:105-113.

Campbell, D. L., M. M. Makagon, J. C. Swanson, and J. M. Siegford. 2016. Litter use by laying hens in a commercial aviary: dust bathing and piling. Poult Sci 95:164-175.

Danbury, T. C., C. A. Weeks, J. P. Chambers, A. E. Waterman-Pearson, and S. C. Kestin. 2000. Self-selection of the analgesic drug carprofen by lame broiler chickens. Vet Rec 146:307-311.

Dávila, S. G., J. L. Campo, M. G. Gil, M. T. Prieto, and O. Torres. 2011. Effects of auditory and physical enrichment on 3 measurements of fear and stress (tonic immobility duration, heterophil to lymphocyte ratio, and fluctuating asymmetry) in several breeds of layer chicks. Poult Sci 90:2459-2466.

Dawkins, M. S., H. Lee, C. D. Waitt, and S. J. Roberts. 2009. Optical flow patterns in broiler chicken flocks as automated measures of behaviour and gait. Appl Anim Behav Sci 119:203-209.

Dunkley, C. S. 2018. Leg Problems in Broilers.

Fernandez-Juricic, E., Erichsen, J. T., Kacelnik, A. 2004. Visual perception and social foraging in birds. Trends Ecol and Evol 19:25-31.

Graml, C., S. Waiblinger, and K. Niebuhr. 2008. Validation of tests for on-farm assessment of the hen-human relationship in non-cage systems. Appl Anim Behav Sci 111:301-310.

Ham, A. D. and D. Osorio. 2007. Colour preferences and colour vision in poultry chicks. Proc Biol Sci 274:1941-1948.

Haslam, S. M., S. N. Brown, L. J. Wilkins, S. C. Kestin, P. D. Warriss, and C. J. Nicol. 2007. Preliminary study to examine the utility of using foot burn or hock burn to assess aspects of housing conditions for broiler chicken. Br Poult Sci 47: 13-18.

Havenstein, G. B., P. R. Ferket, and M. A. Qureshi. 2003. Growth, livability, and feed conversion of 1957 versus 2001 broilers when fed representative 1957 and 2001 broiler diets. Poult Sci 82:1500-1508.

Hemsworth, P. H., Price, E. O., Borgwardt, R. 1996. Behavioural responses of domestic pigs and cattle to humans and novel stimuli. Appl Anim Behav Sci 50:43-56.

Hogan, J. A. 1973. Development of food recognition in young chicks: I. Maturation and nutrition. Journal of Comparative and Physiological Psychology 83:355-366.

Jones, R. B., and D. Waddington. 1992. Modification of fear in domestic chicks, *Gallus gallus domesticus*, via regular handling and early environmental enrichment. Anim Behav 43:1021-1033.

Jones, R. B., N. L. Carmichael, and E. Rayner. 2000. Pecking preferences and pre-dispositions in domestic chicks: implications for the development of environmental enrichment devices. Appl Anim Behav Sci 69:291-312.

Kells, A., M. S. Dawkins, and M. C. Borja. 2001. The Effect ofa 'Freedom Food' Enrichment on the Behaviour of Broilers on Commercial Farms. Animal Welfare 10:347-356.

Knowles, T. G., S. C. Kestin, S. M. Haslam, S. N. Brown, L. E. Green, A. Butterworth, S. J. Pope, D. Pfeiffer, and C. J. Nicole. 2008. Leg Disorders in Broiler Chickens: Prevalence, Risk Factors and Prevention. PLOS One. doi 10.1371/journal.pone.0001545.

Kristensen, H. H., N. B. Prescott, G. C. Perry, J. Ladewig, A. K. Ersbøll, K. C. Overvad, and C. M. Wathes. 2007. The behaviour of broiler chickens in different light sources and illuminances. Appl Anim Behav Sci 103:75-89

McGeown, D., T. C. Danbury, A. E. Waterman-Pearson, and S. C. Kestin. 1999. Effect of carprofen on lameness in broiler chickens. Vet Rec 144:668-671.

Meyer, M. M., Johnson, A. K., and E. A. Bobeck. 2019. A novel environmental enrichment device improved broiler performance without sacrificing bird physiological or environmental quality measures. Poult Sci doi: 10.3382/ps/pez417.

Nääs, I. A., I. C. L. A. Paz, M. S. Baracho, A. G. Menezes, L. G. F. Bueno, I. C. L. Almeida, and M. D. J. 2018. Impact of lameness on broiler well-being. J Appl Poult Res 18:432-439.

Newberry, R. C. 1999. Exploratory behaviour of young domestic fowl. Appl Anim Behav Sci 63:311-321.

Olsson, P., and A. Kelber. 2017. Relative colour cues improve colour constancy in birds. J Exp Biol 22: 1797-1801.

Prayitno, D. S., C. J. Phillips, and D. K. Stokes. 1997. The effects of color and intensity of light on behavior and leg disorders in broiler chickens. Poult Sci 76:1674-1681.

Reiter, K., and W. Bessei. 2009. Effect of locomotor activity on leg disorder in fattening chicken. Berl Munch Tierarztl Wochenschr 122:264-270.

Ruiz-Feria, C. A., J. J. Arroyo-Villegas, A. Pro-Martinez, J. Bautista-Ortega, A. Cortes-Cuevas, C. Narciso-Gaytan, A. Hernandez-Cazares, and J. Gallegos-Sanchez. 2014. Effects of distance and barriers between resources on bone and tendon strength and productive performance of broiler chickens. Poult Sci 93:1608-1617.

Shields, S. J., J. P. Garner, and J. A. Mench. 2005. Effect of sand and wood-shavings bedding on the behavior of broiler chickens. Poult Sci 84:1816-1824.

Toates, F. M. 1986. Motivational Systems. Cambridge University Press, Great Britain.

USDA. 2017. Broiler Production and Value-States and Unites States Total.

USDA. 2019. USDA National Retail Report-USDA Livestock, Poultry, & Grain Market News, http://www.ams.usda.gov/market-news/livestock-poultry-grain.

Ventura, B. A., F. Siewerdt, and I. Estevez. 2012. Access to Barrier Perches Improves Behavior Repertoire in Broilers. PLOS One.

Webster, A. B., B. D. Fairchild, T. S. Cummings, and P. A. Stayer. 2008. Validation of a three-point gait-scoring system for field assessment of walking ability in commercial broilers. J Appl Poult Res 17:529-539.

Weeks, C. A., T. D. Danbury, H. C. Davies, P. Hunt, and S. C. Kestin. 2000. The behaviour of broiler chickens and its modification by lameness. Appl Anim Behav Sci 67:111-125.

Weimer, S. L., A. K. Johnson, T. J. Fangman, L. A. Karriker, H. D. Tyler, and K. J. Stalder. 2014. Comparison of nursery pig behavior assessed using human observation and digital-image evaluation methodologies. Journal of Swine Health and Production 22:116-124.

Weimer, S. L., R. F. Wideman, C. G. Scanes, A. Mauromoustakos, K. D. Christensen, and Y. Vizzier-Thaxton. 2018. An evaluation of methods for measuring stress in broiler chickens. Poult Sci 97:3381-3389.

Zuidhof, M. J., B. L. Schneider, V. L. Carney, D. R. Korver, and F. E. Robinson. 2014. Growth, efficiency, and yield of commercial broilers from 1957, 1978, and 2005. Poult Sci 93:2970-2982.

F. Example 3—Data Regarding Use of Light Spots to Influence Conspecifics

Figure 11A:
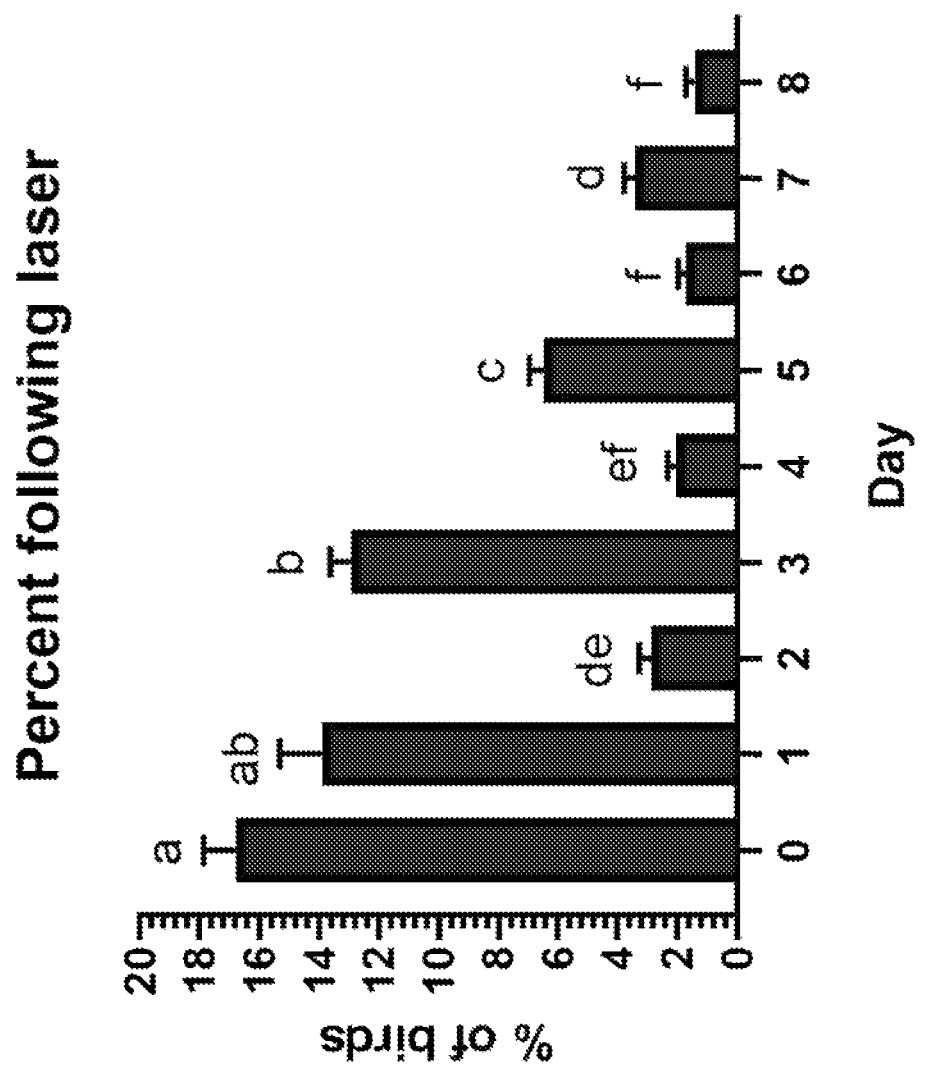

With reference to FIGS. 11A and B, 12A and B, 13A and B, and 14A and B, further aspects according to the present invention are demonstrated. Experimental data indicates that application of methods and systems according to earlier examples to a minority of poultry exposed to light spots in the manner discussed herein, can influence similar responses and/or benefits in conspecifics. As will be appreciated, the benefits to the conspecifics can be at least substantially similar as to the minority and this can greatly benefit the entire population involved even though conspecifics do not visually obtain the spots in the way the minority does, or at all.

Experimental data sets showing subsets (conspecifics) of the total population, by age, exposed to the moving light spot or spots following the minority percentage of the total population are at FIGS. 11A-B through 14A-B. A brief description of these Figures follows:

Laser Following Results

Figure 11B:
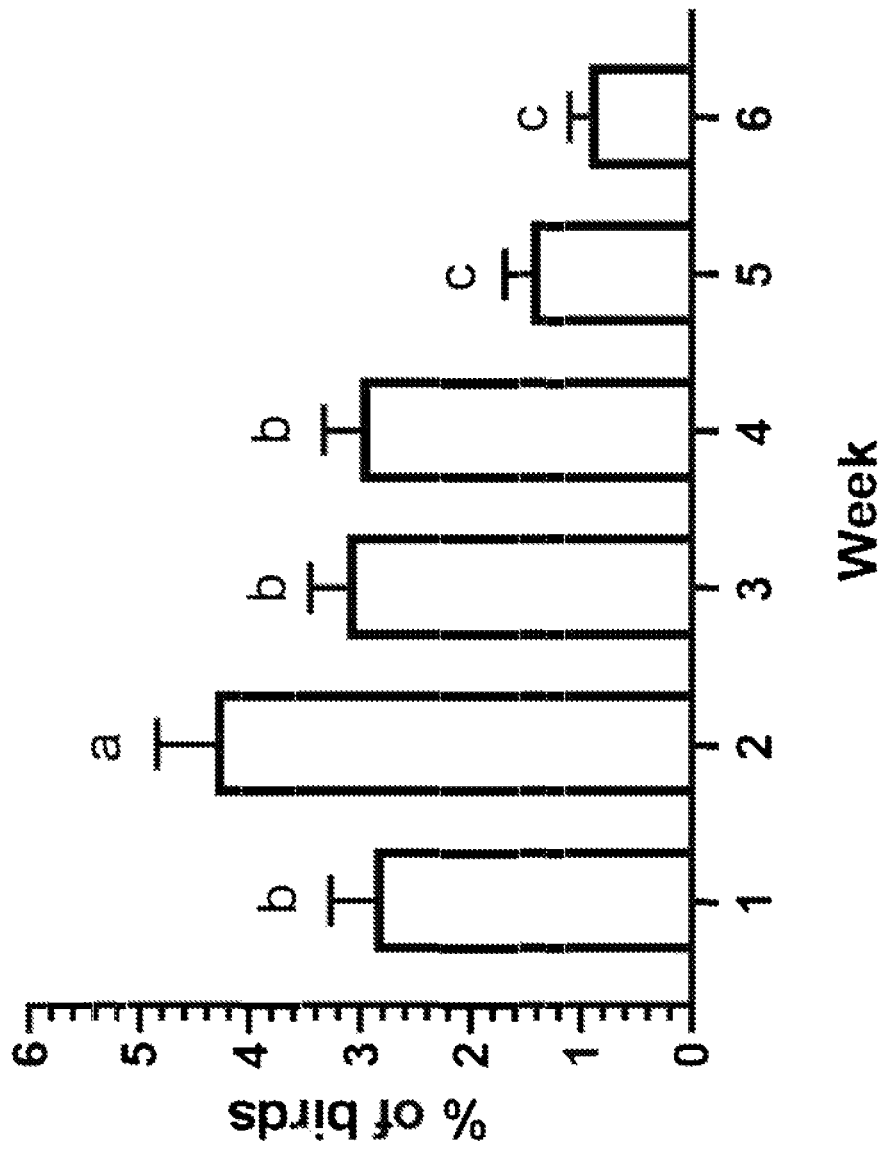

FIGS. 11A-B. Mean percent of birds in laser-enriched pens only actively following the laser[1] during 4-min laser-enrichment periods[2] over (A) d0-8 and (B) wk 1-6

[1]Laser following was defined as: A bird with head and body orientated towards laser dot(s) on the floor of pen with legs in forward motion at least one time during the minute being analyzed. Bird is moving in the direction of laser dot.

[2]LSMeans presented are averaged over min 1-4 of each laser-enrichment period.

Figure 12A:
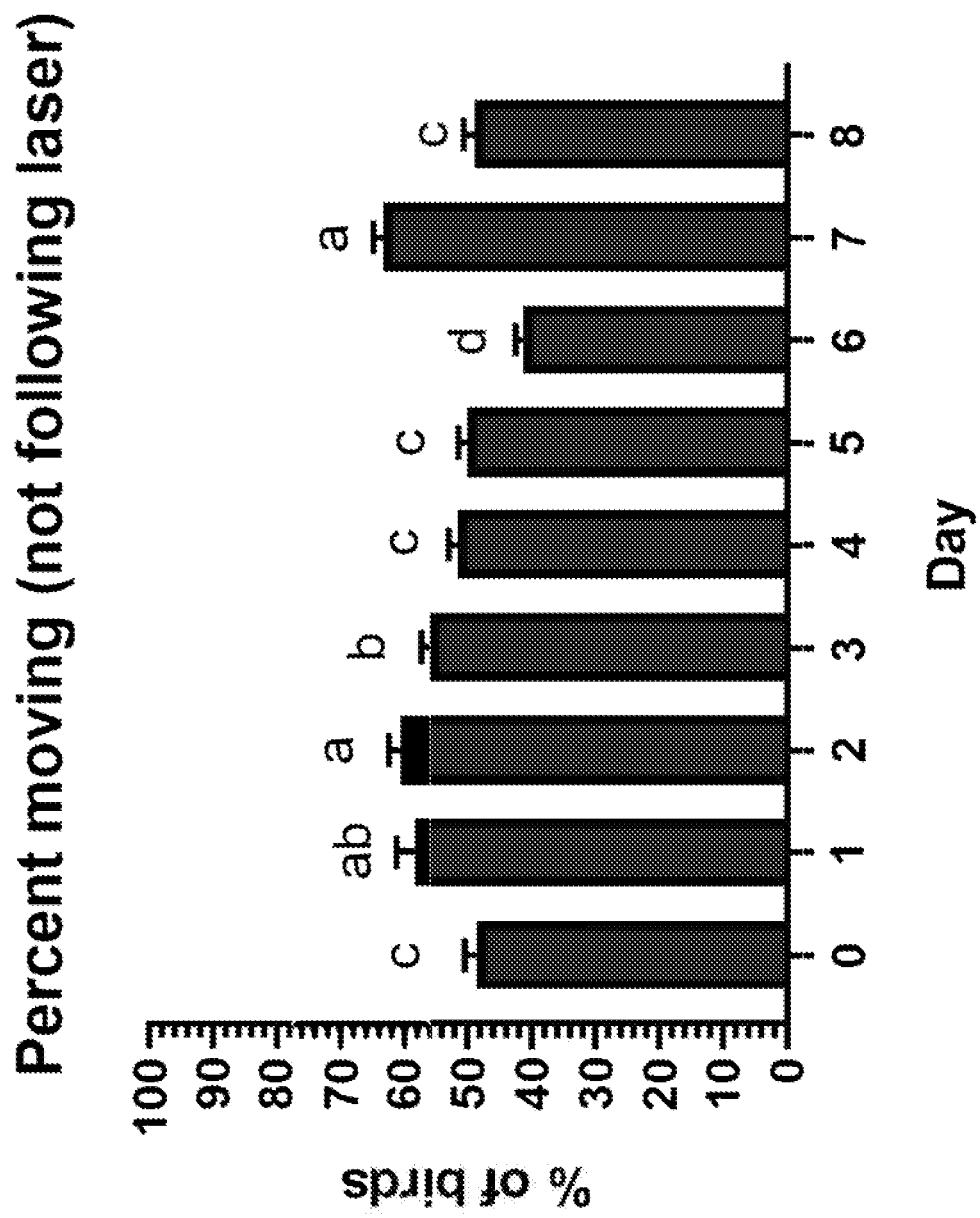
Figure 12B:
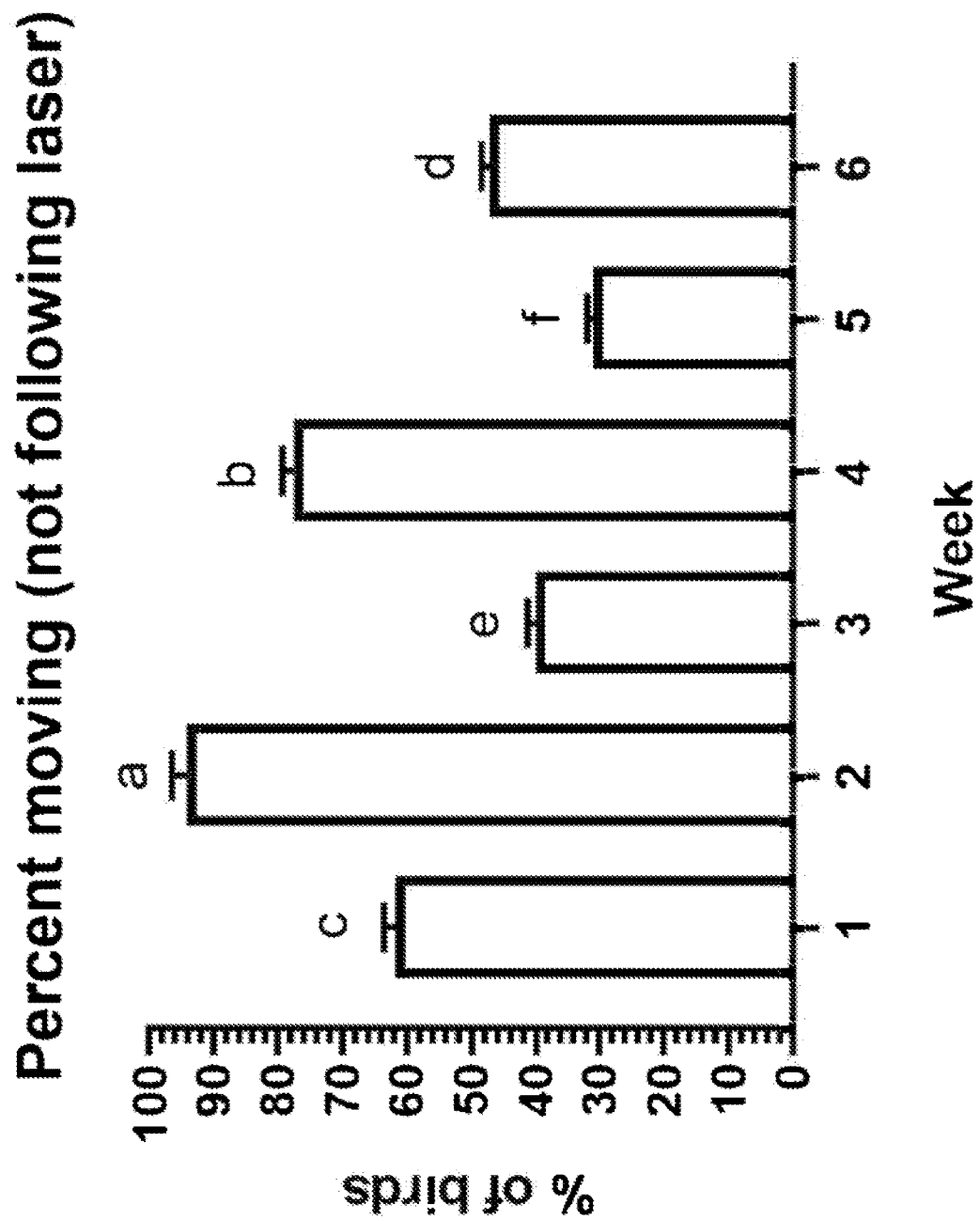

FIGS. 12A-B. Mean percent of birds in laser-enriched pens only moving[1] during 4-min laser-enrichment periods[2], excluding birds moving while actively following the laser, over (A) d0-8 and (B) wk 1-6

[1]Bird moving was defined as: Any bird with legs in forward motion; walking or running at least once during minute being analyzed who is not directly following or moving in the direction of the laser dots.

[2]LSMeans presented are averaged over min 1-4 of each laser-enrichment period.

Figure 13A:
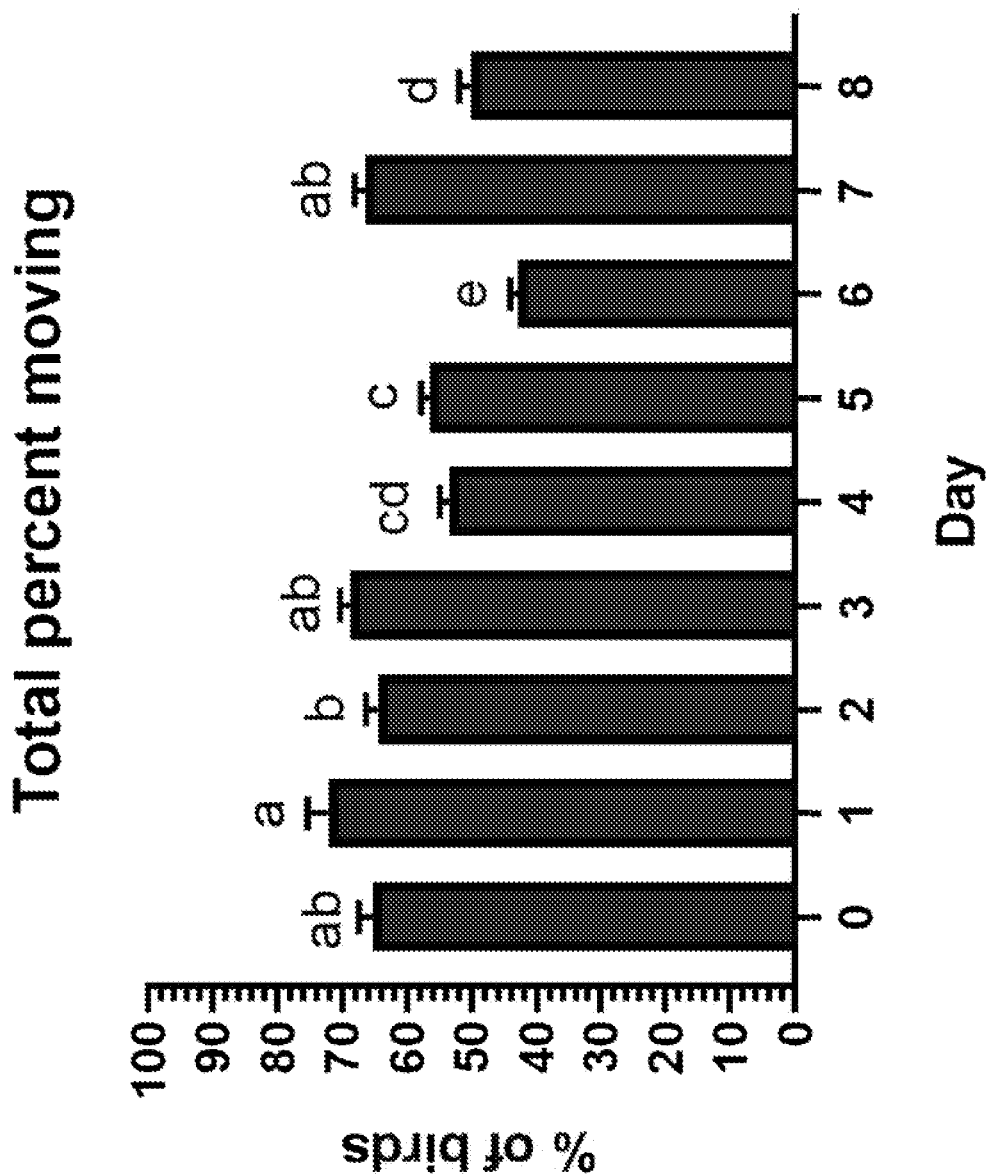
Figure 13B:
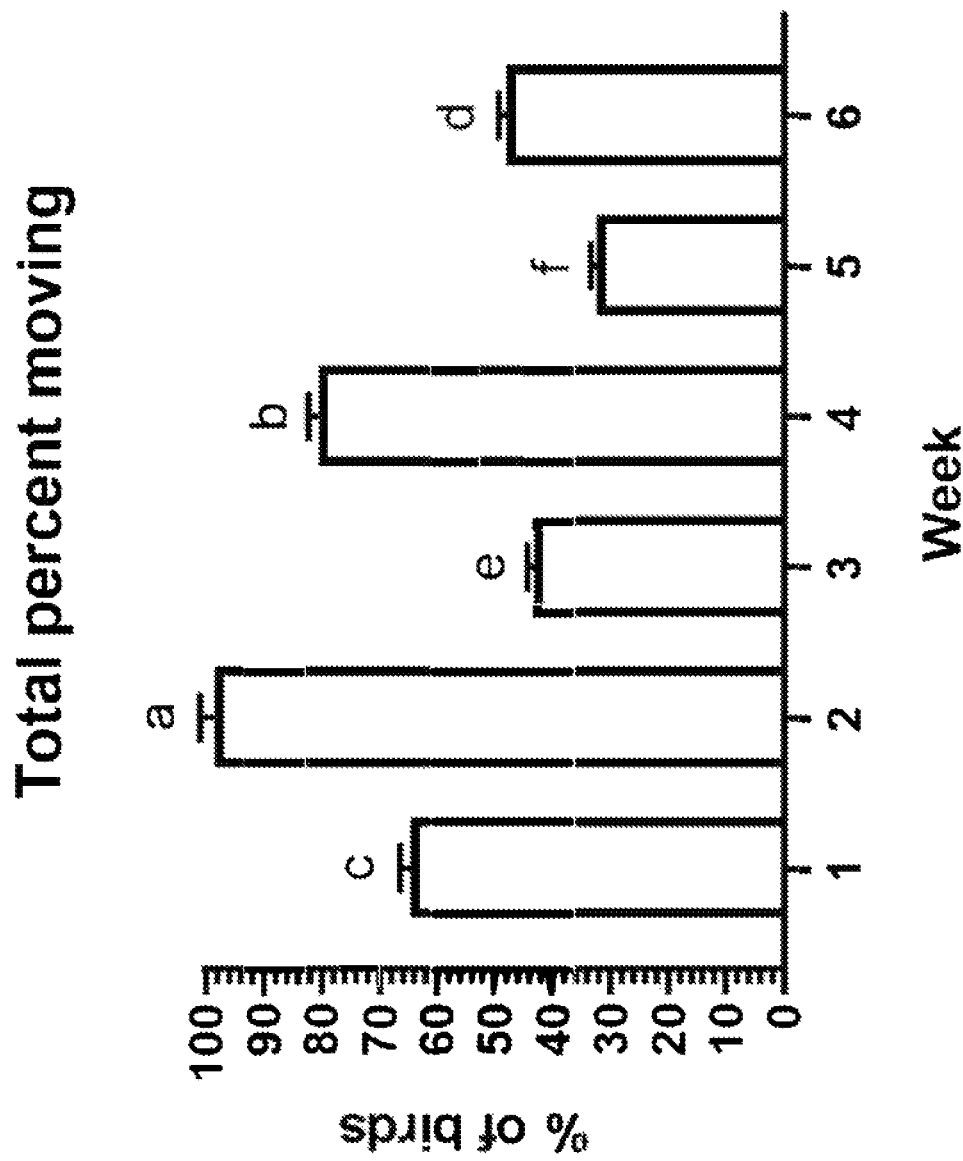

FIGS. 13A-B. Mean percent of birds in laser-enriched pens only moving and/or following the laser[1] during 4-min laser-enrichment periods[2] over (A) d0-8 and (B) wk 1-6

[1]Birds moving were defined as: Any bird with legs in forward motion; walking or running at least once during minute being analyzed, including birds directly following or moving in the direction of the laser dots.

[2]LSMeans presented are averaged over min 1-4 of each laser-enrichment period.

Figure 14A:
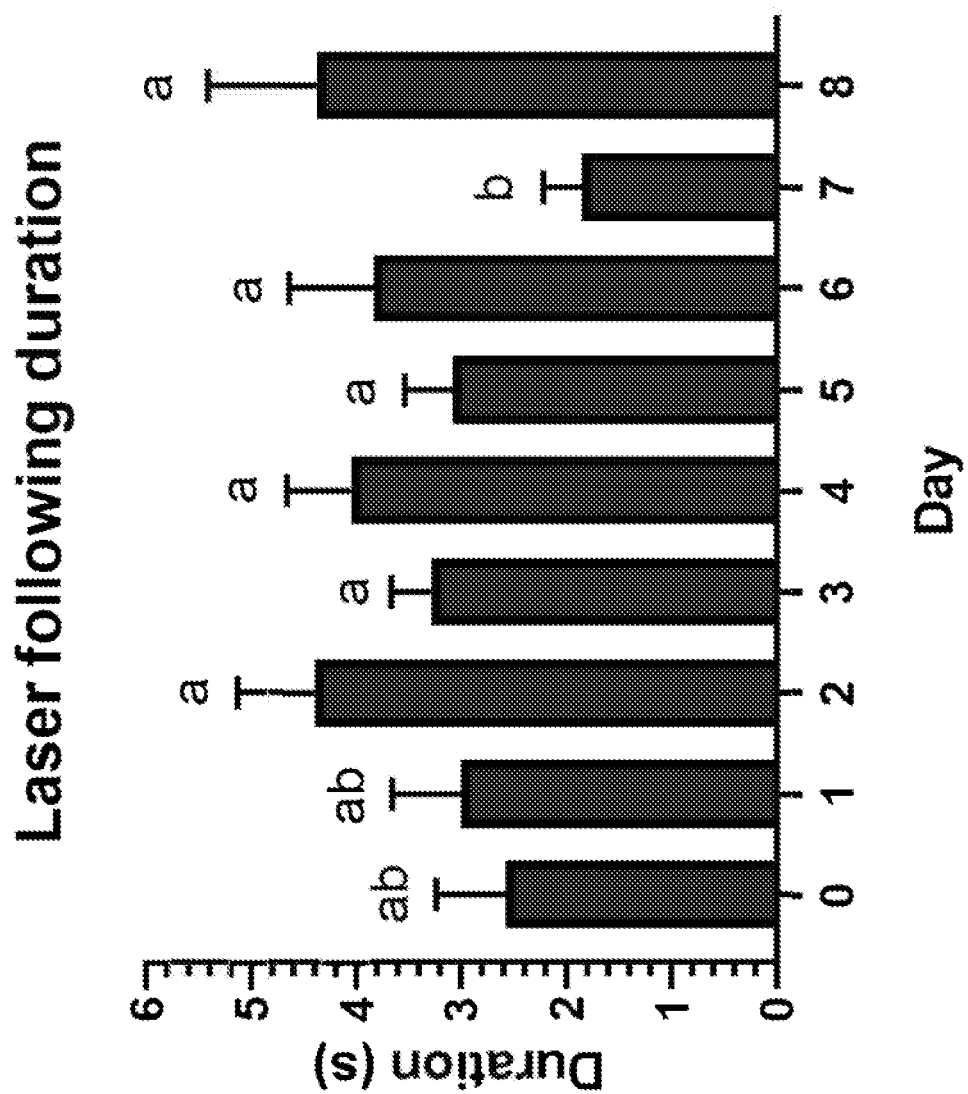
Figure 14B:
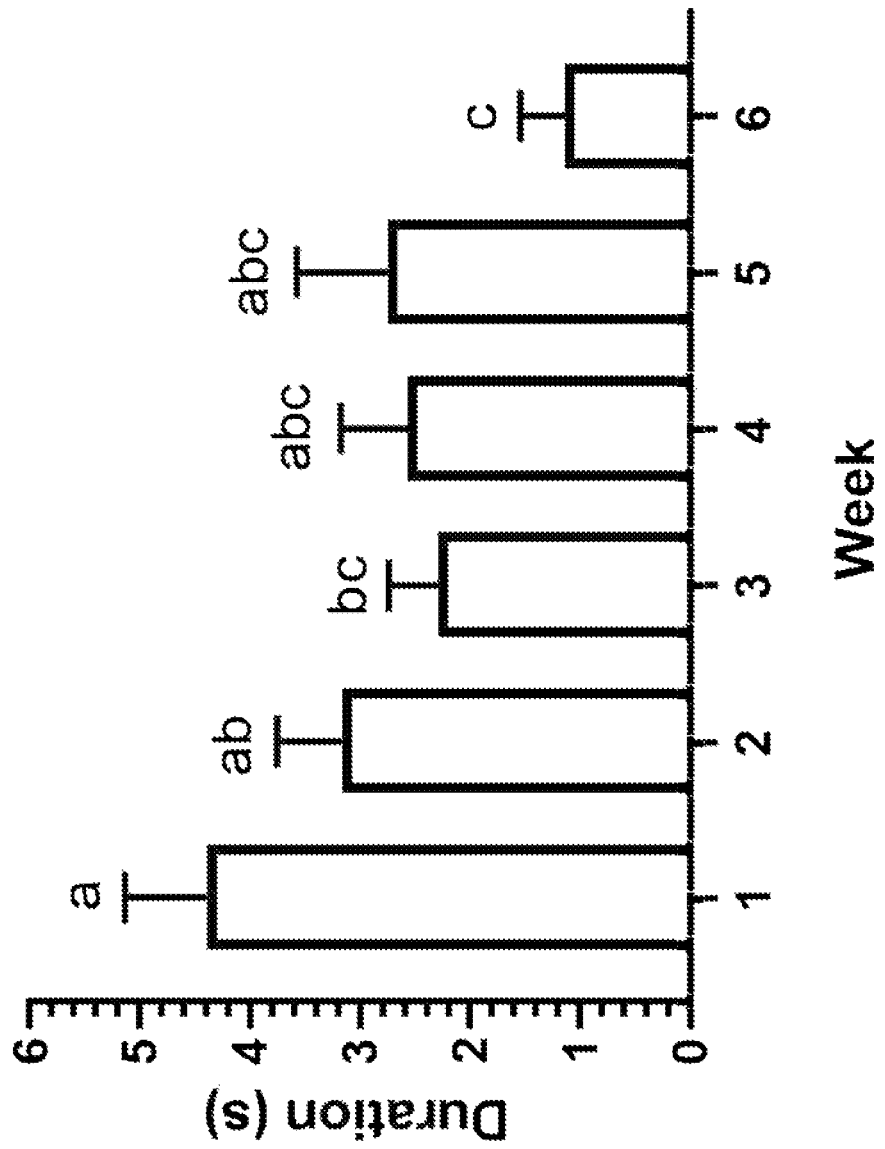
Figures 22, 23:
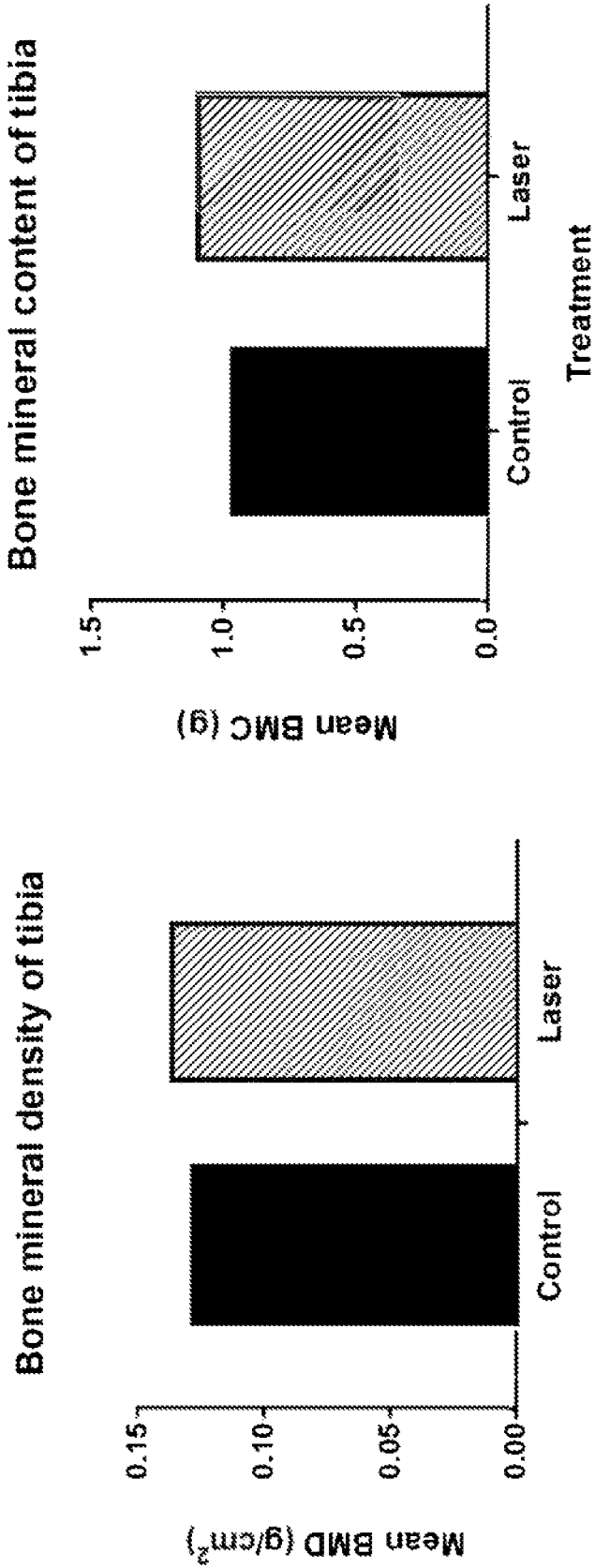

FIGS. 14A-B. Mean duration of laser-following behavior[1] by individual focal birds in laser-enriched pens only during 4-minute laser-enrichment periods[2] over (A) d0-8 and (b) wk 1-6

[1] Laser-following was defined as: A bird with head and body orientated towards laser dot(s) on the floor of pen with legs in forward motion at least one time during the minute being analyzed. Bird is moving in the direction of laser dot.

[2] LSMeans presented are averaged over min 1-4 of each laser-enrichment period.

As can be seen by the foregoing, participation of a minority of poultry in visually acquiring and responding to one or more light spots according to the present invention influences other poultry at or near that minority (conspecifics).

G. Additional Proof of Concept Data

The following is additional description regarding aspects of the invention and its proof of concept, including experimental data.

1. Brief Data Summary of Laser Trial for Patent Consideration a. Introduction: This study was designed to query a new enrichment device (laser) for meat type poultry. A total of 1,200 broiler chickens were raised through a traditional 6 week growth cycle, where half of the pens received the novel environmental enrichment (EE) device. The project was to determine if the EE device positively affected natural bird behavior, but also their leg health and growth rate. The EE device was placed near the ceiling and emitted a concentrated red dot in a slow-moving, random pattern, designed to emulate natural predatory behavior and stimulate active bird behavior. The laser itself is a non-dangerous, non-toxic method of stimulating movement and interest. Other current enrichment methods (straw bales, field tile, etc.) may promote growth of unwanted pathogens on their surfaces and must be moved, disinfected, or replaced with each flock. A subset of the birds were labeled with food grade dye and videos captured laser and non-laser periods to analyze movement and behavior. Throughout the 6-week trial, average performance (laser vs non-laser) was examined by calculating Feed Conversion Ratio (FCR) and Average Daily Gain (ADG) based on pen weights and measured feed intake. Behavior is being collected on focal birds in each pen. Video was recorded daily for week one and then one day a week for the following five weeks. Willingness to approach, foot pad dermatitis, breast blisters, walking distance, walking lameness, bone mineral density, bone mineral content, and air and litter quality were measured throughout and/or upon trial completion.

b. Laser Specs & Images: Each laser unit emitted two laser dots that randomly moved within two replicate 1.2×2.4 m pens. The laser consisted of two separate red, 650 nm lasers that moved independently in a random pattern across both pens (a 2.4×2.4 m radius total). See FIGS. 1A-B, 2 and 3. One side of the barn contained 20 laser pens, and the other side of the barn contained 20 control pens.

c. Laser Schedule: The lasers turned on 4 times per day, 6 hours apart, for 4 minutes per "session" (Table G1). This schedule began on d0 of the trial and remained constant for the entirety of the trial.

TABLE G1

Daily laser schedule

| Laser Session 1 | 5:30am-5:34am |
| Laser Session 2 | 11:30am-11:34am |
| Laser Session 3 | 5:30pm-5:34pm |
| Laser Session 4 | 11:30pm-11:34pm | d. Performance: Outcomes: Pen weights were recorded biweekly on days 0, 14, 28, and 42 of the trial, and feed disappearance was measured throughout the trial. Feed intake, weight gain, feed conversion ratio (FCR), and average daily gain (ADG) were calculated. 2-week performance periods were used; starter (d0-d14), grower (d14-d28), & finisher (d28-d42). On day 0, 30 chicks were placed in each pen and mortality was recorded throughout the trial.

e. Statistics: Data were analyzed using the Mixed procedure on SAS due to normal distribution and are presented on a pen and averaged by bird basis.

f. Results:

(1) Feed Intake: The effect of laser treatment was used to compare feed intake for each performance period of the trial (starter, grower, finisher) and overall feed intake for 42 21 days. Laser enrichment has a significant effect on feed intake by pen during the starter period (d0-d14, P=0.0012) and pen intake during the finisher period (d28-42, P=0.0084), resulting in laser-treatment birds consuming more feed in both cases, likely due to increased movement with laser enrichment in starter phase, and larger body size in the finisher phase (Table 2). Intake was averaged by bird number in the pen to provide an average intake per bird. On a per bird basis, the laser treatment had a significant effect on intake in every performance period and overall, with laser birds consuming more feed in all cases (4% more in starter; P<0.0001, 3.45% more in grower; P=0.0035, 3.66% more in finisher; P=0.0043, 3.82% more overall; P=0.0028). This increased intake translated to improved performance, with an 8.01% increase in ADG on a per bird basis (Table G3).

(2) Weight gain: Weight gain was compared between treatments on a per-pen basis, and laser-treated birds gained significantly more weight in the Grower period (P=0.0155), Finisher period (P<0.0001), and overall (P<0.0001). (Table G2). Weight gain was also averaged on a per bird basis, in which the laser treatment had a significant effect on gain in every period and overall, where each pen gained on average 8 kg more due to laser enrichment (Starter; P=0.0427, Grower; P=0.0011, Finisher; P<0.0001, Overall; P<0.0001; Table 3). Improved feed intake and weight gain translates to increased flock productivity and significant income for a producer.

(3) FCR: FCR was calculated for each performance period and overall by pen, the laser-treatment pens had significantly better FCRs in the grower period (P=0.0313), finisher period (P<0.0001), and overall (P<0.0001). (Table 2). This translates to increased profits for the producer and contracted company. An improvement of 7 points of FCR due to the laser enrichment treatment is hugely significant in the poultry industry because of the multiplier effect of billions of birds produced each year. Feed represents 80% of the cost of production to the company; hence, even 1 point of improvement in FCR is significant. On a pen basis, overall production cycle FCR was improved by 4.59% (7 FCR points) in birds enriched with laser enrichment. In the grower and finisher periods, respectively, FCR was significantly improved by 2% (3 FCR points) and 10% (19 FCR points) due to laser enrichment (P<0.0001).

(4) ADG: Average daily gain (ADG) was calculated on a per pen and averaged per bird basis; pens in the control category had significantly lower ADGs in the finisher period (P<0.0001) and overall (P<0.0001). (Tables G2 and G3). Laser enrichment lead to an 8.02% improvement in ADG for the overall period, with a significant 14% improvement in AGD in the finisher period due to enrichment. Birds in the control (non-laser) category had lower daily gains in the starter period (P=0.0475), finisher period (P<0.0001), and overall throughout the trial (P<0.0001). Average daily gain (kg/pen) was 2.8848 (control) vs 3.3545 (enrichment), with an overall ADG of 1.9634 vs. 2.1345 in enriched birds (P<0.0001).

Performance: Table G2. Average intake, gains, FCR, & ADG by pen (kg)

| Performance measure | Control | SEM | Laser | SEM | P-value |
|---|---|---|---|---|---|
| Starter Intake | 14.3413 | 0.1134 | 14.8305 | 0.0817 | 0.0012* |
| Grower Intake | 46.5895 | 0.3793 | 47.7956 | 0.5599 | 0.0762 |
| Finisher Intake | 77.4193 | 1.0104 | 81.2898 | 0.9574 | 0.0084* |
| Overall Intake | 138.32 | 1.3363 | 143.84 | 1.3340 | 0.0058 |
| Starter Gain | 11.1000 | 0.1307 | 11.3033 | 0.1142 | 0.2489 |
| Grower Gain | 31.3200 | 0.3029 | 32.6472 | 0.4384 | 0.0155* |
| Finisher Gain | 40.3872 | 0.6317 | 46.9635 | 0.6265 | <.0001* |
| Overall Gain | 82.4635 | 0.9564 | 89.6492 | 0.8291 | <.0001* |
| Starter FCR | 1.2936 | 0.0088 | 1.3135 | 0.0087 | 0.1187 |
| Grower FCR | 1.4882 | 0.0069 | 1.4648 | 0.0078 | 0.0313* |
| Finisher FCR | 1.9209 | 0.0227 | 1.7351 | 0.0255 | <.0001* |
| Overall FCR | 1.6787 | 0.0111 | 1.6050 | 0.0098 | <.0001* |
| Starter ADG | 0.7929 | 0.0093 | 0.8074 | 0.00816 | 0.2489 |
| Grower ADG | 2.2126 | 0.0320 | 2.2416 | 0.04861 | 0.6209 |

-continued

Performance: Table G2. Average intake, gains, FCR, & ADG by pen (kg)

| Performance measure | Control | SEM | Laser | SEM | P-value |
|---|---|---|---|---|---|
| Finisher ADG | 2.8848 | 0.0451 | 3.3545 | 0.04475 | <.0001* |
| Overall ADG | 1.9634 | 0.0228 | 2.1345 | 0.0197 | <.0001* |

*P < 0.05 denotes significance

TABLE G3

Average intake, gains, & ADG per bird (kg)

| Performance measure | Control | SEM | Laser | SEM | P-value |
|---|---|---|---|---|---|
| Starter Intake | 0.4797 | 0.0037 | 0.5010 | 0.0018 | <.0001* |
| Grower Intake | 1.5572 | 0.0117 | 1.6128 | 0.0133 | 0.0035* |
| Finisher Intake | 2.6245 | 0.0317 | 2.7554 | 0.0291 | 0.0043* |
| Overall Intake | 4.6897 | 0.0428 | 4.8760 | 0.0394 | 0.0028* |
| Starter Gain | 0.3712 | 0.0042 | 0.3818 | 0.0027 | 0.0427* |
| Grower Gain | 1.0357 | 0.0140 | 1.1015 | 0.0108 | 0.0011* |
| Finisher Gain | 1.3688 | 0.0194 | 1.5915 | 0.0175 | <.0001* |
| Overall Gain | 2.7951 | 0.0275 | 3.0388 | 0.0235 | <.0001* |
| Starter ADG | 0.02653 | 0.0003 | 0.02726 | 0.0002 | 0.0475* |
| Grower ADG | 0.07398 | 0.0010 | 0.07559 | 0.0016 | 0.3899 |
| Finisher ADG | 0.09920 | 0.0014 | 0.1143 | 0.0012 | <.0001* |
| Overall ADG | 0.06657 | 0.0007 | 0.07237 | 0.0006 | <.0001* |

*P < 0.05 denotes significance (5) Summary: The presence of laser activity environmental enrichment in the broiler pens 4 times a day led to significantly higher feed intake in the starter and finisher period (by pen), but significantly greater gains in the grower and finisher period that made laser-treated birds heavier overall with improved FCR and improved ADG. The feed conversion was more efficient in the grower and finisher periods and overall for the birds exposed to laser enrichment, and average daily gain was increased in the finisher period (and overall). See also FIGS. 15-17.

3. Behavior Outcomes:

a. Willingness to approach (WTA): Outcomes: On Weeks 1 and 6 of the trial, a Willingness to Approach test was conducted in all 40 pens (20 laser pens, 20 control pens, n=80 total observations). In this test, the same researcher entered each pen quietly and crouched facing the birds for 15 seconds. At the end of 15 seconds, the researcher looked up towards the birds, and a separate individual (outside of the pen) took a photographic image at the exact moment the researcher looked up. These images were later analyzed based on the birds' behaviors and whether or not they were interacting with the researcher (facing towards or physically touching), or not interacting (facing away). Birds not interacting were further classified into at the feeder, at the drinker, or "other" behaviors. Finally, then pen was broken down into four 0.6×1.2 m quadrants and the number (%) of birds was calculated. The quadrant nearest to the researcher was the first quadrant and the quadrant furthest from the researcher was the fourth quadrant.

b. Statistics: WTA data were analyzed by week, treatment, and interaction of week by treatment using the Glimmix Procedure on SAS because the data were not normally distributed (Poisson's distribution).

c. Results: Interacting versus not interacting: Birds interacting with the human was significantly affected by the interaction of week by treatment (P<0.0214). Interacting birds decreased from weeks 1 to 6 in the control group but increased between weeks 1 to 6 in the laser group (Table G4, FIGS. 18A and 18B, 19A and 19B, and 20). Data were also analyzed as percentages of birds interacting vs. not interacting, and a significant effect of week by treatment was seen again in the interacting category (P<0.0001). See Table G7.

d. Not interacting bird activity: The number of birds at the feeder was not affected by week, treatment, or week by treatment, but birds at the drinkers was significantly affected by week (p=0.0002) and week by treatment (0.0284). Birds at the drinker decreased in both laser and control pens from weeks 1 to 6 but decreased more drastically in the control group. (Table G5).

The percentage of birds at the feeder, was affected by week (P=0.0301). The percentage of birds at the drinker was affected by week (P<0.0001) and week by treatment (P<0.0001), with birds at the drinker decreasing more drastically in the control-than in the laser group. Birds in the other category was significantly affected by week (P=0.0077), with a greater percentage present in this category for both treatment groups. (Table E6).

e. Quadrants of the pen: Bird count in the first quarter was affected by the week by treatment interaction (P=0.0092), with the number of birds in first quadrant decreasing between weeks 1 & 6 in the control group and increasing in the laser group. However, only week had an effect on bird number in the second (P<0.0001), third (P<0.0001), and fourth (P<0.0001) quadrants (Table G6). On a percentage basis, week had a significant effect on all quadrants (first; P=0.0002, second; P=<0.0001, third; P<0.0001, fourth; P<0.0001), and the effect of week by treatment was also significant on the percent of birds present in the first (P=<0.0001) and second (P=0.0015) quadrants (Table G6). Some of the effect due to week can be attributed to increased body size in the broilers and less space for them to move in the pen.

TABLE G4

Willingness to approach; number of birds interacting vs not interacting means and percentages, n = 80 observations

| | Control | | Laser | | P value | | |
|---|---|---|---|---|---|---|---|
| Behavior | Week 1 | Week 6 | Week 1 | Week 6 | Week | Treatment | Week*Treatment |
| Interacting, number | 1.80 | 0.90 | 1.10 | 1.45 | 0.31 | 0.97 | 0.0214* |
| Not interacting, number | 28.20 | 28.65 | 28.90 | 28.15 | 0.90 | 0.93 | 0.6181 |
| Interacting % | 5.46% | 2.80 | 3.22 | 4.31 | 0.09 | 0.83 | <0.0001* |
| Not interacting % | 94.00% | 96.93 | 96.333 | 95.10 | 0.71 | 0.91 | 0.3453 |

*P < 0.05

Behavior data are presented as means (average number of birds) and as percentage of birds in the pen.

Note:

Birds not visible were combined into not interacting category (Means of "not visible" birds by treatment and week: Control Week 1; 0.55, Control Week 6; 0.15, Laser Week 1; 0.9, Laser Week 6; 0.05).

TABLE G5

Willingness to approach; not interacting behavior in bird counts (#) & percentages

| Behavior | Control | | Laser | | P value | | |
|---|---|---|---|---|---|---|---|
| | Week 1 | Week 6 | Week 1 | Week 6 | Week | Tx | Week*Tx |
| Feeder # | 1.43 | 1.23 | 1.57 | 1.18 | 0.2631 | 0.9152 | 0.7188 |
| Drinker # | 3.05 | 1.00 | 2.05 | 1.50 | 0.0002* | 0.9816 | 0.0284* |
| Other # | 23.15 | 26.25 | 24.35 | 25.40 | 0.0696 | 0.8457 | 0.3592 |
| Feeder % | 4.55 | 3.81 | 4.6702% | 3.53 | 0.0301* | 0.9205 | 0.6242 |
| Drinker % | 10.62 | 3.35 | 6.94 | 5.13 | <0.0001* | 0.9992 | <0.0001* |
| Other % | 83.62 | 92.11 | 86.93 | 90.24 | 0.0077* | 0.702 | 0.2207 |

*P < 0.05
Abbreviations: Tx = treatment. Behavior data are presented as means (average number of birds) and as percentage of birds in the pen. The number of birds categorized as "piling" was combined into "Other" behavior (Means of birds "piling" by treatment and week: Control Week 1; 4, Control Week 6; 0, Laser Week 1; 4, Laser Week 6; 4). Note that these each occurred in one pen, and no more than 4 birds were ever observed piling.

TABLE G6

Willingness to approach; number and percentage of birds present in each quadrant of the pen

| Behavior | Control | | Laser | | P value | | |
|---|---|---|---|---|---|---|---|
| | Week 1 | Week 6 | Week 1 | Week 6 | Week | Tx | Week*Tx |
| First, number | 2.23 | 1.0524 | 1.78 | 2.04 | 0.0648 | 0.4408 | 0.0092* |
| First % | 6.86 | 2.99 | 5.57 | 6.34 | 0.0002* | 0.3944 | <0.0001* |
| Second, number | 2.52 | 6.1883 | 1.79 | 6.42 | <0.0001* | 0.2951 | 0.1389 |
| Second % | 8.95 | 20.44 | 6.18 | 22.18 | <0.0001* | 0.3066 | 0.0015* |
| Third, number | 7.20 | 11.00 | 7.55 | 10.20 | <0.0001* | 0.8543 | 0.4226 |
| Third % | 25.99 | 38.38 | 26.621% | 36.07 | <0.0001* | 0.7646 | 0.2918 |
| Fourth, number | 16.84 | 10.76 | 17.56 | 10.47 | <0.0001* | 0.9376 | 0.5718 |
| Fourth % | 58.68 | 36.98 | 62.08 | 36.83 | <0.0001* | 0.7765 | 0.361 |

*P < 0.05
Abbreviations: Tx = treatment. Behavior data are presented as means (average number of birds) and as percentage of birds in the pen.
Note:
The pen was broken down into 0.6 by 1.2 m quarters with the first quarter being the section of the pen the human was in and the fourth being the opposite end (most distant from the human).

Further data is shown in Table G7 below:

TABLE G7

Human approach paradigm: LSMeans (SEM) and percentage of broilers interacting vs. not interacting and not interacting further classification.

| Behavior[1] | Control | | | | Laser | | | | P values | | |
|---|---|---|---|---|---|---|---|---|---|---|---|
| | Week 1 | SEM | Week 6 | SEM | Week 1 | SEM | Week 6 | SEM | Week | Treatment | Week*Treatment |
| Interacting | | | | | | | | | | | |
| Number | 1.80 | 0.30 | 0.90 | 0.21 | 1.10 | 0.24 | 1.45 | 0.27 | 0.31 | 0.97 | 0.02* |
| Percent | 5.46 | 0.89 | 2.80 | 0.52 | 3.22 | 0.58 | 4.31 | 0.73 | 0.09 | 0.83 | <0.01* |
| Not interacting[2] | | | | | | | | | | | |
| Number | 28.20 | 1.19 | 28.65 | 1.20 | 28.9 | 1.20 | 28.15 | 1.19 | 0.90 | 0.93 | 0.62 |
| Percent | 94.00 | 2.17 | 96.93 | 2.20 | 96.33 | 2.19 | 95.09 | 2.18 | 0.70 | 0.91 | 0.35 |
| Not-interacting further classification | | | | | | | | | | | |
| Feeder | | | | | | | | | | | |
| Number | 1.43 | 0.29 | 1.23 | 0.27 | 1.57 | 0.31 | 1.18 | 0.26 | 0.26 | 0.92 | 0.72 |
| Percent | 4.55 | 0.86 | 3.81 | 0.73 | 4.67 | 0.87 | 3.53 | 0.69 | 0.03* | 0.92 | 0.62 |
| Drinker | | | | | | | | | | | |
| Number | 3.05 | 0.39 | 1.00 | 0.22 | 2.05 | 0.32 | 1.50 | 0.27 | 0.01* | 0.98 | 0.03* |
| Percent | 10.62 | 1.20 | 3.35 | 0.50 | 6.94 | 0.86 | 5.13 | 0.68 | <0.01* | 0.10 | <0.01* |

TABLE G7-continued

Human approach paradigm: LSMeans (SEM) and percentage of broilers interacting vs. not interacting and not interacting further classification.

| | Control | | | | Laser | | | | P values | | |
|---|---|---|---|---|---|---|---|---|---|---|---|
| Behavior[1] | Week 1 | SEM | Week 6 | SEM | Week 1 | SEM | Week 6 | SEM | Week | Treatment | Week*Treatment |
| Other[3] | | | | | | | | | | | |
| Number | 23.15 | 1.08 | 26.25 | 1.15 | 24.35 | 1.10 | 25.40 | 1.13 | 0.07 | 0.85 | 0.36 |
| Percent | 83.62 | 2.04 | 92.11 | 2.15 | 86.93 | 2.08 | 90.24 | 2.12 | 0.01* | 0.70 | 0.22 |

*$P < 0.05$
[1]Behavior data are presented as means (average number of birds) and as percentage of birds in the pen.
[2]Birds not visible were combined into not interacting category (Means of "not visible" birds by treatment and week: Control Week 1; 0.55, Control Week 6; 0.15, Laser Week 1; 0.9, Laser Week 6; 0.05).
[3]The number of birds categorized as "piling" was combined into "Other" behavior (Means of birds "piling" by treatment and week: Control Week 1; 4, Control Week 6; 0, Laser Week 1; 4, Laser Week 6; 4). Note that these each occurred in one pen, and no more than 4 birds were ever observed piling.

f. Summary: Our willingness to approach data imply that the laser treatment may have made birds become more willing to "interact" with the human in their pen from the first week to the last week of the trial, whereas the non-laser (control) birds became less inclined to interact. The interaction of week and laser treatment also affected the number of birds present at the waterer, with more control birds at the drinker in week 1 and more laser birds at the drinker in week 6. The data regarding birds present in each quadrant of the pen likely represent a drastic increase in bird size from the start to the end of the trial, meaning that the larger the birds grew, the more space in the pen they filled whether they were truly more inclined to be closer to the researcher or not.

4. Breast Blister & Footpad Dermatitis:

a. Outcomes: Five focal birds per pen (randomly assigned at the start of the trial) were examined weekly, and all birds at the conclusion of the trial, for the presence of breast blisters and the occurrence of footpad dermatitis. Both examinations took place on the same focal birds at the same time each week. Footpad dermatitis was scored using the American Association of Avian Pathologists Paw Scoring described in Table D8, and breast blisters were scored according to guidelines listed below.

TABLE G8

Footpad dermatitis scoring system

| Pass | Fail |
|---|---|
| Normal color | Erosions, ulcerations, scabs |
| Slight discoloration | Hemorrhages |
| Thickening/hyperkeratosis | Swelling of footpad |
| Area < ½ footpad | Area > ½ footpad |

Breast blisters were considered present when:
  Equal to or larger than 0.5 cm$^2$
  One or more breast burns
  Scabs on breast skin
    Mild: brownish-colored scab
    Severe: ulcer with black exudates b. Results: Neither footpad dermatitis nor breast blisters were observed for either treatment group in weeks 1 through 6. Randomly selected focal birds as their breast and feet conditions were examined (Note: breast and feet image for each week do not always display the same bird and represent both treatment groups, birds were chosen for images randomly).

c. Summary: The laser treatment had no effects (positive or negative) on breast and foot condition in our study, as no birds for the entirety of the trial were observed to have blisters or dermatitis. While our research facility used clean litter for this study, and this can contribute to the lack of blisters and dermatitis, a positive outcome of this work is that increased movement in laser enrichment did not negatively affect breast blisters or foot condition. Chicken feet (paws) comprise a significant portion of the exports to overseas markets.

It is to be understood that the experimental data here was obtained using relatively clean litter in the pens. It is more typical industry practice to have used litter. These results may not have seen significant breast blister/footpad issues due to this relatively clean litter and very clean research settings.

5. Walking Lameness:

a. Outcomes: The 5 focal birds per pen were examined for lameness weekly using the National Chicken Council Audit Guidelines adapted to Table G9. Birds were removed from their home pens and placed into a unique, custom-built walkway designed for minimal distractions and ease of assessment. This structure was 1.8 m long with 0.46 m walls that allowed for 15.24 cm each of "start" and "finish" space for broilers, and ~1.524 m measurements drawn on the floor to measure exactly where lame birds stopped walking.

On Week 1, all 5 birds were put on the walkway and examined for lameness at the same time, but for weeks 2-6 birds were assessed in groups of 2 or 3 for increased efficiency as the birds grew and became more reluctant to walk.

TABLE G9

Walking Lameness Scoring System

| Score | Defined |
|---|---|
| 0 | Bird walks 1.524 meters with no visible signs of lameness |
| 1 | Bird walks 1.524 meters, but appears uneven in steps or sits down to rest |
| 2 | Bird will not or cannot walk 1.524 meters, obvious lameness. Distance recorded. | b. Statistics: Data were compiled and analyzed using the frequency and chi square procedures of SAS because the data were so abnormally distributed, they could not be analyzed otherwise (so few birds with a score or 1 or 2).

c. Results: The majority of birds were scored a 0 regardless of treatment, although there were a slightly higher number of birds in the control category given this rating overall. Birds in the laser treatment had a greater occurrence of a score of 1 but had no occurrence of birds scored 2. Two control birds received a score of 2 (Table G10).

TABLE G10

Number of birds in each lameness category over 6 weeks

| Score | Control | Laser | Total |
|---|---|---|---|
| 0 | 202 | 198 | 400 |
| 1 | 6 | 12 | 18 |
| 2 | 2 | 0 | 2 | d. Chi square test of independence: There was no effect of treatment on walking lameness score (P=0.1372).

e. Summary: Our data indicate that the laser treatment did not have a measurable lameness effect in our flock. In this study there are so few lameness cases that these results may not be representative of a larger commercial flock with a greater lameness prevalence. We did see a higher number of score 1 birds in the laser group (2 in total), but no laser enriched birds scored a 2. See FIG. 21.

7. Bone Density and Bone Mineral Content of Tibia:

a. Outcomes: Upon conclusion of the trial (d 42) the right tibia was collected from all focal birds (70) and underwent a DXA scan to determine bone mineral density and bone mineral content. Bone mineral density is a measure of quality of the bone present, and bone mineral content is reflective of size of the bone and thus related to size/weight of the bird. Ideally, birds in the laser treatment group would see increased bone mineral density due to increased activity.

b. Statistics: Bone mineral density and bone mineral content values were analyzed using the Mixed procedure of SAS due to normal distribution.

c. Results: There were no observed differences in the average bone mineral density or bone mineral content values based on control or laser treatment. Numerically, the laser group had a higher density and content on average (Table G11).

TABLE G11

Bone mineral density (BMD) and bone mineral content (BMC) of tibia means analyzed by treatment

| Performance measure | Control | Laser | P-value |
|---|---|---|---|
| BMD (g/cm$^2$) | 0.1291 | 0.1376 | 0.2034 |
| BMC (g) | 0.9746 | 1.1070 | 0.2365 | d. Summary: In our study, enclosure arrangement, and stocking density, the laser enrichment device did not significantly increase the bone density of the tibia nor the bone mineral content. See FIGS. 22 and 23.

8. Air & Litter Quality Measurements:

a. Outcomes: The amount of ammonia in the air on each side of the barn was measured weekly in the front, middle, and back of each side with a hand-held ammonia reader and additionally, ammonia test strips. Litter quality was analyzed weekly (different pens than those used for ammonia tests) according to the National Chicken Council Audit Guidelines:

Litter moisture evaluated in different pens on each side of the barn, not around or directly under the water line.

Litter was gathered from several different sections of the pens analyzed.

Litter should be "loosely compacted when squeezed in the hand. If the litter remains in a clump when it is squeezed in the hand, it is too wet" (NCC).

b. Statistics: Data was compiled using the frequency and chi square procedures of SAS because of the small number of data points and nature of the comparison.

c. Results: Ammonia reader: There were no significant differences (chi square) in the ammonia readings from the laser and control sides of the barn (Table G12). Ammonia levels in commercial barns are typically higher than seen here due to reused litter and changes in ventilation during the grow-out cycle. They also depend on seasonal changes in required ventilation based on the geographic location of the barn (changes in ability to ventilate during the winter in the Midwest, for example). The maximum allowed in barns is set at 25 ppm, while chickens can be negatively influenced at long-term exposure of 20 ppm.

d. Ammonia test strips: There were no significant differences (chi square) in the test strip readings from the laser and control sides of the barn. Descriptive data in Table G12.

e. Litter moisture: There were no differences in the litter evaluations from the laser and control sides of the barn; both sides passed the litter quality guidelines every week and conditions were no different.

TABLE G12

Average air ammonia results measured at bird height using two methods: a handheld ammonia reader and ammonia test strips listed by week (ppm)

| Week | Control Reader | Test Strips | Laser Reader | Test Strips |
|---|---|---|---|---|
| Week 2 | 0 | 5 | 0 | 5 |
| Week 3 | 0 | 5 | 0 | 5 |
| Week 4 | 0 | 5 | 0 | 5 |
| Week 5 | 3 | 10 | 3 | 10 |
| Week 6 | 8 | 17 | 4 | 17 | f. Summary: The laser treatment had no effect on the amount of ammonia present in the air at bird height (measured with 2 methods) nor the quality of the litter. Importantly, implementation of this enrichment device did not, in our conditions, cause an increase in ammonia due to possible increased activity of birds, which is an important welfare concern for producers.

g. Home Pen Behavior: Outcomes: One focal bird per recorded pen (7 laser pens, 7 control pens, 14 birds total) was observed for four laser periods (4 minutes each) daily for week 1 and one day a week for weeks 2-6 using a predetermined behavior ethogram (Table G13). Each behavior performed was recorded in the units of frequency (number of times the bird performed a certain activity) and duration (length of time spent on each activity, in seconds). The duration of each behavior was then converted to percentage of the bird's time spent out of the 4 minutes.

h. Statistics: Focal bird behavior was analyzed using the Glimmix procedure of SAS (9.4) due to lack of normal distribution of data. Certain behavioral measures (identified in Tables G13-15) were analyzed using relaxed convergence criteria as labeled due to few occurrences of said behaviors or were so rare that data could not be analyzed and is presented descriptively. See also FIGS. 24-28.

TABLE G13

Ethogram for broiler bird behavior

| Measure, % & Seconds | Defined | Unit |
|---|---|---|
| Active | Legs are in forward motion (walking or running) | Frequency, duration* |

TABLE G13-continued

Ethogram for broiler bird behavior

| Measure, % & Seconds | Defined | Unit |
|---|---|---|
| Inactive Social | Bird standing in one place or resting the abdomen on the litter, head rested or raised[1] while any part of its body is in contact with another bird | Frequency, duration |
| Inactive Isolated | Bird standing in one place or resting the abdomen on the litter, head rested (against chest or litter) or raised without any part of its body contacting another bird | Frequency, duration |
| At Feeder | Bird head over the feeder circle, bird in feeder or standing on feeder tray | Frequency, duration |
| At Drinker | Bird is standing beneath drinker line | Frequency, duration |
| Preening | Dust bathing or head/beak twisted around in contact with feathers | Frequency, duration |
| Other | Any behavior not otherwise identified | Frequency, duration |
| Out of View | Focal bird was obstructed or not observed due to being under the heat lamp or inside the feeder on the left side that could not be seen from the camera | Frequency, duration |

[1]H.H. Kristensen et al./Applied Animal Behaviour Science 103 (2007) 75-89
*Activity will be further quantified by counting the number of 0.6 by 0.6 meter gridlines crossed by the focal bird during the 4-minute clip.

TABLE G14

Home pen behavior of focal bird during enrichment periods by week: LSMeans (SEM) of frequency, duration (s), and % of time

| Behavior Week (across) | Control | | | | | | Laser | | | | | | P values | | |
|---|---|---|---|---|---|---|---|---|---|---|---|---|---|---|---|
| | 1 | 2 | 3 | 4 | 5 | 6 | 1 | 2 | 3 | 4 | 5 | 6 | Week | Trt | Wk*Trt |
| Gridlines | 3.01 | 2.75 | 2.29 | 1.62 | 1.73 | 1.51 | 4.36 | 5.15 | 3.92 | 2.31 | 2.21 | 1.40 | <.01* | 0.04* | 0.14 |
| SEM | 0.46 | 0.39 | 0.35 | 0.28 | 0.29 | 0.27 | 0.60 | 0.73 | 0.51 | 0.35 | 0.34 | 0.25 | | | |
| Inactive social | | | | | | | | | | | | | | | |
| Frequency | 1.14 | 0.32 | 0.43 | 0.57 | 0.43 | 0.50 | 1.51 | 0.76 | 0.82 | 0.78 | 0.78 | 0.35 | <.01* | 0.04 | 0.37 |
| SEM | 0.24 | 0.11 | 0.13 | 0.15 | 0.13 | 0.14 | 0.29 | 0.22 | 0.18 | 0.17 | 0.17 | 0.11 | | | |
| Duration | 32.64 | 26.18 | 25.67 | 79.28 | 36.92 | 67.45 | 23.63 | 33.60 | 55.32 | 81.14 | 59.00 | 64.65 | <.01* | 0.33 | <.01* |
| SEM | 4.51 | 3.60 | 3.54 | 10.66 | 5.03 | 9.09 | 3.32 | 4.69 | 7.48 | 10.91 | 7.97 | 8.72 | | | |
| Percent | 13.62 | 10.92 | 10.71 | 33.08 | 15.41 | 28.15 | 9.85 | 14.02 | 23.08 | 33.85 | 24.61 | 26.97 | <.01* | 0.33 | <.01* |
| SEM | 1.96 | 1.56 | 1.53 | 4.49 | 2.15 | 3.83 | 1.47 | 2.07 | 3.17 | 4.59 | 3.37 | 3.68 | | | |
| Inactive isolated | | | | | | | | | | | | | | | |
| Frequency | 3.21 | 1.52 | 1.10 | 0.78 | 0.92 | 0.67 | 3.10 | 2.35 | 1.72 | 0.88 | 1.09 | 0.84 | <.01* | 0.17 | 0.53 |
| SEM | 0.47 | 0.26 | 0.22 | 0.18 | 0.20 | 0.19 | 0.47 | 0.43 | 0.29 | 0.19 | 0.22 | 0.19 | | | |
| Duration[1] | 119.31 | 95.81 | 107.4 | 76.06 | 122.8 | 102.4 | 58.78 | 84.8 | 93.91 | 85.74 | 49.07 | 89.55 | <.01* | 0.06 | <.01* |
| SEM | 13.15 | 10.55 | 11.81 | 8.41 | 13.48 | 11.27 | 6.59 | 9.56 | 10.34 | 9.46 | 5.48 | 9.87 | | | |
| Percent[1] | 49.73 | 39.93 | 44.77 | 31.7 | 51.18 | 42.69 | 24.52 | 35.27 | 39.17 | 35.76 | 20.47 | 37.36 | <.01* | 0.06 | <.01* |
| SEM | 5.57 | 4.46 | 4.99 | 3.58 | 5.68 | 4.76 | 2.86 | 4.16 | 4.38 | 4.01 | 2.36 | 4.18 | | | |
| Active | | | | | | | | | | | | | | | |
| Frequency | 4.06 | 1.66 | 1.38 | 0.71 | 0.92 | 0.39 | 5.76 | 2.96 | 2.63 | 1.28 | 1.84 | 0.55 | <.01* | .01* | 0.75 |
| SEM | 0.59 | 0.29 | 0.26 | 0.17 | 0.20 | 0.12 | 0.77 | 0.50 | 0.40 | 0.24 | 0.31 | 0.15 | | | |
| Duration | 25.95 | 25.58 | 12.59 | 6.81 | 8.38 | 3.49 | 28.04 | 54.42 | 32.25 | 12.88 | 15.24 | 3.39 | <.01* | 0.05* | <0.01* |
| SEM | 4.27 | 4.18 | 2.11 | 1.19 | 1.44 | 0.65 | 4.61 | 8.85 | 5.23 | 2.15 | 2.52 | 0.63 | | | |
| Percent | 10.84 | 10.69 | 5.26 | 2.84 | 3.50 | 1.46 | 11.73 | 22.9 | 13.5 | 5.39 | 6.38 | 1.42 | <.01* | 0.05 | <.01* |
| SEM | 1.83 | 1.78 | 0.92 | 0.54 | 0.65 | 0.32 | 1.98 | 3.78 | 2.21 | 0.94 | 1.1 | 0.31 | | | |
| Preening | | | | | | | | | | | | | | | |
| Frequency | 0.97 | 0.20 | 0.15 | 0.03 | 0.06 | 0.17 | 0.51 | 0.14 | 0.10 | 0.06 | 0.10 | 0.13 | <.01* | 0.89 | 0.80 |
| SEM | 0.35 | 0.10 | 0.08 | 0.03 | 0.04 | 0.09 | 0.22 | 0.09 | 0.06 | 0.05 | 0.06 | 0.07 | | | |
| Duration | 3.13 | 2.92 | 0.84 | 0.53 | 0.96 | 1.94 | 1.71 | 0.78 | 1.98 | 0.47 | 0.78 | 2.51 | <.01* | 0.87 | <.01* |
| SEM | 2.48 | 2.31 | 0.67 | 0.43 | 0.76 | 1.53 | 1.36 | 0.63 | 1.57 | 0.38 | 0.63 | 1.98 | | | |
| Percent | 1.59 | 1.48 | 0.43 | 0.27 | 0.49 | 0.98 | 0.82 | 0.37 | 0.94 | 0.22 | 0.37 | 1.20 | <.01* | 0.80 | <.01* |
| SEM | 1.08 | 1.0 | 0.30 | 0.19 | 0.34 | 0.67 | 0.56 | 0.27 | 0.64 | 0.16 | 0.26 | 0.81 | | | |
| At feeder | | | | | | | | | | | | | | | |
| Frequency | 0.42 | 0.39 | 0.42 | 0.53 | 0.39 | 0.28 | 0.94 | 0.60 | 0.63 | 0.49 | 0.74 | 0.35 | 0.38 | 0.10 | 0.67 |
| SEM | 0.15 | 0.12 | 0.13 | 0.15 | 0.12 | 0.10 | 0.24 | 0.20 | 0.16 | 0.14 | 0.18 | 0.12 | | | |
| Duration[2] | 24.47 | 44.83 | 49.54 | 44.93 | 16.91 | 38.07 | 27.41 | 35.71 | 31.26 | 36.67 | 58.64 | 37.17 | <.01* | 0.80 | <.01* |
| SEM | 5.08 | 9.21 | 10.17 | 9.23 | 3.52 | 7.83 | 5.69 | 7.40 | 6.45 | 7.55 | 12.02 | 7.65 | | | |
| Percent | 10.22 | 18.73 | 20.70 | 18.77 | 7.07 | 15.91 | 11.43 | 14.91 | 13.03 | 15.29 | 24.45 | 15.5 | <.01* | 0.81 | <.01* |
| SEM | 2.17 | 3.87 | 4.27 | 3.88 | 1.51 | 3.3 | 2.43 | 3.15 | 2.72 | 3.18 | 5.03 | 3.22 | | | |
| At drinker | | | | | | | | | | | | | | | |
| Frequency | 0.75 | 0.39 | 0.53 | 0.18 | 0.53 | 0.18 | 1.24 | 0.31 | 0.39 | 0.32 | 0.53 | 0.25 | <.01* | 0.51 | 0.57 |
| SEM | 0.2 | 0.12 | 0.14 | 0.08 | 0.14 | 0.08 | 0.27 | 0.14 | 0.12 | 0.11 | 0.14 | 0.10 | | | |
| Duration | 13.72 | 14.88 | 27.07 | 8.40 | 40.39 | 9.48 | 29.18 | 8.40 | 8.21 | 8.21 | 31.88 | 26.6 | <.01* | 0.88 | <.01* |
| SEM | 2.58 | 2.76 | 4.95 | 1.6 | 7.34 | 1.79 | 5.36 | 1.67 | 1.56 | 1.56 | 5.814 | 4.87 | | | |

TABLE G14-continued

Home pen behavior of focal bird during enrichment periods by week: LSMeans (SEM) of frequency, duration (s), and % of time

| Behavior Week | Control | | | | | | Laser | | | | | | P values | | |
|---|---|---|---|---|---|---|---|---|---|---|---|---|---|---|---|
| (across) | 1 | 2 | 3 | 4 | 5 | 6 | 1 | 2 | 3 | 4 | 5 | 6 | Week | Trt | Wk*Trt |
| Percent | 5.73 | 6.22 | 11.31 | 3.51 | 16.87 | 3.96 | 12.21 | 3.51 | 3.43 | 3.43 | 13.33 | 11.12 | <.01* | 0.88 | <.01* |
| SEM | 1.14 | 1.19 | 2.10 | 0.71 | 3.09 | 0.79 | 2.3 | 0.78 | 0.70 | 0.70 | 2.46 | 2.07 | | | |

*P ≤ 0.05
[1]Convergence criteria relaxed to $10^{-7}$
[2]Convergence criteria relaxed to $10^{-6}$
**Behaviors categorized as "Other" or "Out of view" were so infrequent that the data could not be analyzed, relaxed convergence criteria was attempted to $10^{-4}$. The mean for frequency of "Other" behavior for week 1 was 0.27 (±0.59), and the means were 0 (±0) for weeks 2-6 (behavior did not occur). The means for frequency of "Out of view" for weeks 1 through 6 respectively were 0.27(±0.55), 0.05(±0.21), 0(±0), 0.04(±0.19), 0.05(±0.23), and 0.02(±0.13).

TABLE G15

Focal bird home pen behavior during enrichment periods by day: LSMeans (SEM) of frequency, duration (s), and % of time days 0-8

| Behavior | Control | | | | | | | | | Laser | |
|---|---|---|---|---|---|---|---|---|---|---|---|
| | 0 | 1 | 2 | 3 | 4 | 5 | 6 | 7 | 8 | 0 | 1 |
| Gridlines | 0.7 | 0.97 | 2.97 | 1.81 | 1.42 | 2.47 | 2.08 | 2.71 | 3.21 | 3.71 | 7.69 |
| SEM | 0.23 | 0.38 | 0.5 | 0.32 | 0.28 | 0.41 | 0.38 | 0.44 | 0.5 | 0.66 | 1.35 |
| Inactive social | | | | | | | | | | | |
| Frequency | 1.41 | 1.69 | 1.13 | 1.2 | 0.77 | 1.37 | 1.33 | 0.56 | 0.73 | 1.65 | 3.71 |
| SEM | 0.35 | 0.52 | 0.26 | 0.24 | 0.19 | 0.27 | 0.28 | 0.15 | 0.18 | 0.38 | 0.82 |
| Duration[1] | 97.59 | 49.42 | 33.13 | 63.18 | 45.17 | 55.18 | 41.02 | 15.63 | 40.53 | 113.1 | 67.22 |
| SEM | 10.49 | 5.77 | 3.66 | 6.74 | 4.87 | 5.9 | 4.46 | 1.79 | 4.39 | 12.11 | 7.64 |
| Percent | 40.7 | 20.61 | 13.82 | 26.35 | 18.85 | 23.02 | 17.13 | 6.52 | 16.9 | 47.18 | 28.03 |
| SEM | 4.52 | 2.72 | 1.63 | 2.88 | 2.11 | 2.54 | 1.95 | 0.82 | 1.91 | 5.2 | 3.5 |
| Inactive isolated | | | | | | | | | | | |
| Frequency | 1.27 | 0.7 | 3.2 | 1.8 | 1.68 | 2.04 | 3.05 | 2.08 | 1.31 | 1.77 | 2.68 |
| SEM | 0.31 | 0.32 | 0.46 | 0.29 | 0.28 | 0.31 | 0.43 | 0.31 | 0.24 | 0.38 | 0.65 |
| Duration[1] | 93.19 | 72.33 | 120.3 | 93.79 | 102.9 | 74.12 | 106.8 | 78.46 | 111.3 | 71.07 | 43.33 |
| SEM | 8.56 | 7.1 | 10.81 | 8.42 | 9.23 | 6.7 | 9.6 | 7.08 | 9.96 | 6.61 | 4.52 |
| Percent | 38.84 | 30.14 | 50.14 | 39.09 | 42.89 | 30.89 | 44.5 | 32.7 | 27.08 | 29.64 | 18.07 |
| SEM | 3.76 | 3.33 | 4.62 | 3.59 | 3.93 | 2.88 | 4.1 | 3.04 | 4.23 | 2.95 | 2.23 |
| Active | | | | | | | | | | | |
| Frequency | 1.95 | 1.8 | 3.99 | 2.61 | 2.32 | 3.66 | 4.5 | 2.19 | 1.86 | 3.44 | 6.89 |
| SEM | 0.41 | 0.53 | 0.56 | 0.38 | 0.36 | 0.49 | 0.6 | 0.34 | 0.31 | 0.58 | 1.16 |
| Duration | 11.53 | 11.19 | 26.2 | 12.26 | 11.58 | 13.26 | 18.87 | 16.44 | 21.41 | 34.98 | 43.64 |
| SEM | 1.38 | 1.61 | 2.63 | 1.29 | 1.24 | 1.38 | 1.95 | 2.14 | 3.55 | 4.68 | 4.68 |
| Percent | 4.82 | 4.68 | 10.95 | 5.12 | 4.84 | 5.54 | 7.86 | 6.87 | 8.96 | 14.59 | 18.2 |
| SEM | 0.72 | 0.91 | 1.21 | 0.62 | 0.6 | 0.66 | 0.91 | 0.78 | 0.98 | 1.64 | 2.27 |
| Preening | | | | | | | | | | | |
| Frequency | 0.21 | 0.56 | 1.18 | 0.67 | 0.58 | 0.81 | 0.79 | 0.21 | 0.4 | 0.35 | 0.71 |
| SEM | 0.12 | 0.29 | 0.26 | 0.16 | 0.15 | 0.18 | 0.2 | 0.09 | 0.13 | 0.16 | 0.32 |
| Duration | 0.62 | 4.8 | 9.33 | 5.32 | 2.01 | 6.72 | 4.72 | 1.17 | 1 | 1.43 | 1.77 |
| SEM | 0.22 | 1 | 1.32 | 0.78 | 0.36 | 0.96 | 0.74 | 0.25 | 1 | 0.36 | 0.54 |
| Percent | 0.26 | 2.02 | 3.91 | 2.23 | 0.84 | 2.82 | 1.96 | 0.49 | 2.94 | 0.6 | 0.75 |
| SEM | 0.14 | 0.58 | 0.62 | 0.38 | 0.2 | 0.45 | 0.37 | 0.14 | 0.47 | 0.22 | 0.33 |
| At drinker | | | | | | | | | | | |
| Frequency | 0.48 | 0.95 | 0.73 | 0.65 | 0.91 | 1.16 | 0.65 | 0.58 | 0.77 | 0.21 | 0.69 |
| SEM | 0.19 | 0.38 | 0.21 | 0.17 | 0.22 | 0.26 | 0.19 | 0.16 | 0.2 | 0.12 | 0.32 |
| Duration | 6.45 | 78.15 | 13.72 | 16.25 | 44.04 | 39.21 | 16.45 | 46.4 | 20.53 | 1.13 | 16.79 |
| SEM | 1.24 | 13.25 | 2.39 | 2.77 | 7.35 | 6.55 | 2.82 | 7.73 | 3.48 | 0.33 | 3.14 |
| Percent | 2.69 | 32.61 | 5.72 | 6.78 | 18.38 | 16.36 | 6.86 | 19.36 | 8.57 | 0.47 | 7.01 |
| SEM | 0.61 | 5.72 | 1.06 | 1.21 | 3.11 | 2.78 | 1.23 | 3.27 | 1.5 | 0.19 | 1.5 |

| Behavior | Laser | | | | | | | P-values | | |
|---|---|---|---|---|---|---|---|---|---|---|
| | 2 | 3 | 4 | 5 | 6 | 7 | 8 | Day | Trt | Day*Trt |
| Gridlines | 4.25 | 4.15 | 5.7 | 3.21 | 2.47 | 3.77 | 4.54 | <.01* | <.01* | <.01* |
| SEM | 0.66 | 0.6 | 0.79 | 0.5 | 0.4 | 0.56 | 0.72 | | | |

TABLE G15-continued

Focal bird home pen behavior during enrichment periods by day:
LSMeans (SEM) of frequency, duration (s), and % of time days 0-8

| | | | | | | | | | | |
|---|---|---|---|---|---|---|---|---|---|---|
| Inactive social | | | | | | | | | | |
| Frequency | 1.48 | 1.89 | 1.83 | 1.75 | 2.09 | 0.94 | 0.8 | <.01* | 0.04* | 0.56 |
| SEM | 0.31 | 0.33 | 0.33 | 0.32 | 0.35 | 0.22 | 0.23 | | | |
| Duration[1] | 23.77 | 38.71 | 32.7 | 55.08 | 56.6 | 21.18 | 50.58 | <.01* | 0.81 | <.01* |
| SEM | 2.7 | 4.19 | 3.58 | 6.95 | 6.06 | 2.41 | 5.59 | | | |
| Percent | 9.91 | 16.15 | 13.64 | 27.15 | 23.6 | 8.83 | 21.08 | <.01* | 0.81 | <.01* |
| SEM | 1.24 | 1.83 | 1.58 | 2.98 | 2.6 | 1.11 | 2.49 | | | |
| Inactive isolated | | | | | | | | | | |
| Frequency | 3.09 | 3.6 | 4.16 | 2.71 | 2.33 | 2.32 | 1.4 | <.01* | 0.02* | <.01* |
| SEM | 0.46 | 0.45 | 0.51 | 0.38 | 0.34 | 0.37 | 0.3 | | | |
| Duration[1] | 59.74 | 82.49 | 65.8 | 38.26 | 52.14 | 78.32 | 65.1 | <.01* | <.01* | <.01* |
| SEM | 5.5 | 7.43 | 6 | 3.56 | 4.77 | 7.12 | 6.12 | | | |
| Percent | 24.92 | 34.41 | 27.45 | 15.96 | 21.75 | 32.66 | 27.08 | <.01* | <.01* | <.01* |
| SEM | 2.43 | 3.19 | 2.59 | 1.59 | 2.08 | 3.09 | 2.75 | | | |
| Active | | | | | | | | | | |
| Frequency | 5.77 | 5.87 | 7.47 | 5.5 | 4.46 | 3.63 | 2.17 | <.01* | <.01* | <.01* |
| SEM | 0.75 | 0.7 | 0.85 | 0.67 | 0.56 | 0.52 | 0.4 | | | |
| Duration | 29.13 | 30.2 | 36.23 | 19.66 | 17.03 | 58.25 | 60.89 | <.01* | <.01* | <.01* |
| SEM | 2.91 | 2.94 | 3.5 | 1.99 | 1.73 | 5.54 | 5.89 | | | |
| Percent | 12.15 | 12.6 | 15.11 | 8.2 | 7.1 | 24.29 | 25.45 | <.01* | <.01* | <.01* |
| SEM | 1.33 | 1.3 | 1.54 | 0.92 | 0.8 | 2.4 | 2.6 | | | |
| Preening | | | | | | | | | | |
| Frequency | 0.55 | 1.2 | 1.22 | 0.61 | 0.81 | 0.18 | 0.06 | <.01* | 0.63 | 0.02* |
| SEM | 0.17 | 0.23 | 0.24 | 0.16 | 0.18 | 0.09 | 0.06 | | | |
| Duration | 2.95 | 6.72 | 4.86 | 3.02 | 4.16 | 1.37 | 1.75 | <.01* | 0.2 | <.01* |
| SEM | 0.52 | 0.96 | 0.73 | 0.5 | 0.64 | 0.3 | 0.39 | | | |
| Percent | 1.24 | 2.83 | 2.05 | 1.27 | 1.75 | 0.6 | 0.74 | <.01* | 0.23 | <.01* |
| SEM | 0.29 | 0.45 | 0.37 | 0.27 | 0.32 | 0.17 | 0.23 | | | |
| At drinker | | | | | | | | | | |
| Frequency | 1.2 | 1 | 1.64 | 1.19 | 1.1 | 0.57 | 0.38 | <.01* | 0.94 | 0.11 |
| SEM | 0.29 | 0.23 | 0.34 | 0.27 | 0.25 | 0.18 | 0.15 | | | |
| Duration | 29.96 | 25.49 | 38.74 | 23.79 | 45.08 | 9.61 | 10.91 | <.01* | 0.09 | <.01* |
| SEM | 5.07 | 4.29 | 6.48 | 4.02 | 7.52 | 1.71 | 1.96 | | | |
| Percent | 12.51 | 10.64 | 16.17 | 9.93 | 18.82 | 4.01 | 4.55 | <.01* | 0.1 | <.01* |
| SEM | 2.18 | 1.84 | 2.76 | 1.73 | 3.18 | 0.78 | 0.9 | | | |

*P ≤ 0.05
[1] Convergence criteria relaxed to $10^{-5}$
**Behaviors categorized as "At the feeder"; both "Feeder 1" (traditional round feeders) and "Feeder 2" (feeder tray for chicks) behaviors were so infrequent in days 0-8 that data could not be analyzed; convergence criteria was attempted to $10^{-4}$. The means for frequency of "Feeder 1" on days 0-8, respectively, are 0.11(±0.42), 0.57(±1.09), 0.68(±0.91), 0.46(±0.76), 0.52(±0.8), 0.57(±1.13), 0.53(±1.04), 0.68(±0.91), 0.55(±0.63). The means for frequency of "Feeder 2" on days 0-6 respectively (trays were removed on day 7) are 0.21(±0.5), 0.14(±0.53), 0.37(±0.66), 0.25(±0.64), 0.23(±0.67), 0.37(±0.71), and 0.04(±0.28).
***Behaviors categorized as "Other" or "Out of view" were also so infrequent that the data could not be analyzed, relaxed convergence criteria was attempted to $10^{-4}$. The mean for frequency of "Other" behavior for days 0-8 respectively are 0(±0), 0(±0), 0.27(±0.59), 0.29(±0.53), 0.26(±0.71), 0.17(±0.47), 0.17(±0.43), 0(±0), and 0(±0). "Out of view" frequency means on days 0-8, respectively, are 0.11(±0.31), 0.36(±1.08), 0.27(±0.59), 0.29(±0.53), 0.55(±1.01), 0.46(±0.77), 0.27(±0.66), 0.1(±0.36), and 0.05(±0.21).

i. Overall Summary: The implementation of the laser device as a form of environmental enrichment led to increased weight gains, improved feed conversion, and improved average daily gains, particularly in the last 2 weeks of growth as well as overall comparisons in our broiler flock exposed to laser enrichment. Birds in the laser group also showed less non-interacting behaviors with a human in their pen over time, displayed in the willingness to approach data. Our data imply that having the daily laser activity did not have a significant impact on the occurrence of breast blisters or footpad dermatitis, ammonia quantity in the air, litter quality, walking lameness prevalence, or bone mineral density or content of the tibia. While data regarding the bird behavior is forthcoming, we can conclude from our performance data that having the laser device led birds to the feeder to eat more often, reflected in their significantly increased intake and gains. A major finding from the behavioral results were that laser enriched birds were more active both in daily 4 minute recorded observations in days 1-8 as well as weekly observations in weeks 2 through 6. For example, in the first 8 days of life, active percent of time in control was 6.3% and laser enriched was 14.1%, representing a 55% increase in time spent active during 4 minute observation periods (P<0.0001). On a weekly basis over time (weeks 1-6; 1 day of recorded observation/week), control birds spent an average of 4.55% active vs 7.49% in enriched birds during the 4 minute observation period (P<0.0001), representing a 30% overall average increase in active time during 4 minute recorded observation periods. In forthcoming data, we also find that birds receiving laser enrichment retain increased activity in both duration and frequency. In addition, the laser did not adversely affect drinking or feeder behavior. It is also important that this increased activity did not stir up the litter to the degree that air or litter quality was negatively affected, or that bird foot or breast health was compromised. This addition to the environment of broilers, in our research conditions, can have a significant positive effect on bird performance without negatively affecting broiler bird welfare.

V. OPTIONS AND ALTERNATIVES

As mentioned, the examples above are neither inclusive nor exclusive of all forms and embodiments that invention or its various aspects can take. A number of examples of such possible variations are included above or the supporting materials in the Appendices, which are incorporated here by reference.

Some further examples are as follows:

1. Light Sources

Red 650 nm lasers are given by example but are non-limiting. The red laser spots discussed above have been found efficacious. It is possible that other laser sources could at least be operable even if not as efficacious as red laser. Some non-limiting examples are:
 a. Pink
 b. Green
 c. Ultraviolet range
 d. Blue
 e. Orange
 f. Yellow
 g. Magenta
 h. Burgundy
 i. Silver (white)
 j. Combinations of the above-mentioned spectra
 k. Shades within the above-mentioned spectra (Higher, lower, or between 370 nm, 445 nm, 508 nm, 565 nm, for example, between 330 and 700 nm).

The color of the light spot is at least, of course, within the light wavelengths or spectra that are perceivable by the specific poultry involved. For example, most poultry have tetrachromatic vision which includes both visible and UV spectra. See, e.g., https://academic.oup.com/bioscience/article/50/10/854/233996/and https://doi.org/10.1641/0006-3568(2000)050[0854:TABSEV]2.0.CO; 2. In one non-limiting example, therefore, the light source would include both wavelengths in visible and in UV spectra. On the other hand, light wavelengths can be what is shown to be effective to elicit a desired response from the relevant poultry that meets or promotes at least one of the goals or benefits of the present invention. As such it might be monochromatic and just in the visible spectrum for the relevant bird(s). But it could include a range or variety of spectra. Brightness and other light parameters at the spot can be other design factors to consider.

Some considerations for the designer relative the light source are as follows:
 a. The dots can be adjusted according to the focus by rotating the lens of typical laser sources.
 b. Alternatively, the dots could be projected, moved, and positioned using a set of mirrors or other reflective surfaces
 c. A maximum of 5V powered laser is recommended, 3.5 V may be better but if 5V is used, it should always accompany a heat sink to avoid over-heating.

A variety of laser sources are available for purposed of the invention. Alternatives to lasers are possible. Any concentration of light into a controllable beam that can be projected over space and produce a light spot or dot on a surface at least substantially analogous to a laser are possibilities. Optics may be needed to get sufficient concentration or collimation. Such are known to those skilled in the art. Non-limiting examples include incandescent, high intensity, electrostatic, or gas discharge, LED or other solid state types, halogen, xenon, or others, so long as they can project a beam of sufficient concentration, intensity, and spectra to effectively produce one or more responses from relevant poultry in alignment with the invention. Foregoing factors, in addition to practical factors such as cost of the sources, cost of energy to produce sufficient beams and spots from the sources, cost and complexity of any ancillary components to produce sufficient beams and spots (e.g. optics) from the sources, longevity, robustness in sometimes harsh environments, and maintenance over time, would be considered by the designer. As will be appreciated by those skilled in the art, lasers are a good candidate because they are relatively inexpensive both to purchase and operate, they are robust and have a relatively long useful life, they come in different colors, powers, and other operating parameters, and they are concentrated. They can be substantially collimated and have sufficient intensity over substantial distances to produce effectively bright and relatively small laser light spots on many types of surfaces (e.g. clean floors, dirty floors, floors of a variety of materials, and even with dirt or debris on top of the floors). Furthermore, laser sources effective here can have relatively small form factors and weight. Thus, relatively inexpensive components can be used to support them relative a surface as well as control and change their aiming orientation, including slowly to quickly, in smaller or larger increments, and the like.

2. Spot Size

As will be appreciated by those skilled in the art, spot size can vary. The designer would consider a variety of factors. One is that the spot diameter or largest dimension be relatively small compared to the size of poultry involved. One non-limiting range would be 2 to 35 mm across the longest dimension of the spot. With lasers, highly concentrated or collimated beams are available in off-the-shelve products. Sufficient brightness at the spot is also available. As is well-known, laser beams, including from relatively low-cost, pen-sized devices can travel substantial distances (e.g. miles) with sufficient intensity to generate a light spot at a surface at such distances. As will be appreciated from the foregoing exemplary embodiments, one reason for a 2 to 25 mm range relative to spot size is that it is the approximate range of sizes of insects that poultry may predate. Smaller (e.g. ants, mites, or the like on the order of 2 mm longest dimension) to larger (e.g. insects or creatures such bigger ants, beetles, flies, etc. as up to and including on the order of 35 mm) naturally tend to have unpredictable movements (e.g. to avoid predation) and many times quick, start-stop, and change of direction. Thus, light spots in this general range of sizes can emulate or simulate the size and movement of these natural poultry food sources. Thus, the size of the light spot selected by the designer for this purpose is sometimes called relatively small at least in the sense that it is emulating the size of these typically much smaller creatures than the poultry. This is, in at least one sense, in distinction what might be considered relatively large for these purposes or sometimes referred to as a spotlight, as spotlights tend to illuminate a larger area. One example is a spotlight used in theaters or arenas to illuminate an area that at least subsumes the person towards which it is directed. A spotlight in that sense is therefore on the same scale of size as the creature involved, not a light spot that is usually much smaller than the creature involved (here, a bird). Thus, in contradistinction to some other attempts to use lights in the presence of poultry (see Background of the Invention) which are akin to spotlights, the present invention uses relatively smaller light spots.

3. Actuators

The examples given above are also not limiting. Any type of motion controllable device that could manipulate aiming direction of a laser could be considered. Any set-up that allows motion-control of the laser spots is possible. Examples of non-limiting alternatives are:
   a. Motion controllers;
   b. motorized gimbal mounts;
   c. robotic positioners;
   d. X-y-z positioners.
4. Controller A rudimentary control circuit with a programmable microprocessor onboard housing at or near the lasers and actuators as possible. Alternatively, a digital controller apart from the lasers and actuators is possible. This could include wired or wireless communication to such a digital controller. That Digital controller could be a part of or in combination with other digital devices. That could include a laptop, smart phone, tablet, or desktop computer. As such, modification of control of the lasers is possible.

As mentioned, any number of regimes of laser spot movement are possible. As indicated, those described above are designed to promote the benefits to poultry as explained above.

Some considerations for the designer relative the controller are as follows:
   a. The number of laser sources that can be programmably controlled:
      i. can vary from 1 to more than 1, including two or more. Normally that number can be plural so long as each has a 5V maximum power.
   b. Timing:
      i. Although the timing can be programmed in the Arduino itself, a timing switch was used instead due to time constraints.
      ii. There are many kinds available online, we used Arduino Uno software (free online).
   c. Speed programmed for the settings:
      i. In the specific example, the speed was of the unit 1, there is no speed metrics available in the actual program. 1 is the minimum and 100 is the maximum, although many servos don't operate at 100. It was based on trial and error.
      ii. The value was 1 in the program, which did not estimate a speed, so we did some measurements based on videos we recorded.
         1. We did some calculations based on lasers in the videos we recorded. We went through and randomly picked videos from different days (d16, d5, d37, d23) and measured speed of laser as cms/second the way we would with walking distance. Three were very close (low end-typical speed) and one was when the laser zig zagged really quickly before slowing down again (high end).
         2. 4 speeds measured were:
            a. ~74.24 cm/7 sec=~10.62 cm/sec
            b. ~32.74 cm/4 sec=8.18 cm~/sec
            c. ~138.79 cm/15 sec=~9.25 cm/sec
            d. ~177.8 cm/6 sec=~29.6 cm/sec
         3. So, a general estimated speed range would be ~7.6 to 30.5 cm per second. Of course, there could be faster or slower movements as this was just an average.
   Speeds can vary according to designer need or desire. One non-limiting example is spot movement of 1.0 to 1 cm/sec. This can be at a constant or variable velocity (including accelerations and decelerations). Another example is a range of 0.1 to 1 cm/sec over a collective 1 m/min, whether constant or variable velocity over that minute, or in periods within that minute. Movement can include or not include start and stops of movement. But other speeds and movement regimens, including faster, are possible. The spot may or may not stop for any duration of time before beginning on a path (or restarting movement on a path), may flash in the same location once or several times, or have any combination of the foregoing. Any of these can be as directed by random movement patterns.
   d. Direction change.
      i. The direction change was based on Random function. Since the systems were custom-built and programmed, each of them was tested individually. The X and Y coordinates were nothing but angles in degrees for each of the two servos. We tried to estimate the maximum angle needed to sweep through the pen of 2.4 m. Then we generated a random angle between the maximum and minimum so that the laser sweeps only within the pen domain.
      ii. As discussed herein, the pattern of sport movement can be completely random during one session and/or between different sessions. Many digitally controlled actuators (e.g. digitally controlled motors) have programming instructions that produce a randomization function. A designer can produce fully random movement by appropriate programming or configuration of the components that change the aiming orientation of a light source or can produce pseudo-random movement as directed by a randomization based on intellectual input or data.
   e. Intermittent starts/stops.
      i. The start stops are solely dependent on the speed, which was set at "1" and was random.
   f. Sessions and Number of Sessions per Time Period
      i. One design parameter mentioned earlier relates to how long a laser spot is presented to the birds. It is usually desirable to limit each session in time as well as number of sessions per time period to deter the birds from becoming so conditioned to the spot(s) that it results in habituation. This could result in the birds not responding in beneficial ways or at all. But the session time and sessions per day can vary.

But as understood by those skilled in this technical area, the designer can vary these parameters based on need or desire.
4. Other Other non-limiting alternatives or additions envisioned are:
   a. A separate wall-socket programmable timer to begin and end each session may be replaced by programming the digital controller to implement the same.

For example, the randomized spot movement is described in terms of a speed or rate of movement and essentially a randomized direction (e.g. both direction and amount of time in any given direction). It is to be understood that one speed or rate of movement could be used, or it could change at any time as a prat of that randomness in any given session. Furthermore, it is possible to change any of intensity, spot size, and perhaps even color during movement in a session, or between sessions. It is possible to control movement in a zig-zag pattern (a series of linear movements of equal or non-equal lengths), but the technique could also or alternatively include non-linear movements (curved, part-linear/part non-linear) so long as the chosen laser and actuator allow the same.

Other non-limiting examples of randomized movement include:
  a. Smooth, controlled lines
  b. A combination of lines, zig-zags, or arcs
  c. Variation of speed
  d. Variation between stationary and movement
  e. Variation of continuous light, blinking, or any combination of on/off patterns As will be appreciated, the designer can elect all types of variations to spot movement by appropriate configuration of the actuating components. As indicated in some of the examples, in some cases the spot movement will simulate or emulate naturally occurring events (e.g. insect movement). But this is not a requirement. As will be further appreciated, the spot movement could repeat identically each session, change each session, or change within each session.

The invention claimed is:

1. A method of raising poultry comprising:
  a. providing a plurality of poultry;
  b. automatically controlling in a presence of the plurality of poultry a light beam including wavelengths in a visible light spectrum during a plurality of environmental enrichment sessions at spaced-apart predetermined session times per day;
  c. the plurality of environmental enrichment sessions effective for improved poultry production performance without sacrificing poultry physical or environmental quality measures, wherein each of the plurality of environmental enrichment sessions comprises:
    i. projecting the light beam to produce a light dot at a surface at or around the poultry during the predetermined session time; and
    ii. moving the light dot along a path with randomized direction and speed relative the surface during the predetermined session time.

2. The method of claim 1 wherein the light beam comprises a red laser and the laser dot comprises a diameter of on the order of 2 mm at the surface.

3. The method of claim 1 wherein the moving of the light dot emulates natural predatory behavior and/or visual-oriented behavior of poultry.

4. The method of claim 1 wherein the moving of the light dot further comprises:
  a. locating a food source at or near the surface;
  b. starting a position of the light dot at a starting position away from the food source; and
  c. after the starting position, migrating the light dot towards the food source.

5. The method of claim 1 wherein the predetermined session time for each of the sessions comprises a plurality of minutes.

6. The method of claim 1 wherein:
  a. the plurality of environmental enrichment sessions per day comprise 2-10 per day;
  b. the spacing apart of the environmental enrichment sessions per day comprises hours apart; and
  c. the session time for each environmental enrichment session comprises seconds to minutes.

7. The method of claim 1 wherein the environmental enrichment sessions per day are spread over an approximately 6 week growth cycle for the plurality of poultry for one or more of the following growing stages:
  a. pre-starter;
  b. starter;
  c. grower; and
  d. finisher.

8. The method of claim 1 applied to the plurality of poultry in a manner effective for one or more of the following:
  a. promote one or more positive physical characteristics;
  b. deter one or more negative physical effects;
  c. promote one or more positive behavioral parameters;
  d. promote one or more positive environmental parameters;
  e. promote one or more natural instinct behaviors; and
  f. meet or exceed existing NCC guidelines enrichment for commercial broiler production (under Animal Welfare Guidelines and Audit Checklist (2014)).

9. The method of claim 8 wherein the positive physical characteristics comprise at least one or more of:
  a. weight gain comprising at least one of:
    i. average daily gain (ADG) per pen; and
    ii. average daily gain per bird;
  b. feed intake (FI) comprising one or more of;
    i. average feed intake per pen;
    ii. average feed intake per bird; and
    iii. overall feed intake;
  c. feed conversion ratio (FCR);
  d. gait; and
  e. overall learned and conditioned movement vs stationary or resting behavior; and
wherein the negative physical effects comprise at least one of:
  a. mortality;
  b. morbidity;
  c. disease;
  d. foot pad dermatitis;
  e. breast blisters;
  f. walking lameness;
  g. bone mineral density and bone mineral content of tibia; and
  h. bone breaking strength; and
wherein the positive behavioral parameters comprising at least one of:
  a. behavior;
  b. performance;
  c. walking distance;
  d. willingness to approach humans;
  e. interacting with other birds;
  f. orienting towards humans; and
  g. reduced fear behaviors when approached; and
wherein the positive environmental parameters comprise at least one or more of:
  a. air quality including ammonia content; and
  b. litter quality including litter moisture.

10. The method of claim 1 in combination with a second enrichment technique comprising placing one or more physical, inanimate objects in the presence of the plurality of poultry.

11. The method of claim 10 wherein the one or more physical, inanimate objects comprise at least one of:
  a. a perch;
  b. a maze;
  c. a bailed plant material;
  d. a field tile; and
  e. a can.

12. The method of claim 1 applied to poultry of any age or stage of life including at least one of: new born, growing stages, and adult, wherein the plurality of poultry comprise chickens, turkeys, quail, ducks, geese, or pheasants.

13. A system for producing poultry comprising:
  a. an area for multiple poultry, in number or species, the area having at least one surface;

b. a light source positioned relative to the surface, the light source capable of projecting a light beam to produce a light dot on the surface;
c. one or more actuators operatively connected to the light source to adjust aiming direction of the light source relative the surface; and
d. a controller operatively in communication with the one or more actuators to instruct:
   i. aiming direction of the light source relative the surface according to a path of movement during a plurality of environmental enrichment sessions at spaced-apart predetermined session times per day, the plurality of environmental enrichment sessions effective for improved poultry production performance without sacrificing poultry physical or environmental quality measures, each of the plurality of environmental enrichment sessions comprising:
      1. Projecting the light beam from a position away from the surface to the surface to produce the light dot at the surface at or around the poultry during the predetermined session time; and
      2. moving the light dot along a path with randomized direction and speed relative the surface during the predetermined session time.

14. The system of claim 13 wherein the surface comprises a floor, and the light source, the one or more actuators, and the controller are mounted in a housing which includes mounting hardware for elevating the housing at least 1.8 m above the floor.

15. The system of claim 13 wherein:
a. the moving of the light dot relative the surface emulates natural predatory behavior of poultry.

16. The system of claim 13 wherein the area comprises an enclosure or two adjacent enclosures of the plurality of poultry.

17. An apparatus for use in raising poultry comprising:
a. a housing;
b. mounting structure adapted to mount the housing in an elevated position relative to a surface of a poultry pen;
c. an actuator in the housing;
d. a light source associated with the actuator;
e. a controller operatively connected to the light source and actuator, the controller programmed to:
   i. adjust the aiming direction of the light source relative the surface of the poultry pen during a plurality of environmental enrichment sessions of spaced-apart predetermined session times per day, the plurality of environmental enrichment sessions effective for improved poultry production performance without sacrificing poultry physical or environmental quality measures, each of the plurality of environmental enrichment sessions comprising:
      1. Projecting the light source from a position away from the surface to the surface to produce a light dot at the surface at or around the poultry; and
      2. moving the light dot along a path with randomized direction and speed relative the surface; and
f. a connection to an electrical power source for providing electrical power to at least one of the light source, the actuator, and the controller.

18. The apparatus of claim 17 wherein the light source comprises a red laser.

19. The apparatus of claim 17 wherein the actuator is a motorized pan/tilt assembly.

20. The apparatus of claim 17 wherein the controller comprises a digital programmable controller.

* * * * *